(12) United States Patent
Hull et al.

(10) Patent No.: US 9,560,805 B2
(45) Date of Patent: Feb. 7, 2017

(54) BACKWATER VALVE ASSEMBLY AND METHOD

(71) Applicant: Oatey Co., Cleveland, OH (US)

(72) Inventors: Eric Hull, Avon Lake, OH (US); Dennis R. Young, Sheffield Village, OH (US)

(73) Assignee: OATEY CO., Cleveland, OH (US)

( * ) Notice: Subject to any disclaimer, the term of this patent is extended or adjusted under 35 U.S.C. 154(b) by 102 days.

(21) Appl. No.: 14/213,577

(22) Filed: Mar. 14, 2014

(65) Prior Publication Data

US 2014/0261789 A1 Sep. 18, 2014

Related U.S. Application Data

(60) Provisional application No. 61/792,706, filed on Mar. 15, 2013.

(51) Int. Cl.
| | | |
|---|---|---|
| *F16K 15/00* | (2006.01) | |
| *A01D 75/00* | (2006.01) | |
| *A01D 41/127* | (2006.01) | |
| *A01D 43/08* | (2006.01) | |
| *E03F 7/04* | (2006.01) | |
| *F16K 15/03* | (2006.01) | |

(52) U.S. Cl.
CPC ............ *A01D 75/00* (2013.01); *A01D 41/127* (2013.01); *A01D 41/1271* (2013.01); *A01D 43/085* (2013.01); *E03F 7/04* (2013.01); *F16K 15/03* (2013.01); *Y10T 137/7903* (2015.04)

(58) Field of Classification Search
CPC A01D 41/1271; A01D 41/127; A01D 43/085; A01D 75/00; E03F 7/04; F16K 15/03; Y10T 137/7903
USPC ............... 137/315.18, 315.33, 315.41, 327, 454.6,137/454.2, 527, 527.2, 527.4, 855
See application file for complete search history.

(56) References Cited

U.S. PATENT DOCUMENTS 305,722 A * 9/1884 Tomlinson .............. F16K 15/03
  137/527.2
542,417 A * 7/1895 Lenhart ................... F16K 15/03
  137/454.2

(Continued)

FOREIGN PATENT DOCUMENTS

| WO | 01/71230 | 9/2001 |
|---|---|---|
| WO | 2012/021961 | 2/2012 |
| WO | 2012/065269 | 5/2012 |

OTHER PUBLICATIONS

RectorSeal, Clean Check brochure, 4 pgs., 2013.
International Search Report and Written Opinion from PCT/US14/028982 dated Aug. 8, 2014.

*Primary Examiner* — Umashankar Venkatesan
(74) *Attorney, Agent, or Firm* — Baker & Hostetler LLP

(57) ABSTRACT

The present disclosure is directed to a backwater valve assembly comprising a main valve body, a flapper sub-assembly, and a cap. The main valve body has an inner wall that can define a recess into which the flapper sub-assembly can be removably secured. The flapper sub-assembly includes at least one flapper element that can pivot between an open position, in which the flapper element allows fluid to flow through the backwater valve assembly, and a closed position, in which the flapper element prevents fluid from flowing in the opposite direction. The flapper sub-assembly can be removably coupled to the cap to allow the flapper sub-assembly and cap to be installed in or removed from the main valve body together as a unitary assembly.

24 Claims, 73 Drawing Sheets

(56) References Cited

U.S. PATENT DOCUMENTS

| | | | |
|---|---|---|---|
| 718,657 A * | 1/1903 | Renton | F16K 27/045 |
| | | | 137/454.2 |
| 992,849 A * | 5/1911 | Chalke | F16K 27/045 |
| | | | 137/454.2 |
| 2,718,239 A | 9/1955 | Simko, Sr. | |
| 3,068,903 A | 12/1962 | Haenky et al. | |
| 4,039,004 A | 8/1977 | Luthy | |
| 4,054,153 A * | 10/1977 | Guyton | F16K 15/03 |
| | | | 137/527 |
| 4,252,144 A | 2/1981 | Scaramucci | |
| 5,234,018 A | 8/1993 | Grachal et al. | |
| 5,406,972 A | 4/1995 | Coscarella et al. | |
| 6,050,294 A | 4/2000 | Makowan | |
| 6,158,464 A | 12/2000 | Campbell et al. | |
| 6,318,404 B2 | 11/2001 | Coscarella | |
| 6,446,665 B2 | 9/2002 | Coscarella | |
| 6,499,503 B2 | 12/2002 | Coscarella | |
| 6,655,413 B2 | 12/2003 | Condon et al. | |
| 6,679,283 B1 | 1/2004 | Coscarella | |
| 6,823,905 B1 | 11/2004 | Smith et al. | |
| 6,997,041 B1 | 2/2006 | Metzger et al. | |
| 7,325,573 B2 | 2/2008 | Coscarella | |
| 7,373,948 B2 | 5/2008 | Campbell et al. | |
| 7,398,675 B1 | 7/2008 | Metzger et al. | |
| 7,614,192 B2 | 11/2009 | Safie | |
| 7,654,287 B1 | 2/2010 | Metzger et al. | |
| 7,726,342 B2 | 6/2010 | Campbell et al. | |
| 7,757,706 B2 | 7/2010 | Coscarella | |
| 8,096,318 B2 | 1/2012 | Coscarella | |
| 8,210,029 B2 | 7/2012 | Hart et al. | |
| 8,578,961 B2 | 11/2013 | Coscarella | |
| 8,646,314 B2 | 2/2014 | Coscarella | |
| 8,714,933 B2 | 5/2014 | Komatsu et al. | |
| 2002/0157710 A1 | 10/2002 | Engelmann | |
| 2004/0007265 A1 * | 1/2004 | Coscarella | F16K 3/0218 |
| | | | 137/315.41 |
| 2011/0173747 A1 | 7/2011 | Evans et al. | |
| 2012/0241028 A1 | 9/2012 | Kirk | |
| 2012/0255344 A1 | 10/2012 | Hart et al. | |
| 2012/0255628 A1 | 10/2012 | Pourzynal et al. | |
| 2013/0188040 A1 | 7/2013 | Kamen et al. | |
| 2013/0220448 A1 | 8/2013 | Coscarella | |
| 2014/0053923 A1 | 2/2014 | Martinelli et al. | |

* cited by examiner

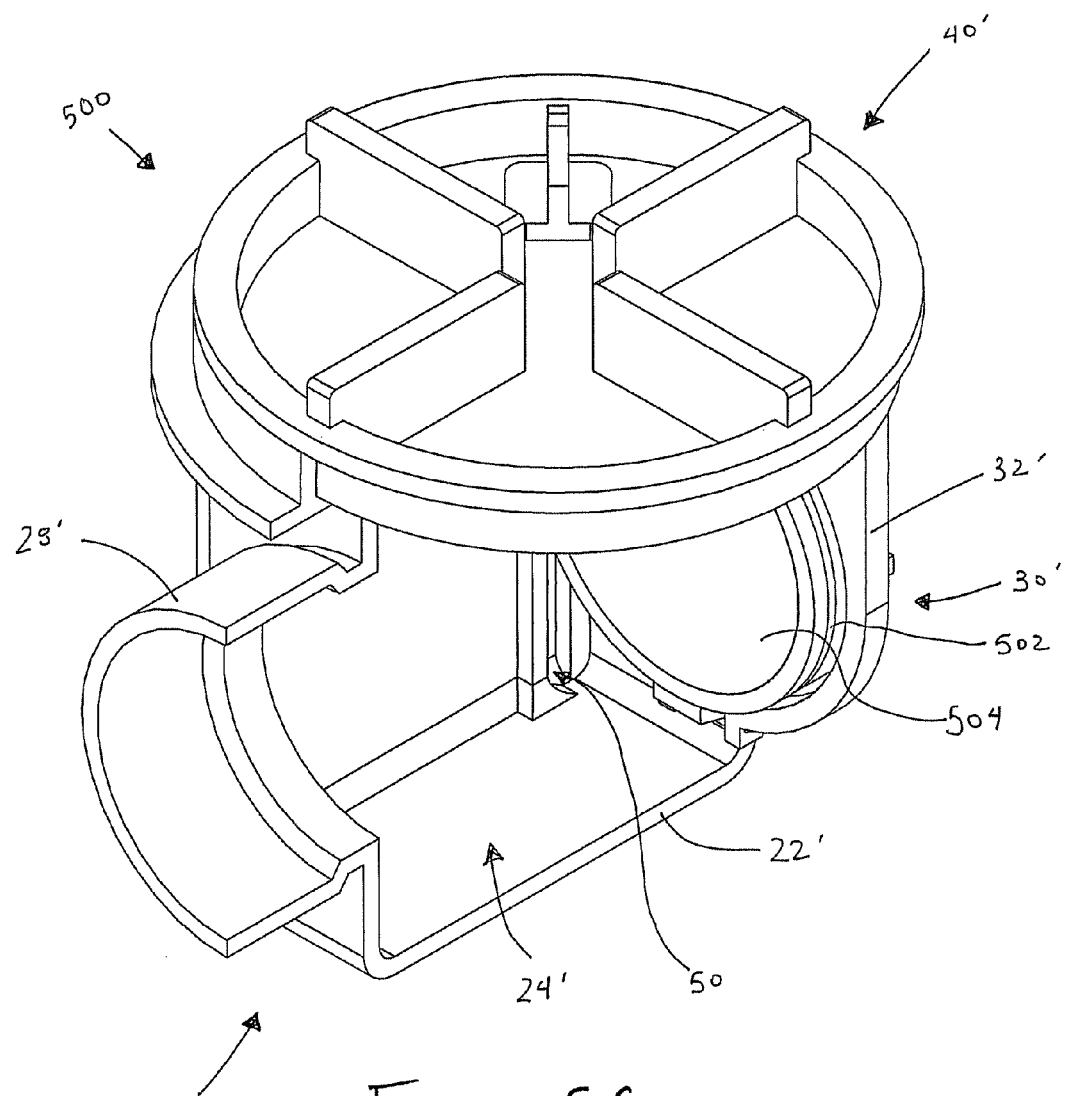

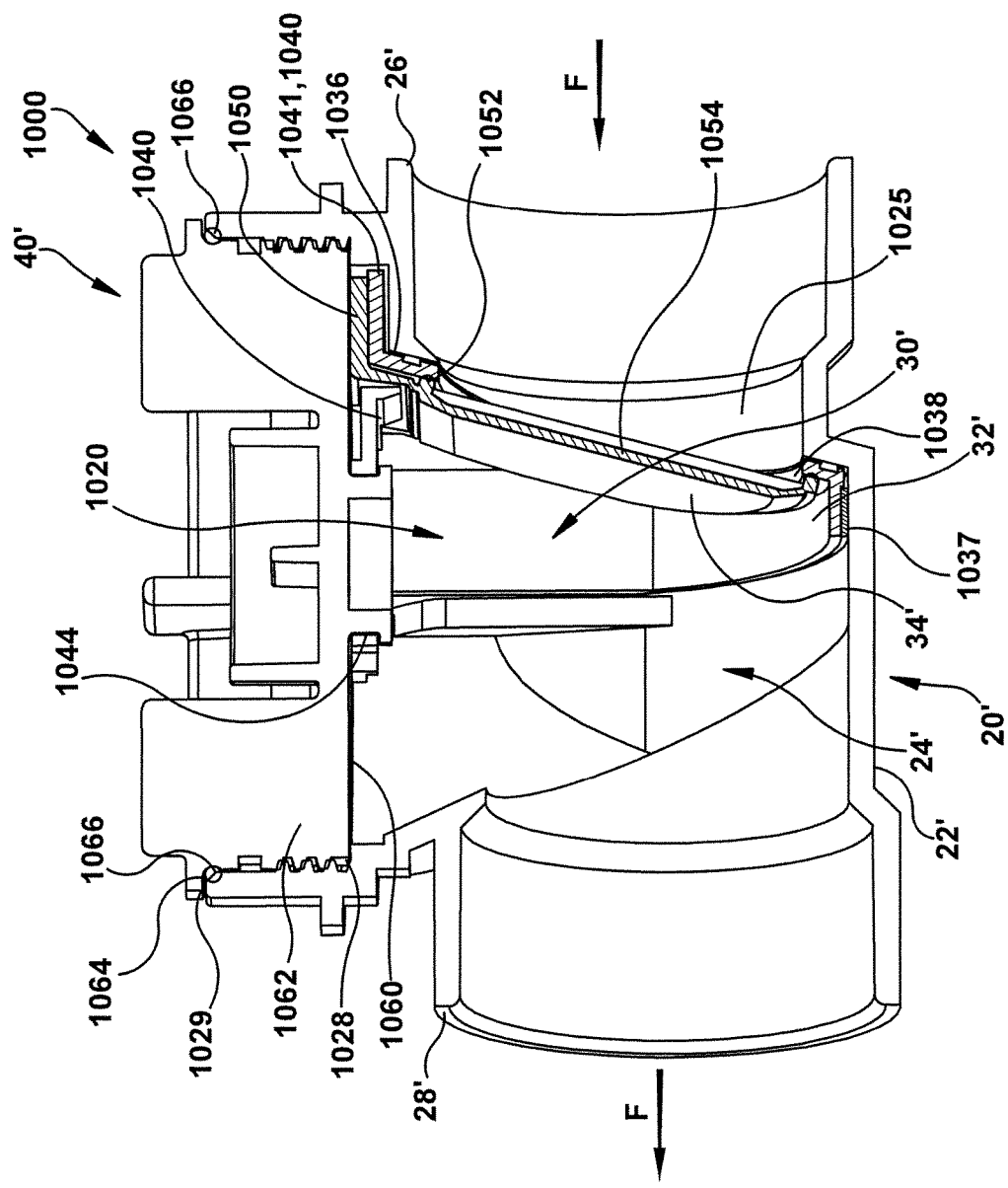

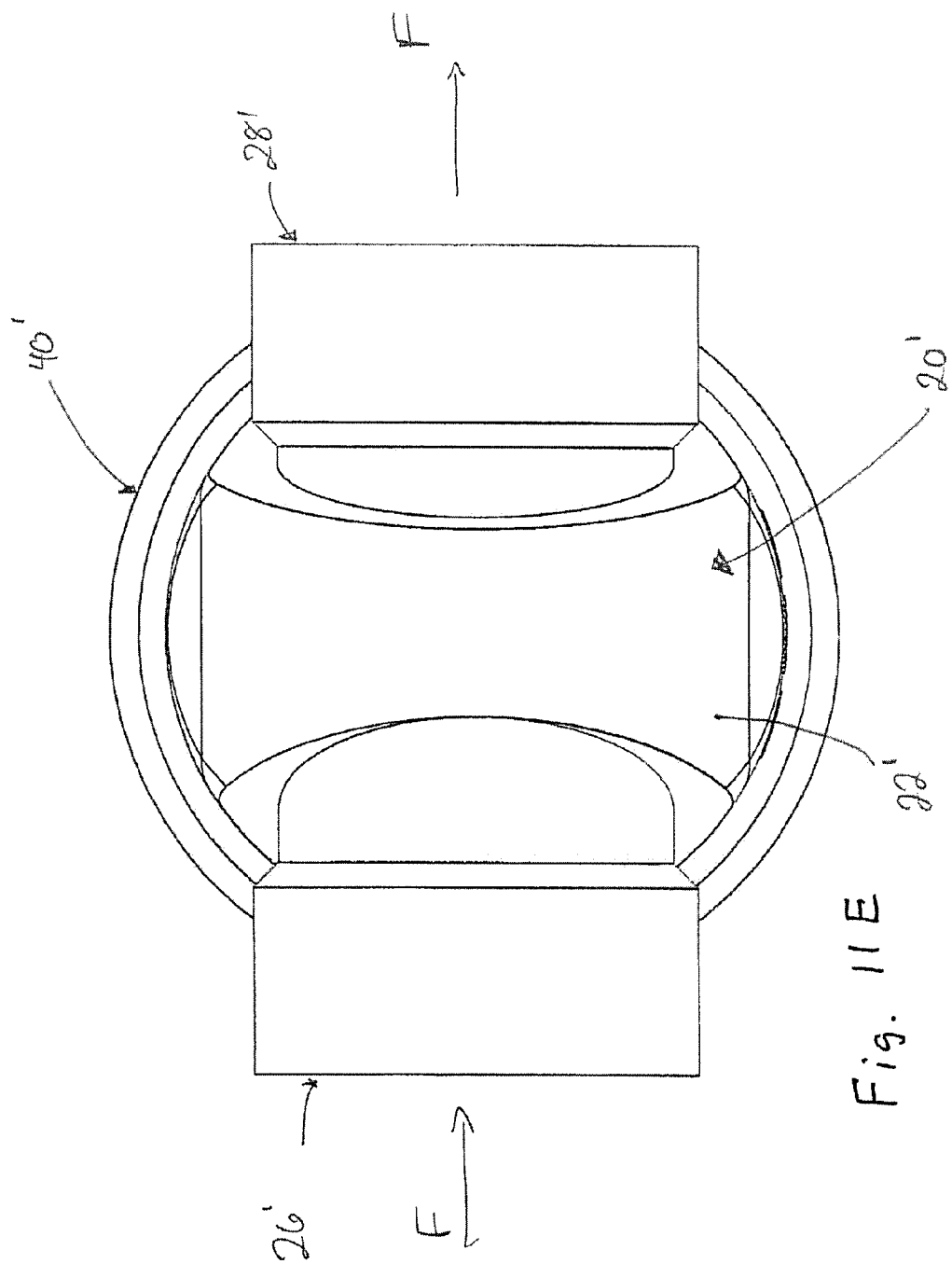

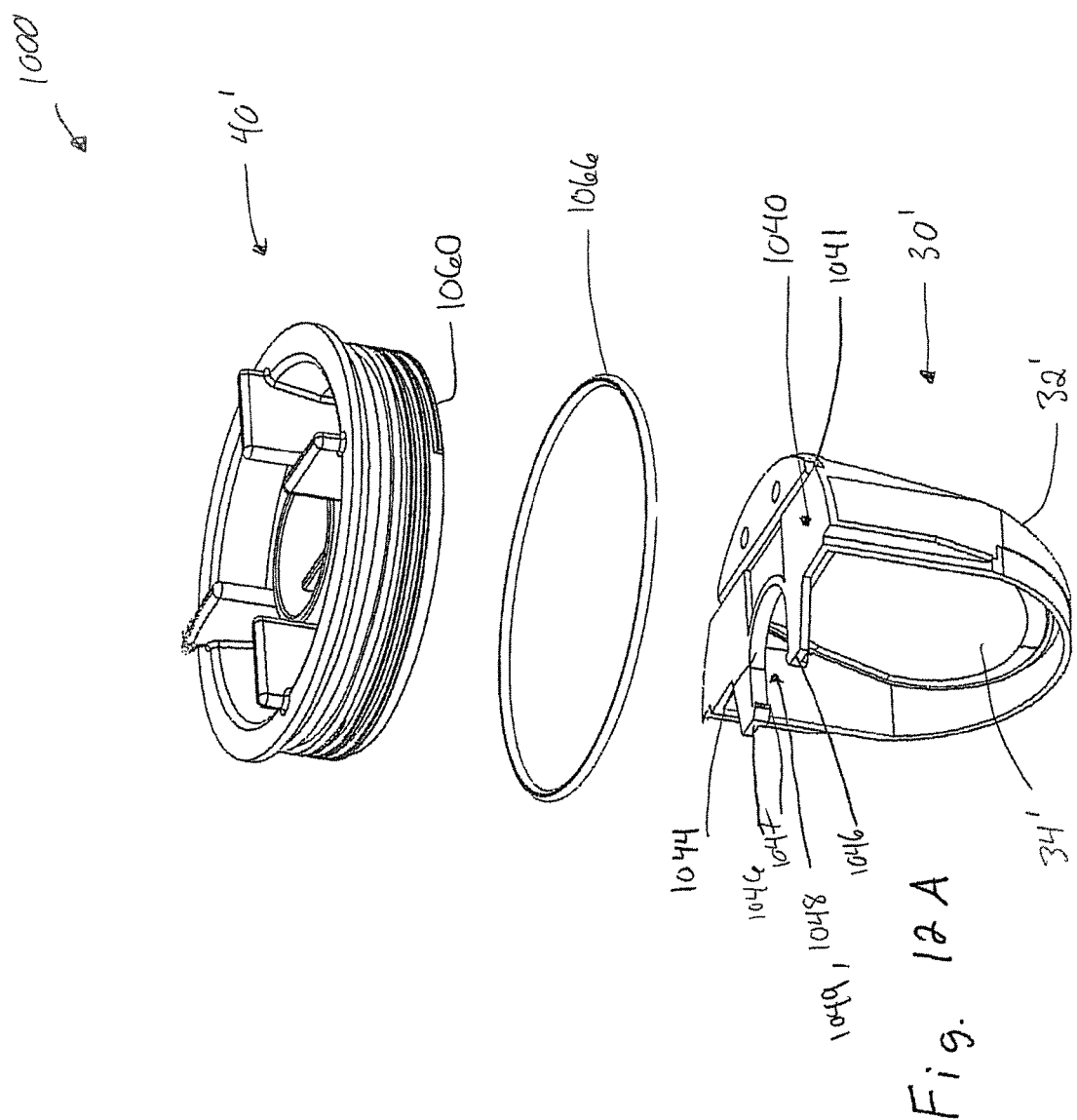

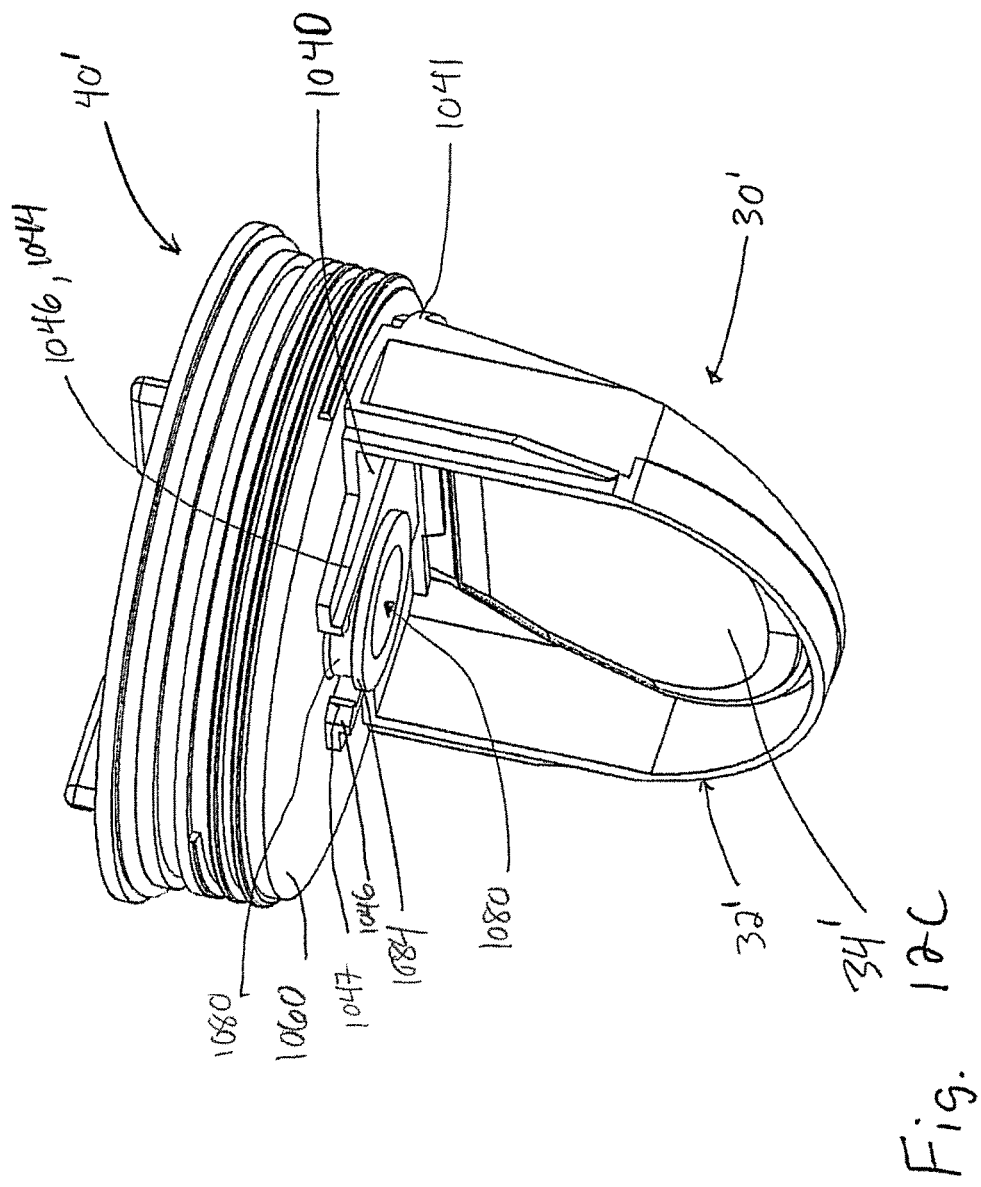

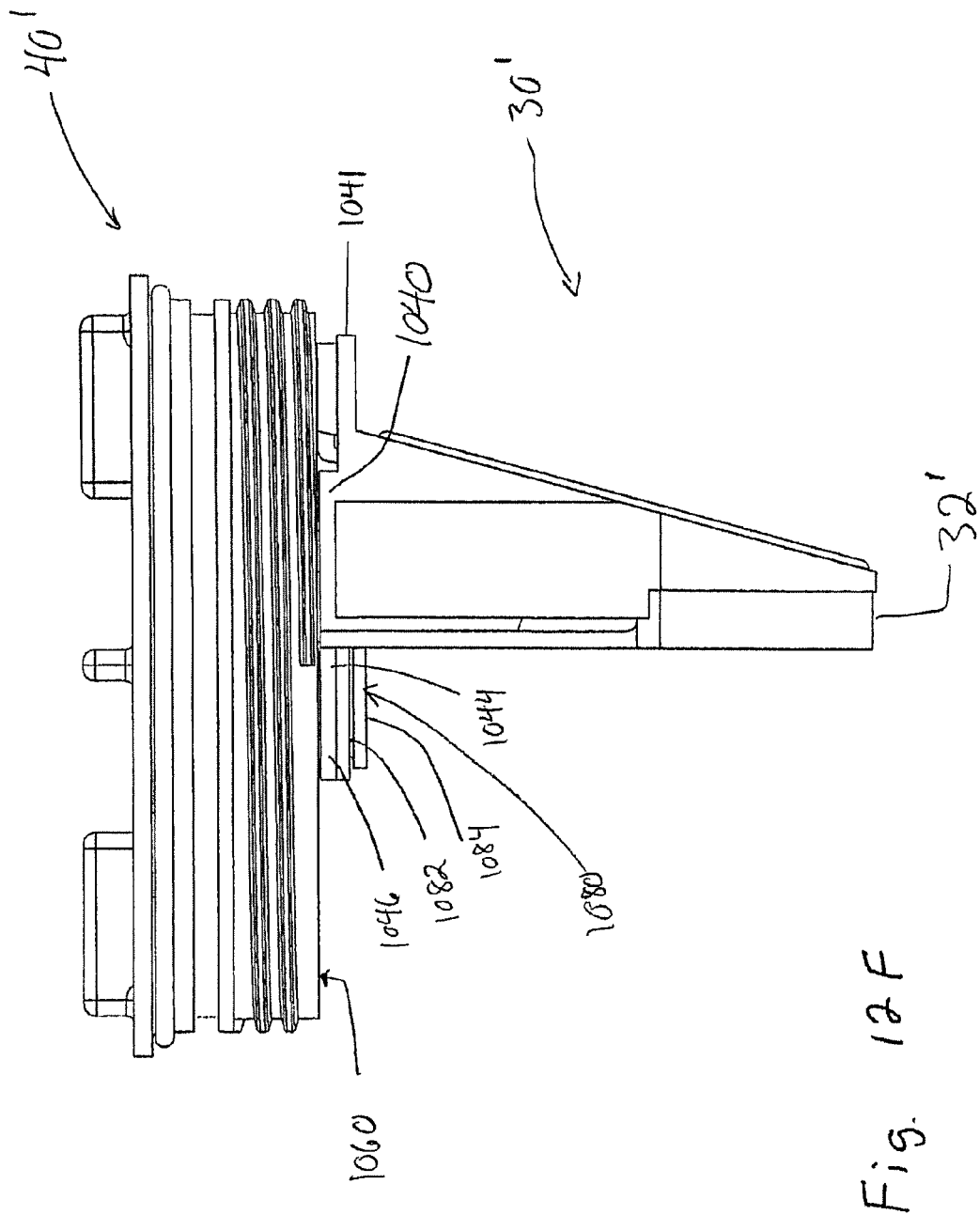

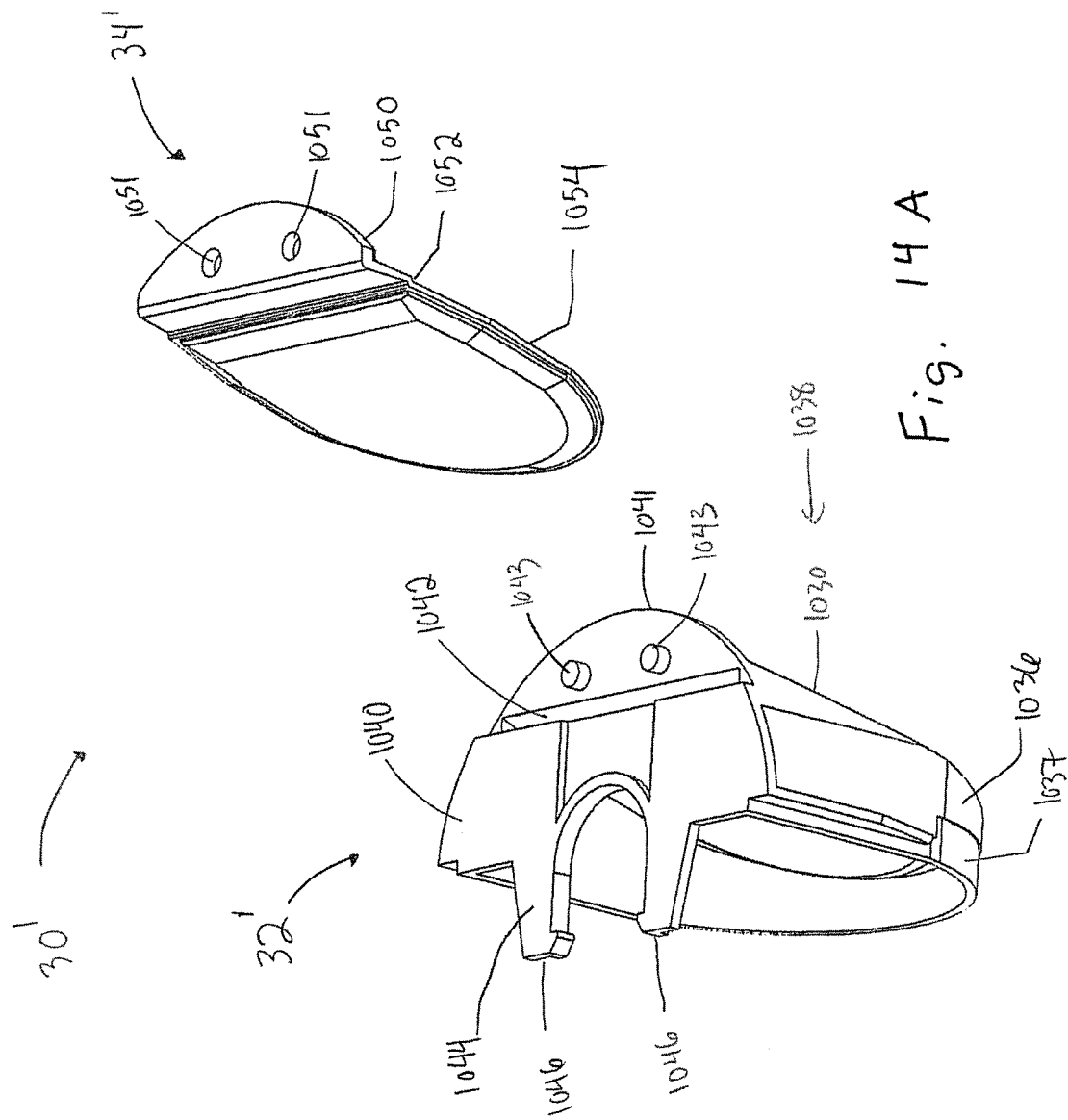

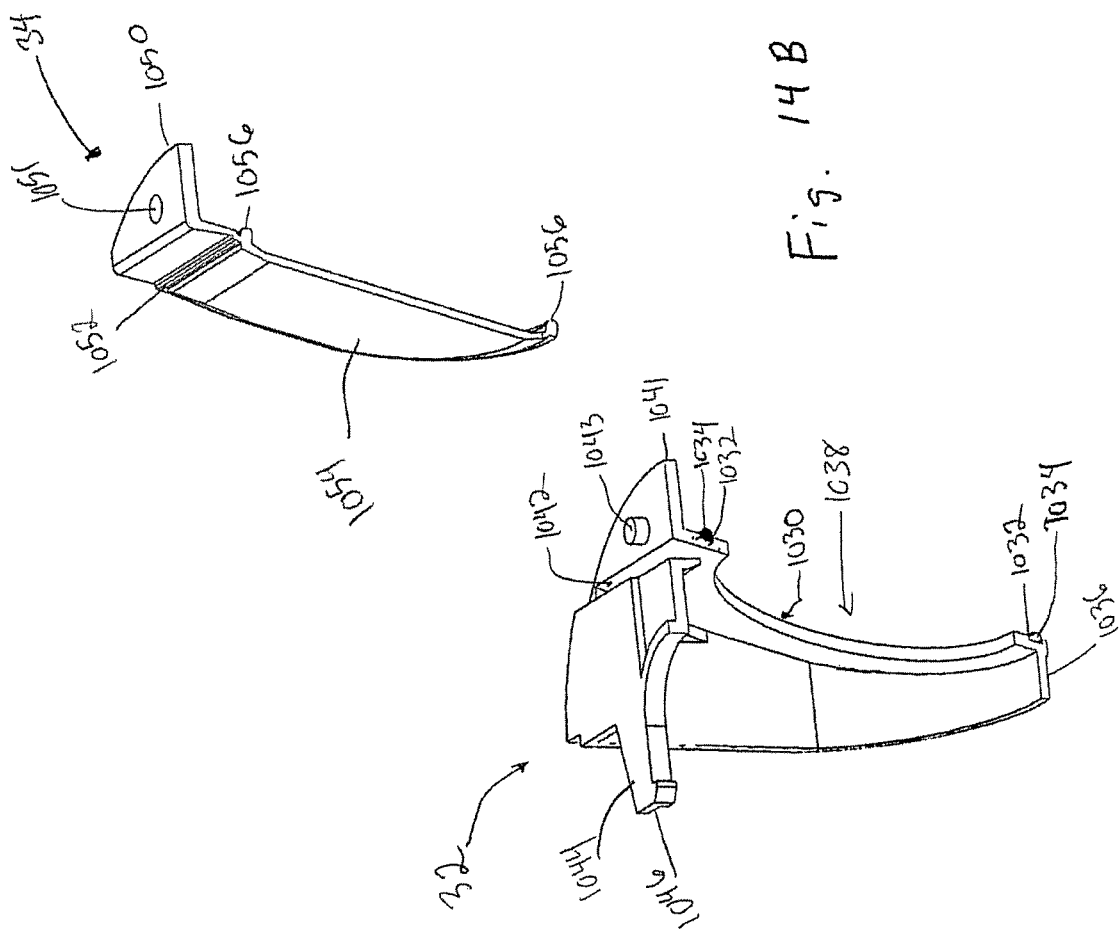

BACKWATER VALVE ASSEMBLY AND METHOD

RELATED APPLICATIONS

The present application claims the benefit of U.S. Provisional Patent Application Ser. No. 61/792,706, filed on Mar. 15, 2013, titled "Backwater Valve Assembly and Method." U.S. Provisional Patent Application Ser. No. 61/792,706 is incorporated herein by reference in its entirety.

FIELD

The present disclosure is generally applicable to a backwater valve assembly and a method for preventing backflow of water or other fluid. More particularly, the backwater valve assembly disclosed herein may be useful to prevent sewage or waste water from backing up into a residence or building as the result of a blocked waste removal system, such as storm or sanitary sewer.

BACKGROUND

Backwater valve assemblies have a broad range of applications and can be used in any application where it is desired that fluid be permitted to flow freely in one direction but be prevented from flowing in the opposite direction as a result of a downstream blockage or backpressure. For example, backwater valve assemblies can be used to prevent sewage or wastewater from backing up into a building as a result of a blockage in a storm or sanitary sewer.

Many residences and buildings are connected to waste removal systems, such as storm or sanitary sewers, via one or more pipe or drain line. Backwater valve assemblies may be employed in one or more of the pipes or drain lines that connect the property to the waste removal system to prevent sewage or waste water from backing up into the building from an obstruction in the storm or sanitary sewer. Backwater valve assemblies generally freely permit sewage and wastewater to flow in a downstream direction away from the building. However, upon a blockage or overfilling of the storm or sanitary sewer, such backwater valve assemblies prevent such sewage or wastewater from flowing in the reverse upstream direction back into the building.

SUMMARY

The present disclosure is directed to a backwater valve assembly for permitting fluid to flow freely in one direction and generally preventing fluid from flowing in the opposite direction. The backwater valve assembly can include a main valve body, a flapper sub-assembly, and a cap. The main valve body includes an inlet, an outlet, an inner surface, and an interior space. The inner surface of the main valve body can define a recess into which the flapper sub-assembly can be removably secured. The flapper sub-assembly can include a main body portion and at least one flapper element coupled to the main body portion such that the flapper element can pivot or move between an open position, in which fluid is permitted to flow from the inlet to the outlet of the main valve body, and a closed position, in which fluid is prevented from flowing in the opposite direction from the outlet to the inlet. The cap can be disposed within a port defined in the main valve body, and the flapper sub-assembly can be removably coupled to the cap such that the flapper sub-assembly and cap can be installed in or removed from the main valve body together as a unitary assembly.

In some embodiments, the flapper element can be disposed at an angle to allow gravity to hold the flapper element against the main body portion when in a closed position. The flapper element can be made of a resilient material and can include a protrusion that creates a generally fluid tight seal against the main body portion when in a closed position. The flapper sub-assembly can include one or more sealing members to create a generally fluid tight seal between the flapper sub-assembly and the main valve body. The cap can accommodate a cap gripping feature having at least one opening configured and dimensioned to receive and interact with a tool that operates to install or remove the cap from the main valve body.

BRIEF DESCRIPTION OF THE DRAWINGS

The accompanying drawings incorporated herein and forming a part of the specification, illustrate several embodiments of the present disclosure and together with the description serve to explain certain principles of the present disclosure.

FIG. 3O shows a rear elevational view of the flapper sub-assembly and cap of the embodiment of the backwater valve assembly illustrated in FIG. 1, with the flapper in the open position.

FIG. 5G shows a perspective view of the embodiment of the backwater valve assembly in FIGS. 5A-5C with the main valve body illustrated in cross-sectional form and the flapper elements in a closed position.

FIG. 10B shows a cross-sectional view of the embodiment of the backwater valve assembly illustrated in FIG. 10A, with the flapper sub-assembly installed in the main valve body.

FIG. 11E shows a bottom plan view of the main valve body and the cap of the embodiment of the backwater valve assembly illustrated in FIGS. 10A-10C.

FIG. 14A shows an exploded perspective view of the flapper sub-assembly of the embodiment of the backwater valve assembly illustrated in FIGS. 10A-10C.

FIG. 14B shows an exploded perspective cross-sectional view of the flapper sub-assembly of the embodiment of the backwater valve assembly illustrated in FIGS. 10A-10C.

DETAILED DESCRIPTION

Figure 1A:
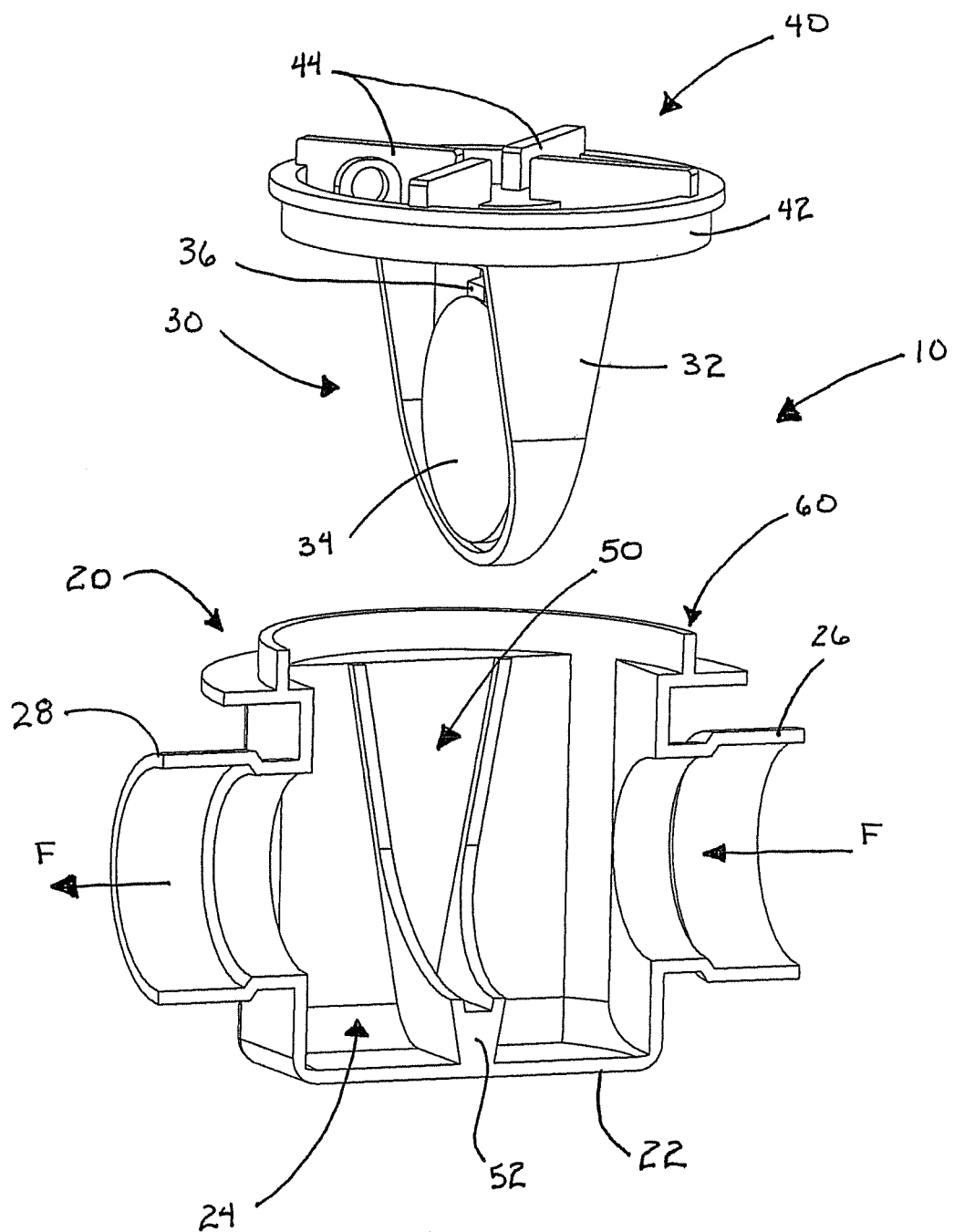
FIG. 1A shows a perspective exploded view of one embodiment of a backwater valve assembly, with the main valve body illustrated in cross-sectional form.

The present disclosure will now be described with occasional reference to specific embodiments of the disclosure. The present disclosure may, however, be embodied in different forms and should not be construed as limited to the embodiments set forth herein. Rather, these embodiments are provided to fully convey the scope of the present disclosure to those skilled in the art and are not intended to limit the scope of the present disclosure in any way.

Also, while the detailed exemplary embodiments described in the specification and illustrated in the drawings relate to backwater valve assemblies described as being useful for preventing sewage or wastewater from backing up into a building from a storm or sanitary sewer, it should be understood that the backwater valve assemblies described herein may be used in connection with any application where it is desired that fluid be permitted to flow freely in one direction but be prevented from flowing in the opposite direction, such as, for example, as a result of a downstream blockage or backpressure.

Except as otherwise specifically defined herein, all terms used herein have the same meaning as commonly understood by one of ordinary skill in the art to which this present disclosure belongs. The terminology used in the description herein is for describing particular embodiments only, and is not intended to be limiting of the present disclosure. As used in the description, the singular forms "a," "an," and "the" are intended to include the plural forms as well, unless the context clearly indicates otherwise.

Unless otherwise indicated, all numbers expressing quantities, properties, and so forth as used in the specification are to be understood as being modified in all instances by the teen "about." Accordingly, unless otherwise indicated, the numerical properties set forth in the following specification are approximations that may vary depending on the desired properties sought to be obtained in embodiments of the present disclosure. Notwithstanding that the numerical ranges and parameters setting forth the broad scope of the present disclosure are approximations, the numerical values to the extent that such are set forth in the specific examples are reported as precisely as possible. Any numerical values, however, inherently contain certain errors necessarily resulting from error found in their respective measurements.

The terms "connecting," "securing," "coupling" and "mounting" as used herein, include but are not limited to affixing, joining, attaching, fixing, fastening, or placing in contact two or more components, elements, assemblies, portions or parts. Connecting, securing, coupling and mounting two or more components, etc., can be direct or indirect such as through the use of one or more intermediary components and may be intermittent or continuous. The term "fluid" as used herein, includes but is not limited to any material that is capable of flowing or exhibits fluid characteristics, such as a liquid or semi-liquid material.

According to an aspect of the present disclosure, a backwater valve assembly is provided that includes a main valve body and one or more flow control elements that permit fluid to flow freely in one direction but generally prevent fluid from flowing in the opposite direction.

According to an aspect of the present disclosure, a backwater valve assembly is provided that includes a main valve body and one or more flapper elements that permit fluid to flow freely in one direction but generally prevent fluid from flowing in the opposite direction.

According to an aspect of the present disclosure, a backwater valve assembly is provided that includes a main valve body that includes a flapper sub-assembly recess and a flapper sub-assembly that is received within the flapper sub-assembly recess of the main valve body, the flapper sub-assembly including one or more flapper elements that permit fluid to flow freely in one direction but generally prevent fluid from flowing in the opposite direction. The flapper sub-assembly is removable from the main valve body to allow for the repair and replacement of the flapper sub-assembly or parts thereof without the need to remove or uninstall the remainder of the backwater valve assembly.

According to an aspect of the present disclosure, a backwater valve assembly is provided that includes a main valve body, a removable cap, and one or more flow control elements that permit fluid to flow freely in one direction but generally prevent fluid from flowing in the opposite direction. The removable cap permits access to the interior of the main valve body to allow for the removal, installation, repair or replacement of the one or more flow control elements.

According to an aspect of the present disclosure, a backwater valve assembly is provided that includes a main valve body, and a removable cap and a flapper sub-assembly that are coupled together. The main valve body includes a flapper sub-assembly recess for receiving the flapper sub-assembly, which includes one or more flapper elements that permit fluid to flow freely in one direction but generally prevent fluid from flowing in the opposite direction. The removable cap and flapper sub-assembly that are coupled to one another are removable from the main valve body to allow for the repair and replacement of the flapper sub-assembly or parts thereof without the need to remove or uninstall the remainder of the backwater valve assembly.

According to an aspect of the present disclosure, a backwater valve assembly is provided that includes a main valve body, a removable cap, and one or more flow control elements that permit fluid to flow freely in one direction but generally prevent fluid from flowing in the opposite direction. The removable cap of various embodiments of the backwater valve assembly may include a component or feature that provides for the installation, removal, tightening and/or adjusting of the removable cap by use of a tool from a position located a distance from the backwater valve assembly. The ability to install, remove, tighten, and/or adjust the removable cap from a position located at a distance from the backwater valve assembly permits access to the interior of the main valve body even if the main valve body is buried beneath the ground or in another location that would otherwise be inaccessible. In this manner, the one or more flow control elements may be removed, installed, repaired or replaced without the need to remove or uninstall the remainder of the backwater valve assembly.

According to an aspect of the present disclosure, a backwater valve assembly is provided that includes a main valve body, and a removable cap and flapper sub-assembly that are removably coupled together. The main valve body includes a flapper sub-assembly recess for receiving the flapper sub-assembly, the flapper sub-assembly including one or more flapper elements that permit fluid to flow freely in one direction but generally prevent fluid from flowing in the opposite direction. The removable cap includes a component or feature that provides for the installation, removal, tightening and/or adjusting of the removable cap by use of a tool from a position located a distance from the backwater valve assembly. The removable cap and flapper sub-assembly are coupled together, thus providing for the removal of both the removable cap and flapper sub-assembly from the backwater valve assembly from a position located at a distance from the backwater valve assembly, thus providing for the repair and replacement of the flapper sub-assembly or parts thereof without the need to remove or uninstall the remainder of the backwater valve assembly. In this manner, the flapper sub-assembly may be removed or installed from a position located at a distance from the backwater valve assembly to allow for the repair or replacement of the flapper sub-assembly even if the main valve body is buried beneath the ground or in another location that would otherwise be inaccessible.

According to an aspect of the present disclosure, a backwater valve assembly is provided that includes a main valve body, one or more flow control elements that permit fluid to flow freely in one direction but generally prevent fluid from flowing in the opposite direction, a removable cap and a tool for installing, removing, tightening, and/or adjusting the cap from a position located a distance from the backwater valve assembly.

According to an aspect of the present disclosure, a backwater valve assembly is provided that includes a main valve body and a removable cap and flapper sub-assembly that are coupled together. The flapper sub-assembly is received within a flapper sub-assembly recess of the main valve body and includes one or more flow control elements that pei iit fluid to flow freely in one direction but generally prevent fluid from flowing in the opposite direction. A tool is provided for installing or removing the removable cap and flapper sub-assembly that are coupled together from a position located a distance from the backwater valve assembly.

According to an aspect of the present disclosure, a method is provided for installing, repairing and/or maintaining a backwater valve assembly that includes a main valve body and one or more flow control elements that permit fluid to flow freely in one direction but generally prevent fluid from flowing in the opposite direction.

Features and advantages of the present disclosure will be set forth in part in the description which follows, and in part will be obvious from the description, or may be learned by practice of the present disclosure. The accompanying drawings, which are incorporated in and constitute a part of this specification, illustrate several embodiments of the present disclosure, and together with the description, serve to explain the principles of the present disclosure.

Figure 1B:
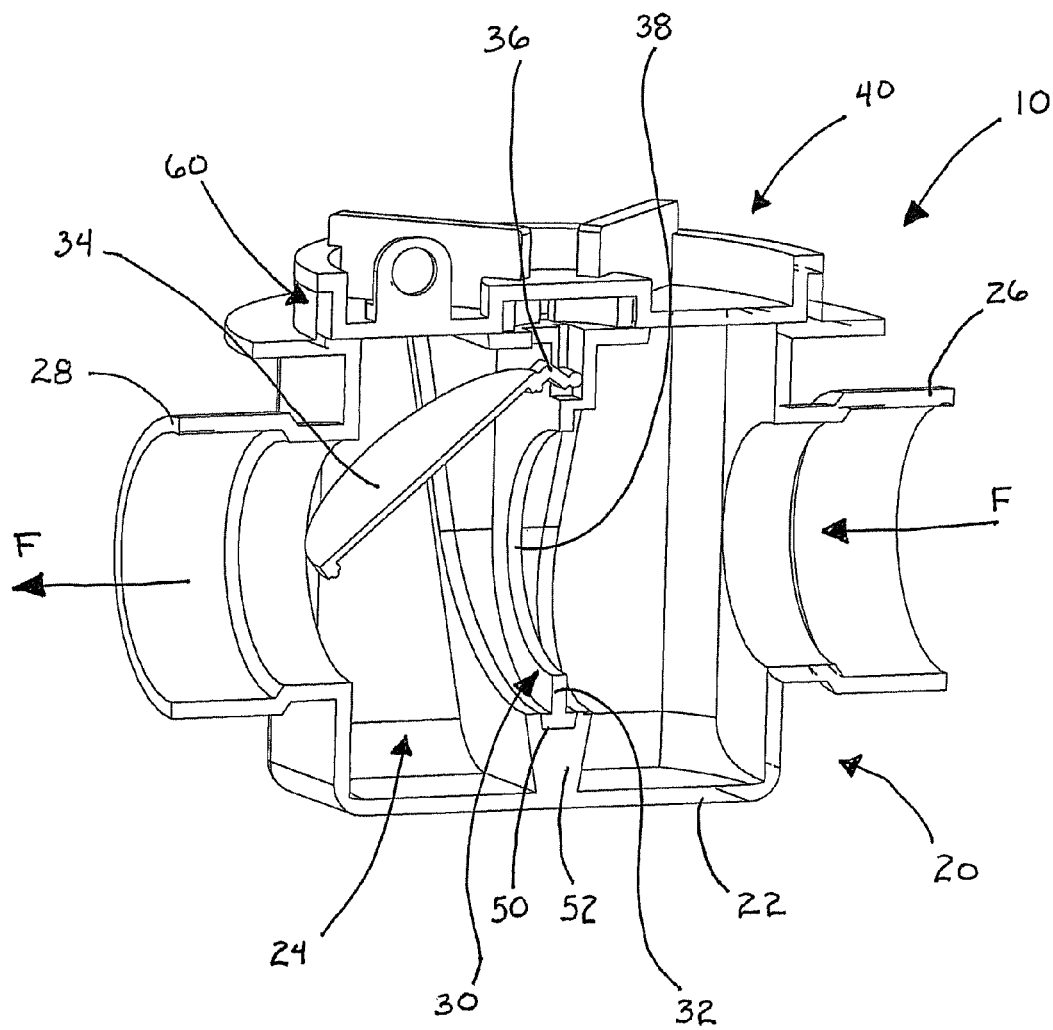
FIG. 1B shows a perspective, cross-sectional view of the embodiment of the backwater valve assembly illustrated in FIG. 1, with the flapper in the open position.
Figure 1C:
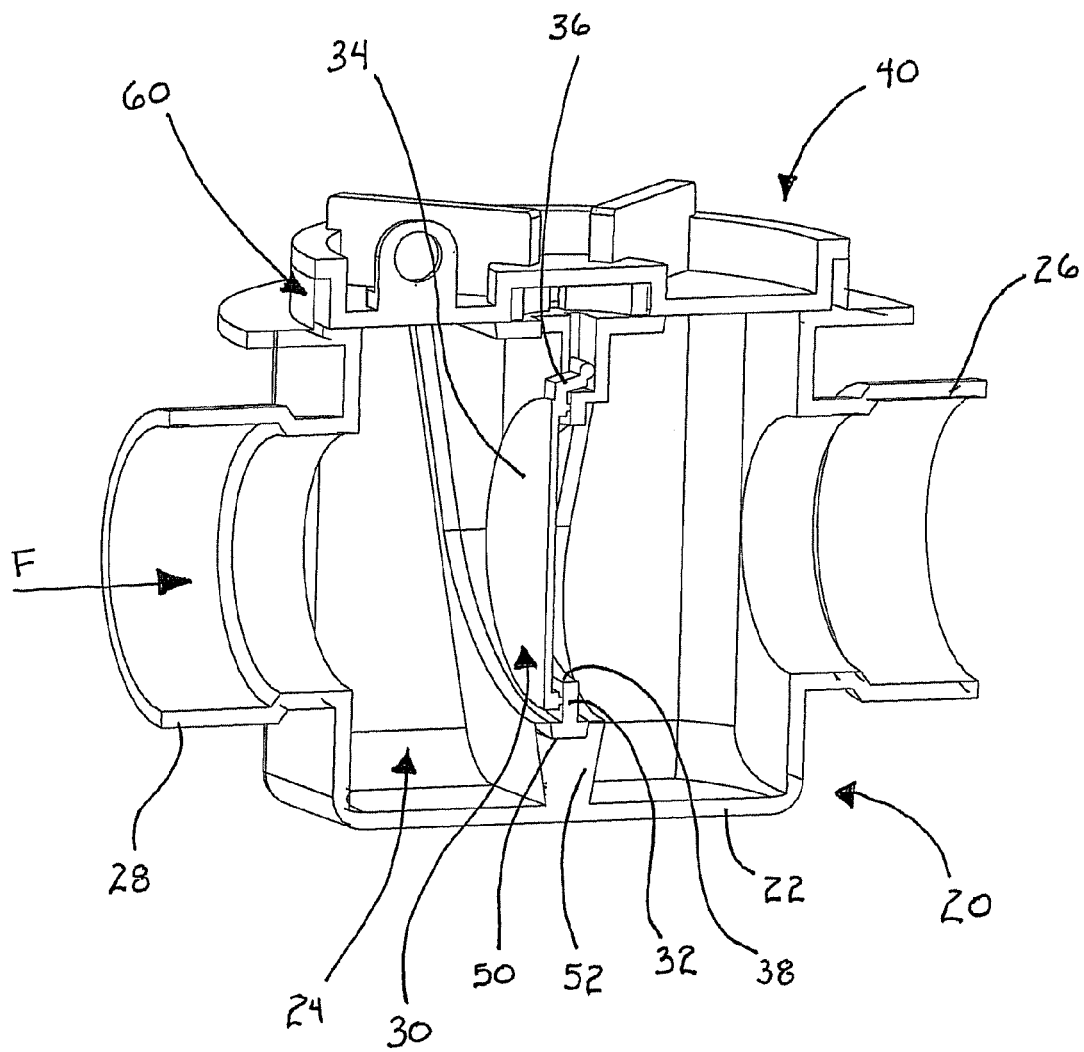
FIG. 1C shows a perspective, cross-sectional view of the embodiment of the backwater valve assembly illustrated in FIG. 1, with the flapper in the closed position.
Figure 2A:
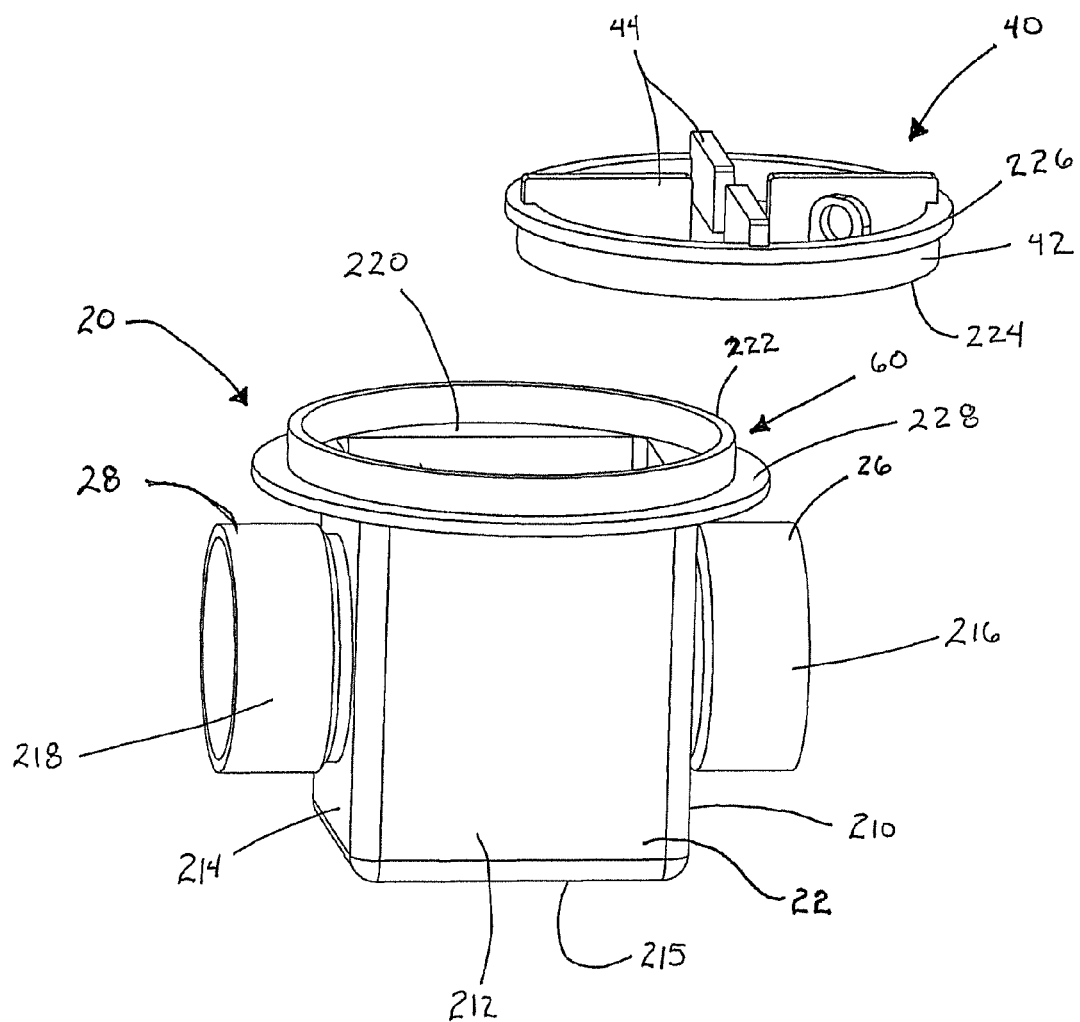
FIG. 2A shows an exploded perspective view of the main valve body and the cap of the embodiment of the backwater valve assembly illustrated in FIG. 1.
Figure 2B:
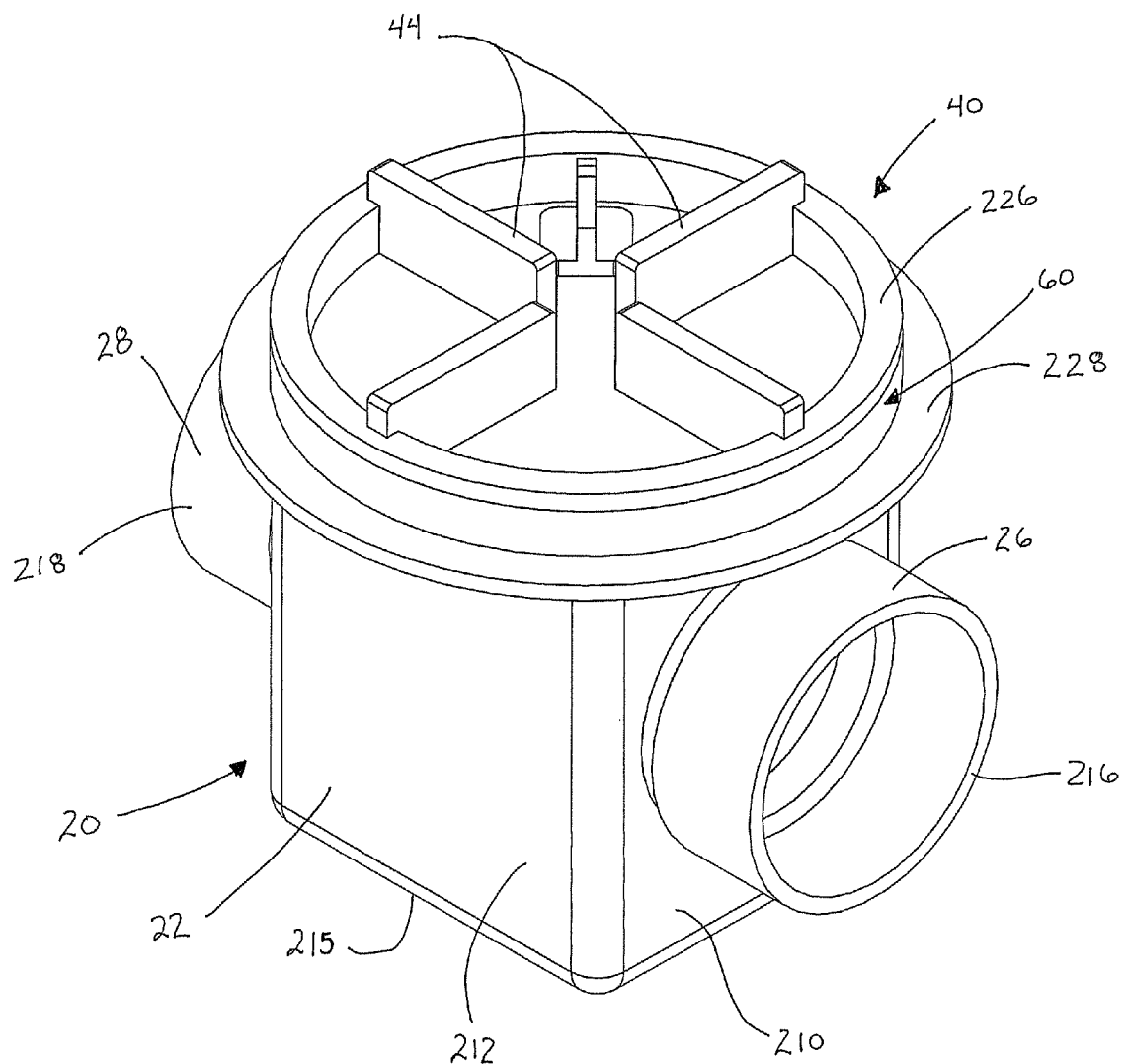
FIG. 2B shows a perspective view of the main valve body and the cap of the embodiment of the backwater valve assembly illustrated in FIG. 1.
Figure 2C:
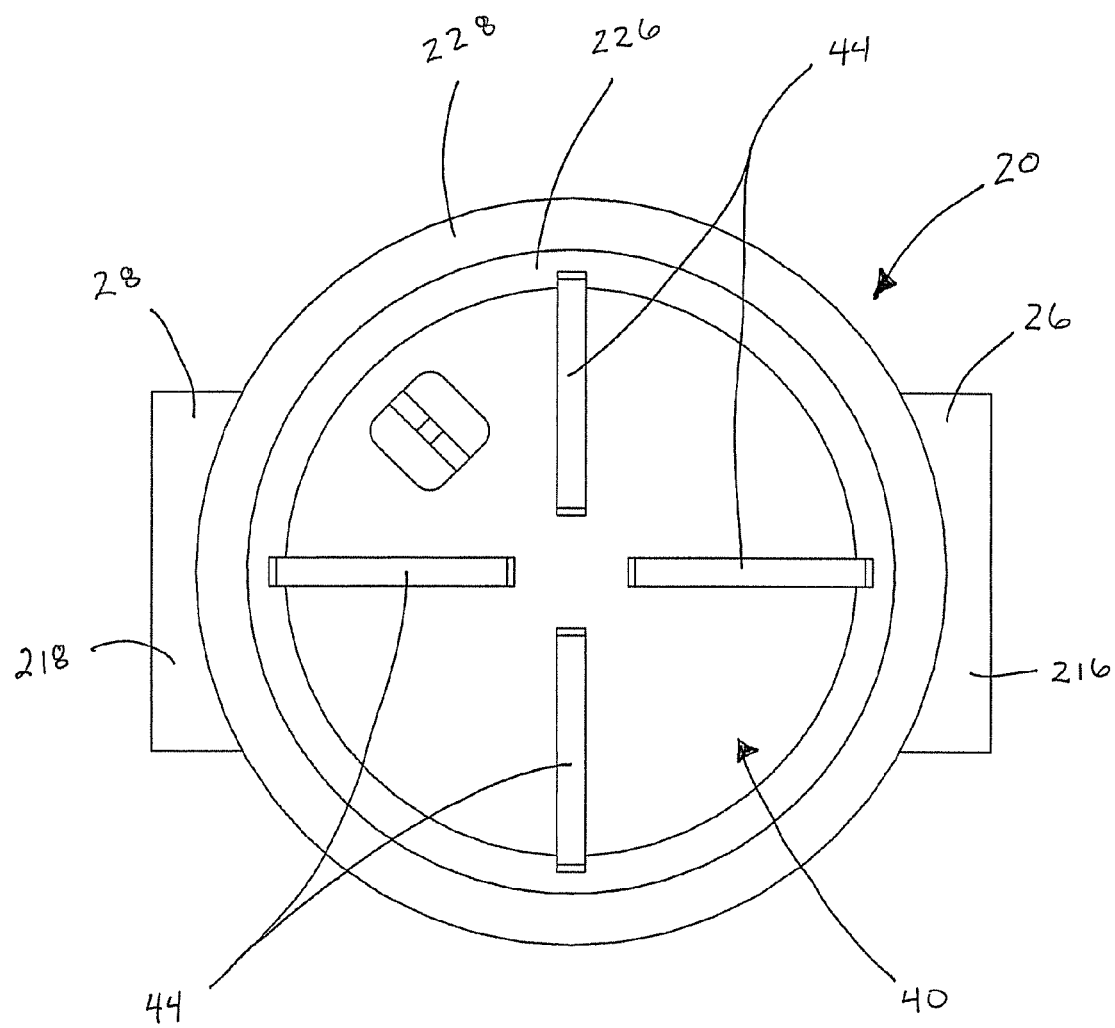
FIG. 2C shows a top plan view of the main valve body and the cap of the embodiment of the backwater valve assembly illustrated in FIG. 1.
Figure 2D:
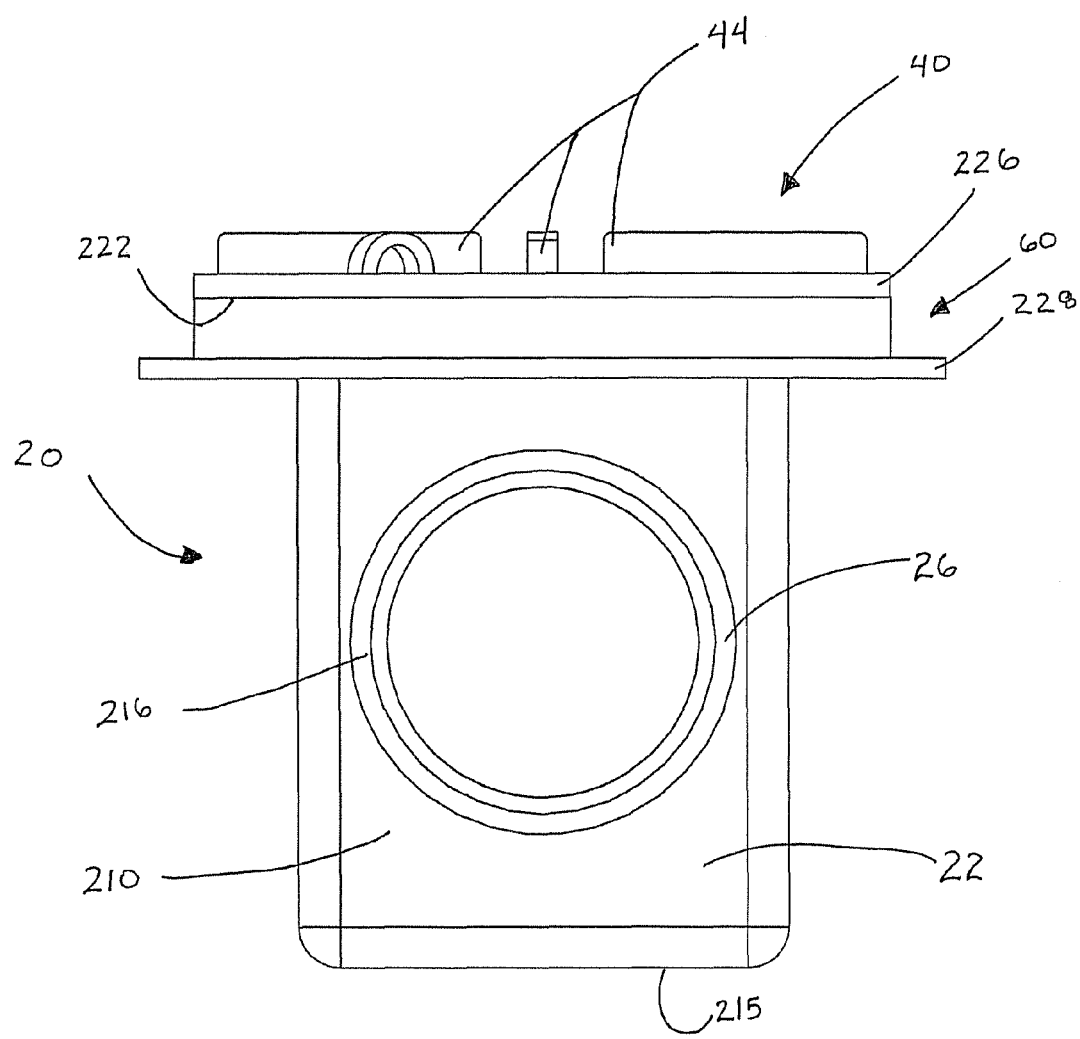
FIG. 2D shows a front elevational view of the main valve body and the cap of the embodiment of the backwater valve assembly illustrated in FIG. 1.
Figure 2E:
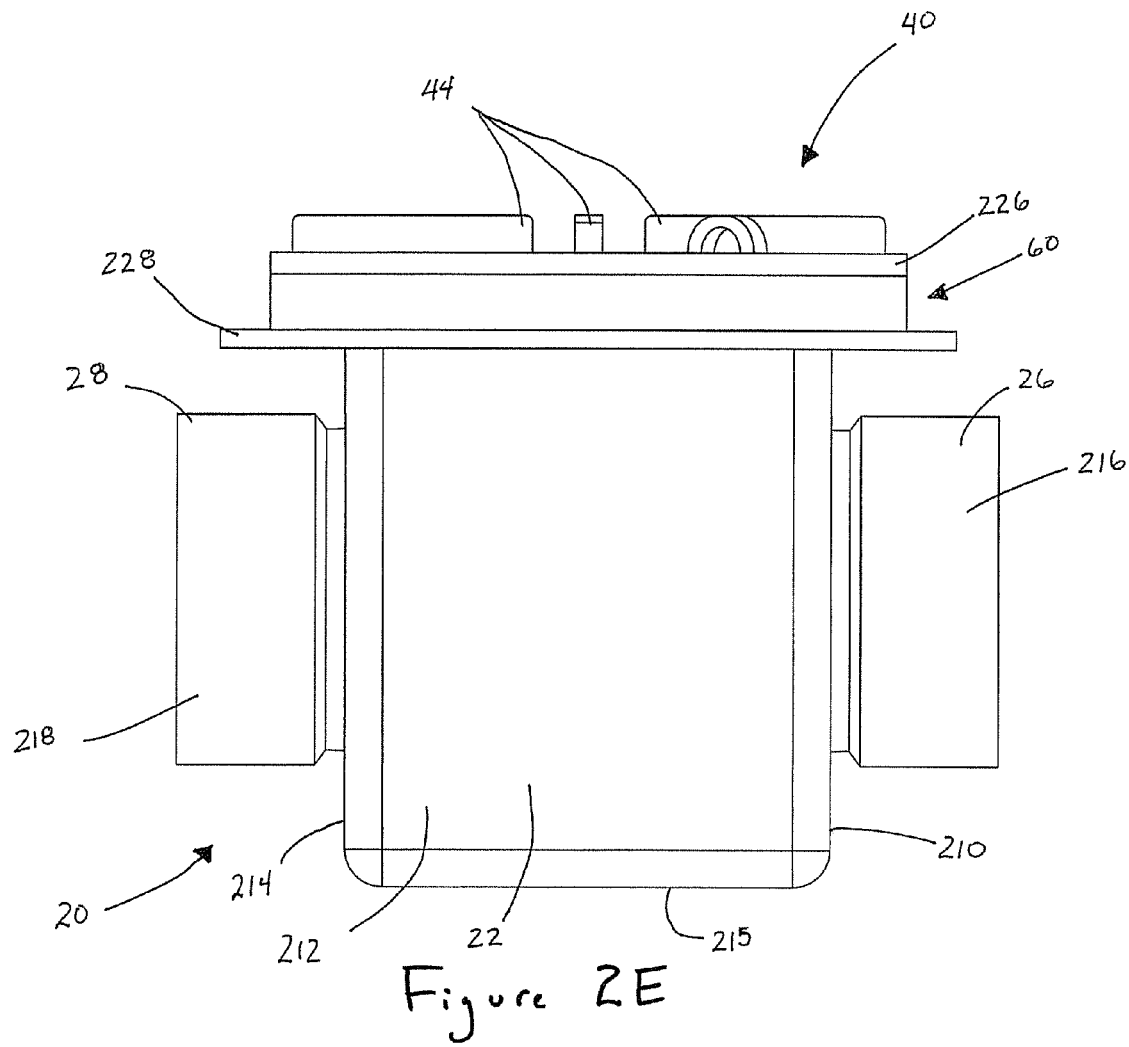
FIG. 2E shows a side elevational view of the main valve body and the cap of the embodiment of the backwater valve assembly illustrated in FIG. 1.
Figure 2F:
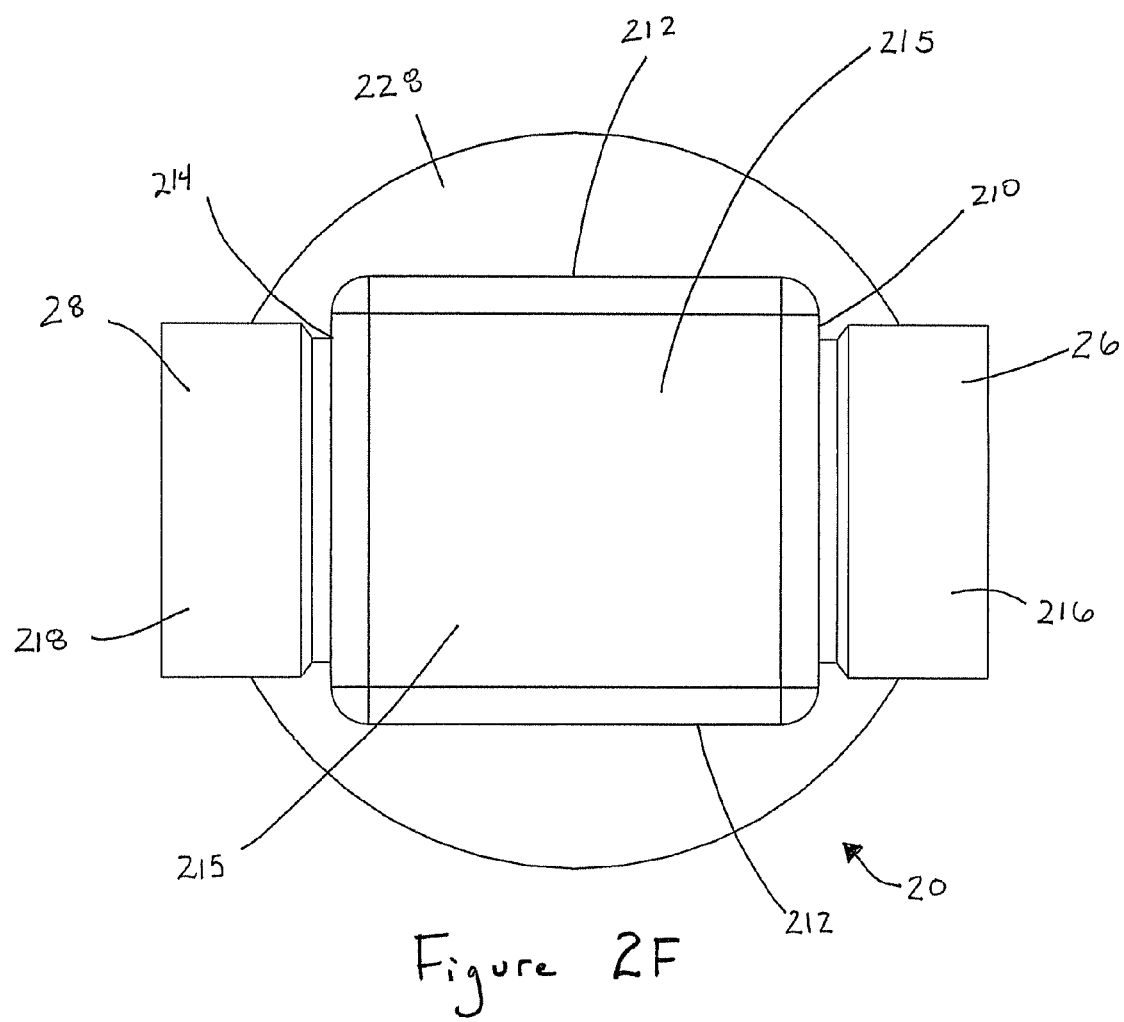
FIG. 2F shows a bottom plan view of the main valve body and the cap of the embodiment of the backwater valve assembly illustrated in FIG. 1.

Referring to FIGS. 1A-1C, one exemplary embodiment of a backwater valve assembly 10 is illustrated. The exemplary backwater valve assembly 10 generally includes a main valve body 20, a flapper sub-assembly 30 and a cap 40. The main valve body 20 of the exemplary embodiment of the backwater valve assembly 10 generally includes a main wall 22 that defines an interior space 24, an inlet 26 and an outlet 28.

The flapper sub-assembly 30 of the exemplary illustrated embodiment of FIGS. 1A-1C generally includes a main body portion 32 and a flapper 34 pivotally connected to the main body portion 32 by a pivot element 36. A flapper sub-assembly recess 50 is defined by wall 52 of the main valve body 20 that receives the main body portion 32 of the flapper sub-assembly 30. The flapper 34 pivots on pivot element 36 relative to the main body portion 32 between an open position in which opening 38 defined through the main body portion 32 of the flapper sub-assembly 30 is uncovered (as illustrated in FIG. 1B) and a closed position in which the flapper covers opening 38 (as illustrated in FIG. 1C).

Referring to FIG. 1B, when the flapper 34 is in the open position, the inlet 26, interior 24 of the central portion 22 of the main valve body 20, opening 38 of main body portion 32 of flapper sub-assembly 30, and the outlet 28 combine to define a fluid flow path "F" through the backwater valve assembly 10. With the flapper 34 in the open position, fluid is free to flow from an upstream location (e.g., building or residence) of the main valve body 20, through the inlet 26, through the interior 24 of the main valve body 20, through opening 38 of main body portion 32 of flapper sub-assembly 30, and out of the outlet 28 to a downstream location (e.g., storm or sanitary sewer) of the backwater valve assembly 10. In this manner, the flapper 34 permits fluid to flow freely from a location upstream of the backwater valve assembly 10, through the backwater valve assembly 10 and out the outlet 28 when in the open position.

However, if fluid enters the backwater valve assembly 10 from a position downstream of the backwater valve assembly 10 through the outlet 28 in the direction of flow path "F" illustrated in FIG. 1C, flapper 34 will pivot to the closed position in response to the fluid flow and cover over opening 38, thus preventing fluid from flowing from a location downstream of the backwater valve assembly through the backwater valve assembly 10 and out through the inlet 26. In this manner, the exemplary embodiment of the backwater valve assembly 10 of the present disclosure may be used to prevent sewage or waste water from backing up into a residence or building as the result of a blocked waste removal system, such as storm or sanitary sewer at a location downstream from the backwater valve assembly 10.

Referring again to FIGS. 1A-1C, in the illustrated exemplary embodiment of backwater valve assembly 10, cap 40 is connected with the main valve body to enclose the interior 24 of the main valve body 20. When the flapper sub-assembly 30 is mounted within the backwater valve assembly 10 of the embodiment illustrated in FIGS. 1A-1C, the cap 40 also serves to retain the flapper subassembly 30 within the flapper sub-assembly recess 50 of the main valve body 20. Cap 40 of the illustrated exemplary embodiment includes a mounting portion 42 which is adapted for receipt within port 60 of main valve body 20 to provide a fluid tight seal between cap 40 and main valve body 20. The cap 40 may be mounted within port 60 in a variety of ways in various embodiments. For example, the mounting portion 42 of the cap 40 may include threads that mate with corresponding threads defined within port 60, the cap 40 may be retained within port 60 by a friction fit, the cap 40 may be retained within port 60 by use of locking tabs that fit within corresponding slots in the port 60, or the cap 40 may be retained within port 60 in any other suitable manner. In embodiments that include a cap 40 that is threadably engaged with port 60, cap 40 and port 60 may be dimensioned and configured to accommodate engagement of threads defined within the interior of port 60 with threads defined on the exterior of mounting portion 42 or to accommodate engagement of threads defined on the exterior of port 60 with threads defined on the interior of mounting portion 42. Cap 40 of the exemplary embodiment includes a plurality of ribs 44 that may serve to provide the strength and rigidity. Ribs 44 may also be used to assist in turning the cap 40 to screw the cap 40 within port 60 in embodiments where the cap 40 is threadably engaged with port 60.

Referring now to FIGS. 2A-2F, the main valve body 20 and cap 40 of the exemplary embodiment illustrated in FIGS. 1A-1C are shown in greater detail. The illustrated exemplary embodiment of main valve body 20 includes a front wall 210, side walls 212, rear wall 214 and bottom wall 215 that combine to form the partially enclosed interior 24 of main valve body 20. In the illustrated exemplary embodiment, inlet 26 and outlet 28 are conduits 216 and 218 that extend outwardly from main valve body 20, however, in additional embodiments the inlet 26 and 28 may be shaped or configured differently. For example, the inlet 26 and outlet 28 may merely be flanges or openings defined within one or more of the walls 210, 212, 214 and 215 of the main valve body 20. While the inlet 26 and outlet 28 have circular cross-sectional shapes in the illustrated embodiment, it should be understood that the inlet 26 and outlet 28 may have a variety of different cross-sectional shapes and configurations in additional embodiments.

The exemplary embodiment of main valve body 20 illustrated in FIGS. 2A-2F includes surface 220. When cap 40 is mounted within port 60, the bottom surface 224 of mounting portion 42 of cap 40 abuts surface 220 when cap 40 has been fully inserted to provide a firm seat for cap 40 within the main valve body 20. Cap 40 of the exemplary illustrated embodiment includes rim 226 that abuts top surface 222 of port 60 when cap 40 has been fully inserted within port 60. The illustrated embodiment of main valve body 20 includes rim 228 that project outwardly from port 60. However, it should be understood that the main valve body 20 and cap 40 may have a variety of shapes and configurations in additional embodiments, and may be provided without surface 220, rim 226 or rim 228.

Figure 3A:
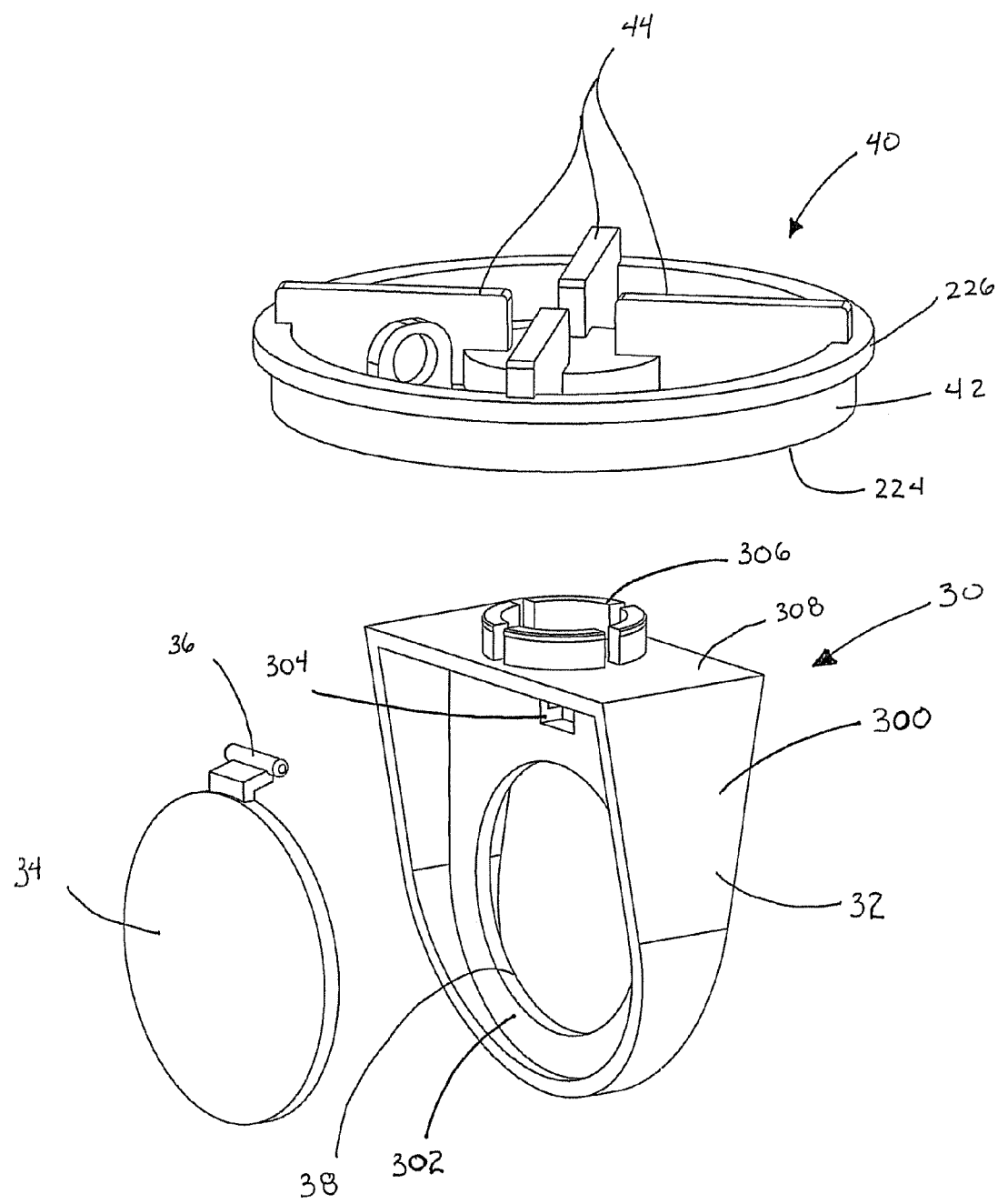
FIG. 3A shows a front exploded perspective view of the flapper sub-assembly and cap of the embodiment of the backwater valve assembly illustrated in FIG. 1.
Figure 3B:
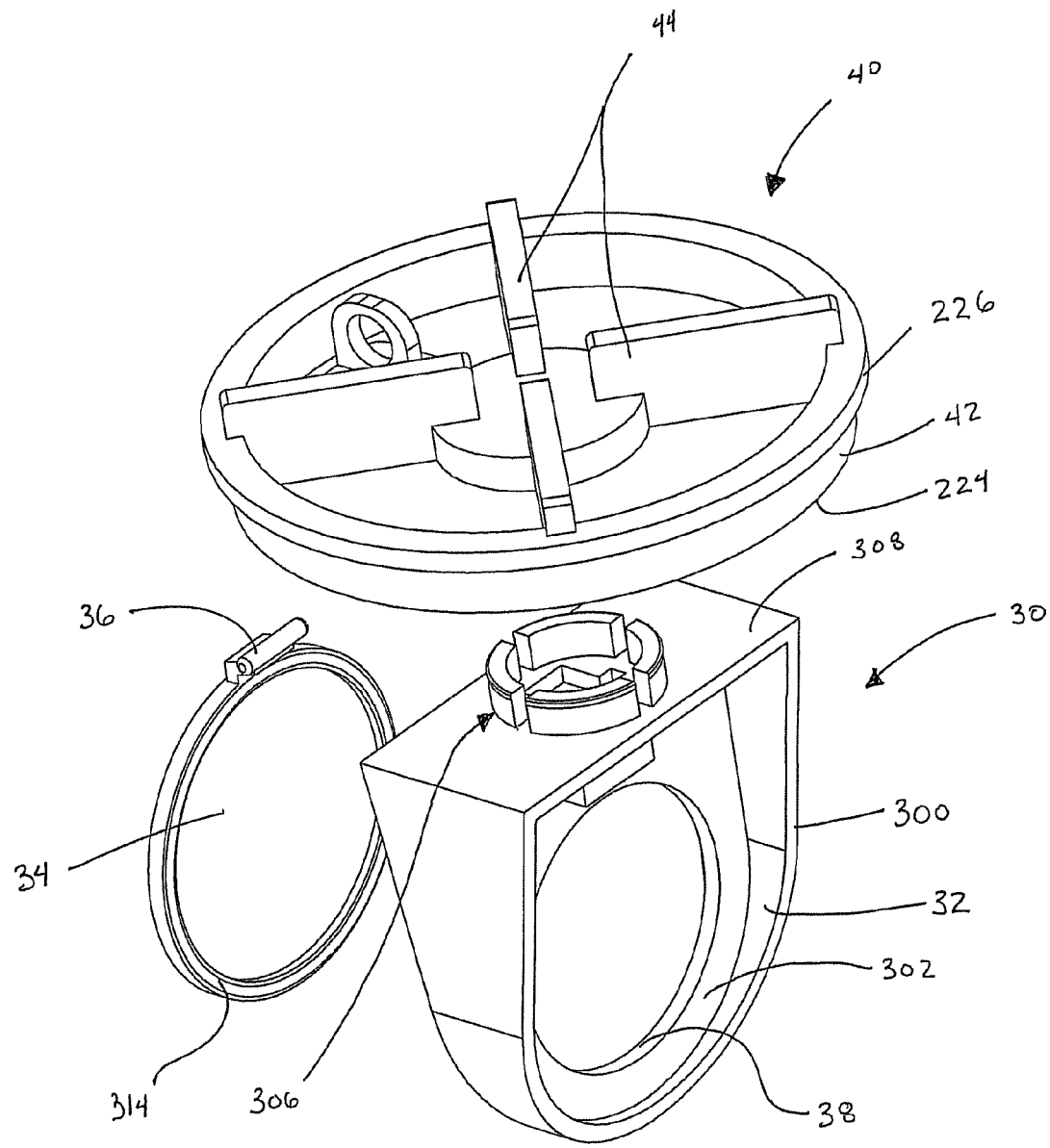
FIG. 3B shows a rear exploded perspective view of the flapper sub-assembly and cap of the embodiment of the backwater valve assembly illustrated in FIG. 1.
Figure 3C:
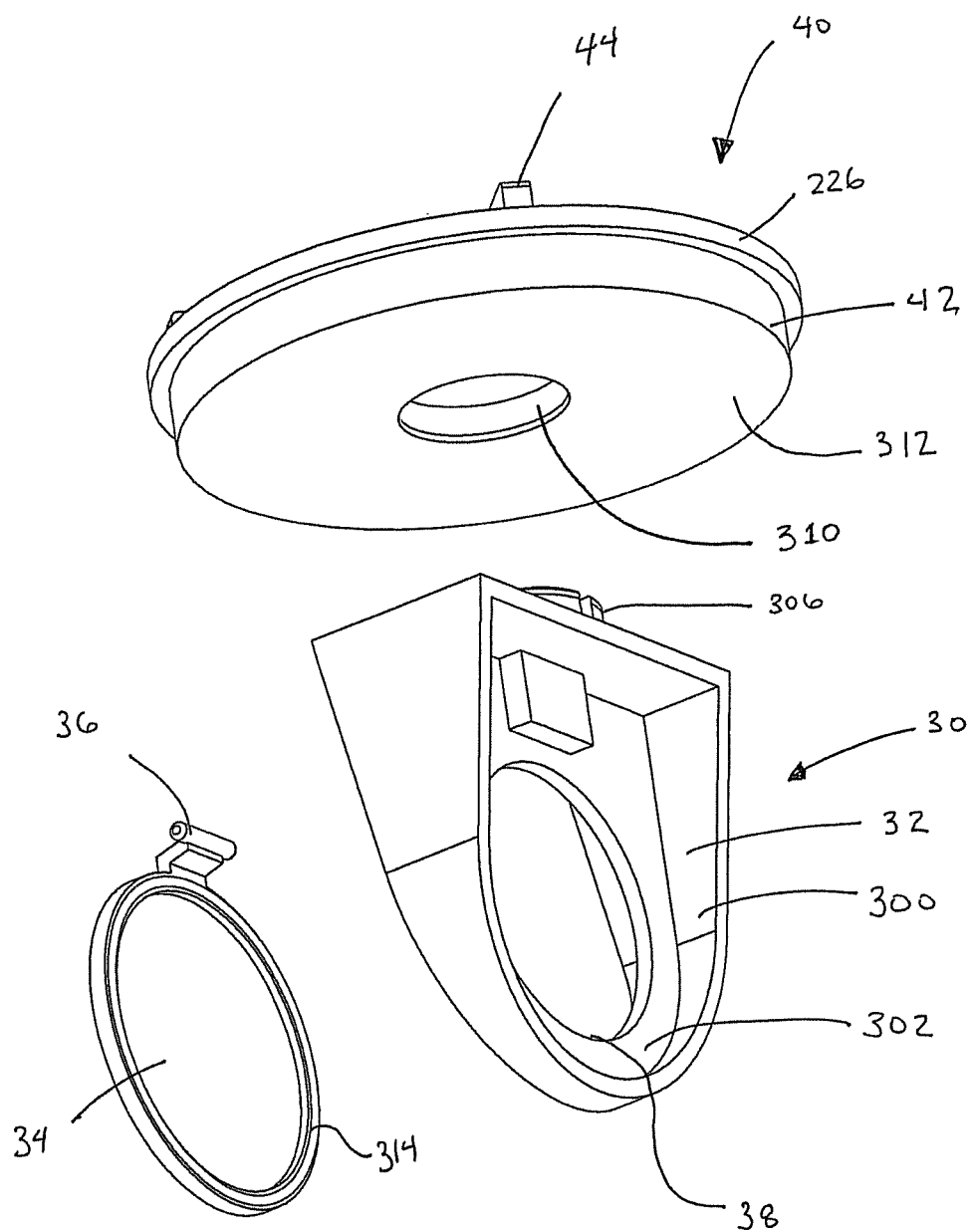
FIG. 3C shows a bottom exploded perspective view of the flapper sub-assembly and cap of the embodiment of the backwater valve assembly illustrated in FIG. 1.
Figure 3D:
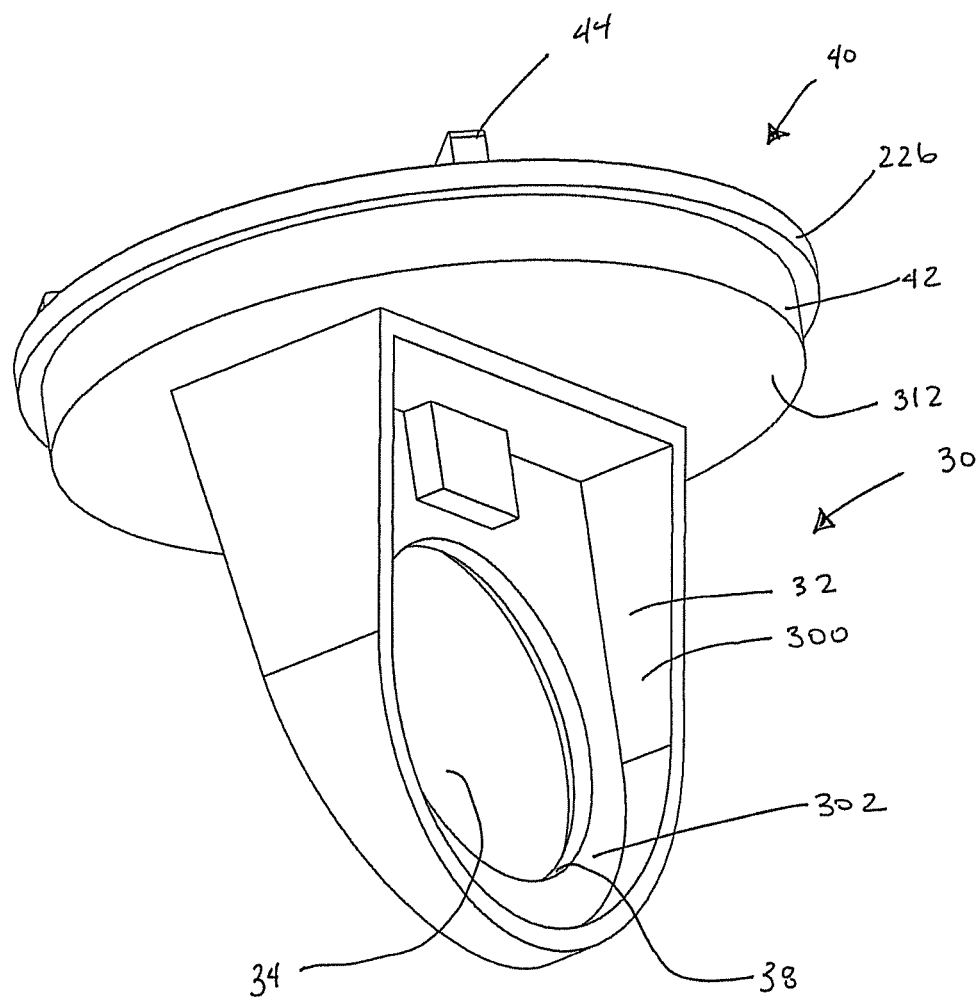
FIG. 3D shows a bottom perspective view of the flapper sub-assembly and cap of the embodiment of the backwater valve assembly illustrated in FIG. 1, with the flapper in the closed position.
Figure 3E:
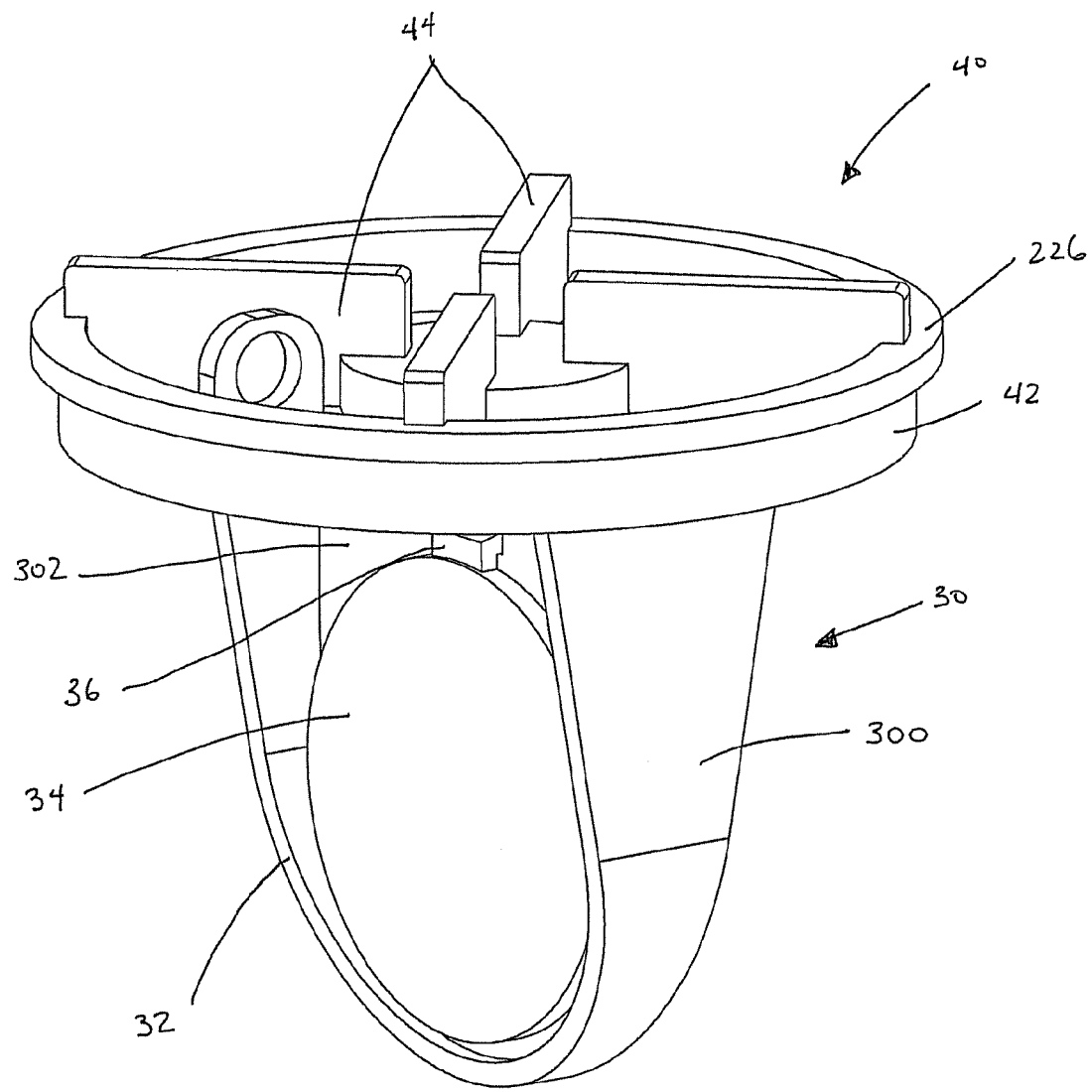
FIG. 3E shows a front perspective view of the flapper sub-assembly and cap of the embodiment of the backwater valve assembly illustrated in FIG. 1, with the flapper in the closed position.
Figure 3F:
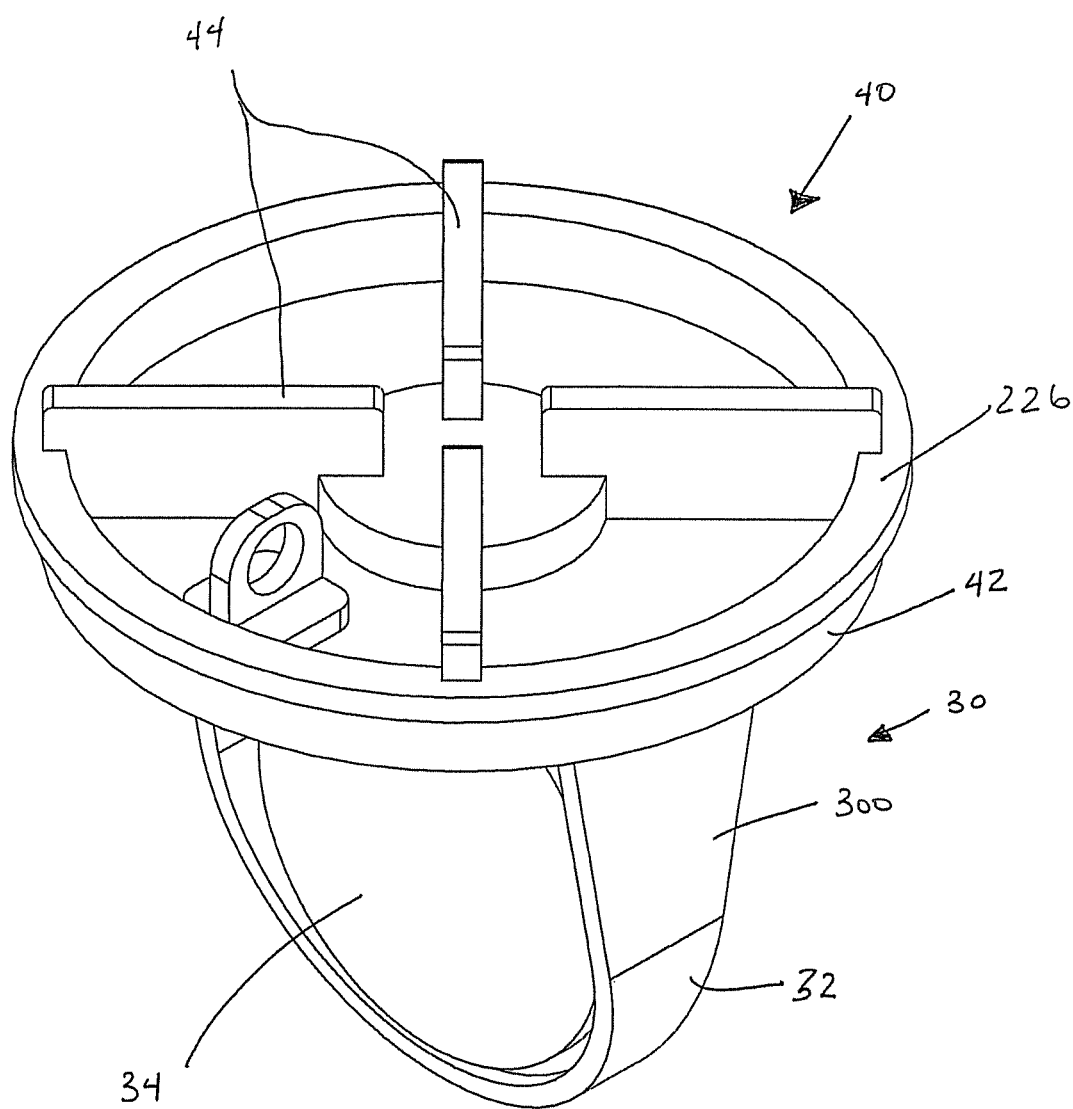
FIG. 3F shows a top perspective view of the flapper sub-assembly and cap of the embodiment of the backwater valve assembly illustrated in FIG. 1, with the flapper in the closed position.
Figure 3G:
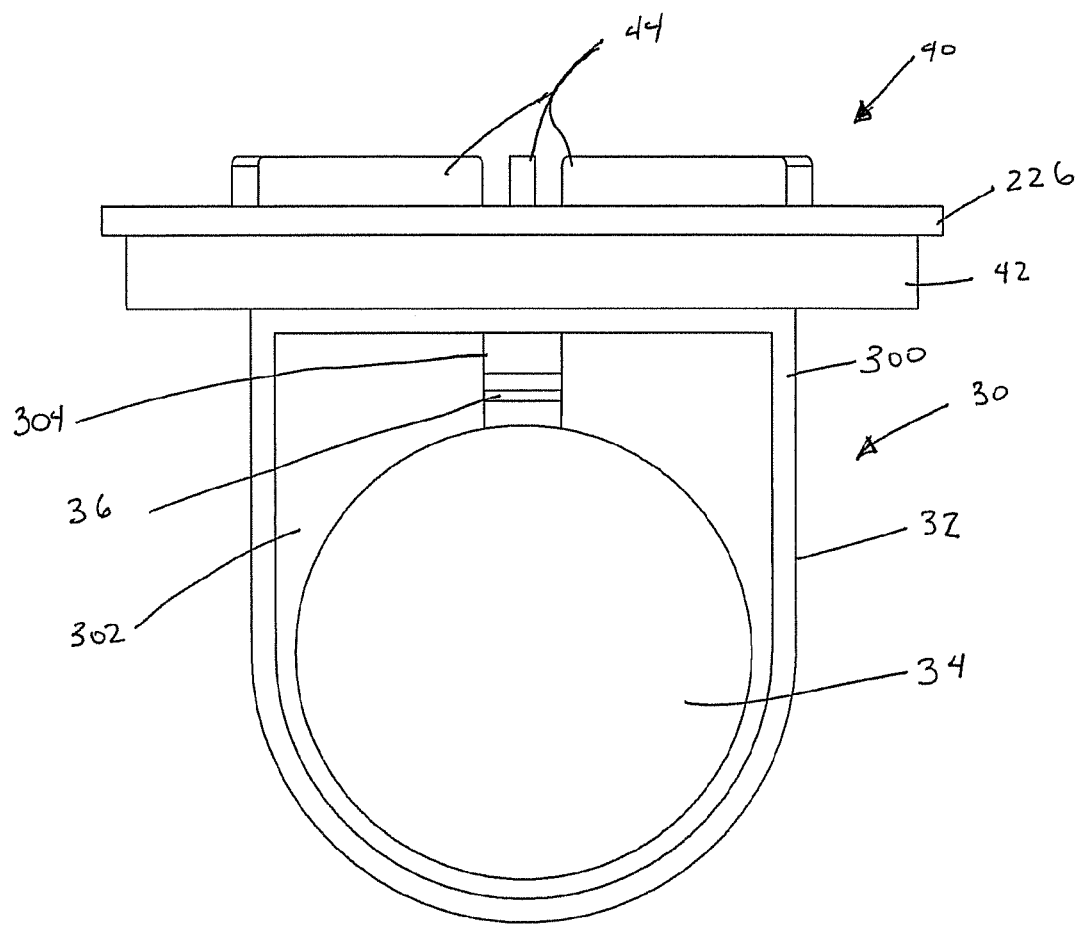
FIG. 3G shows a front plan view of the flapper sub-assembly and cap of the embodiment of the backwater valve assembly illustrated in FIG. 1, with the flapper in the closed position.
Figure 3H:
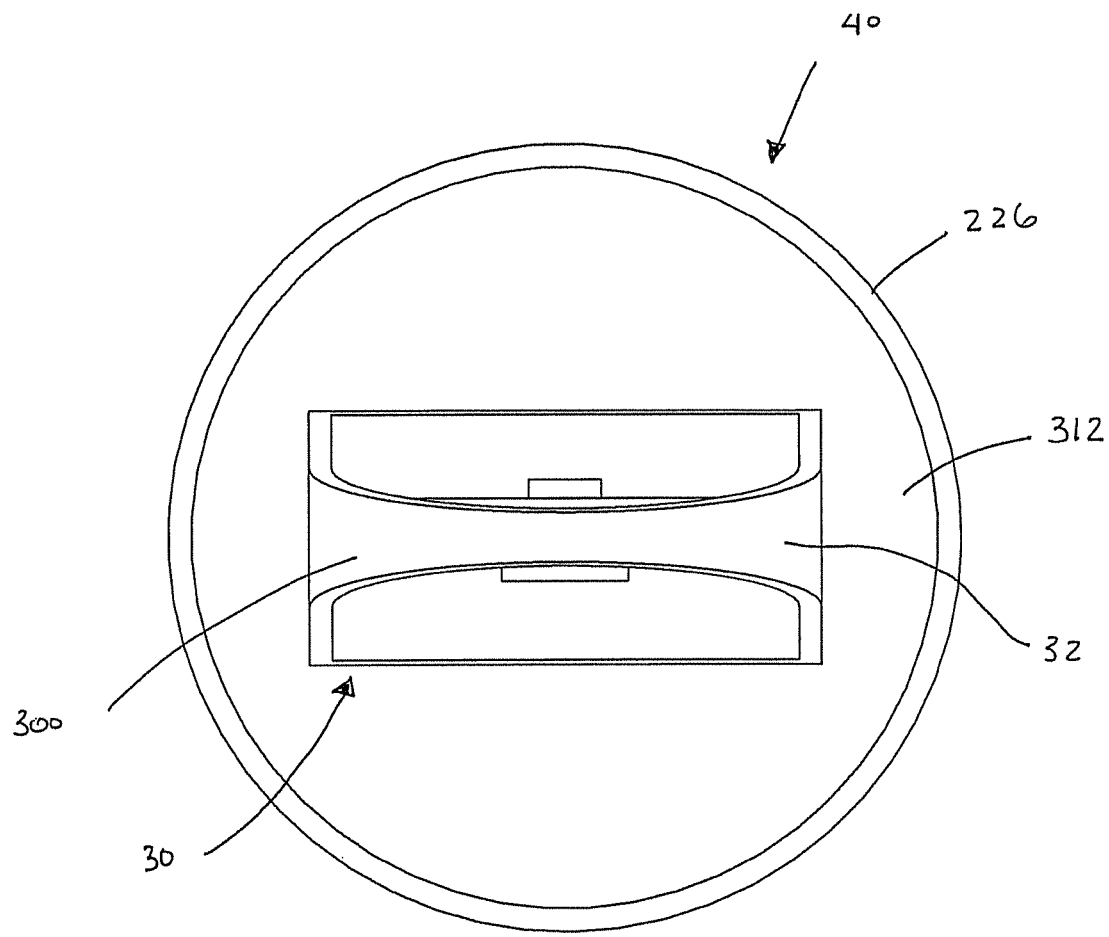
FIG. 3H shows a bottom plan view of the flapper sub-assembly and cap of the embodiment of the backwater valve assembly illustrated in FIG. 1, with the flapper in the closed position.
Figure 3I:
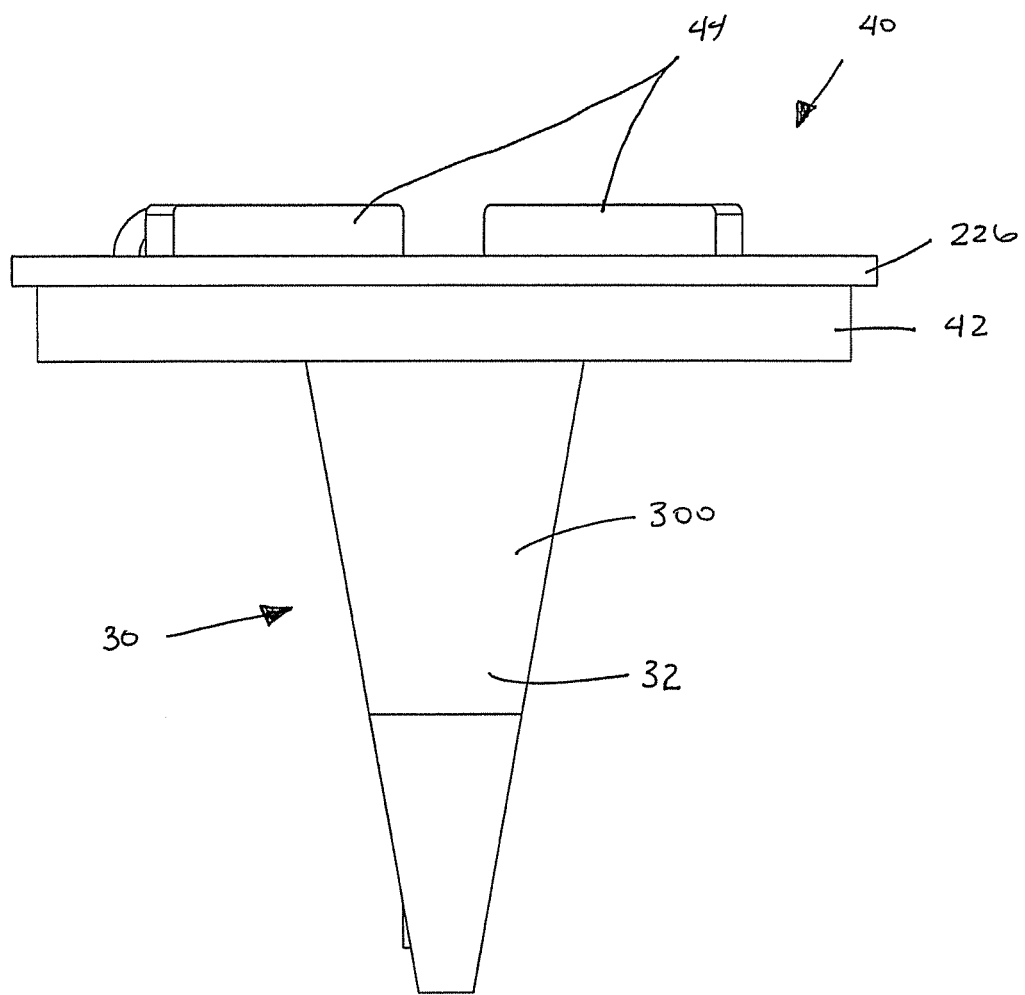
FIG. 3I shows a side elevational view of the flapper sub-assembly and cap of the embodiment of the backwater valve assembly illustrated in FIG. 1, with the flapper in the closed position.
Figure 3J:
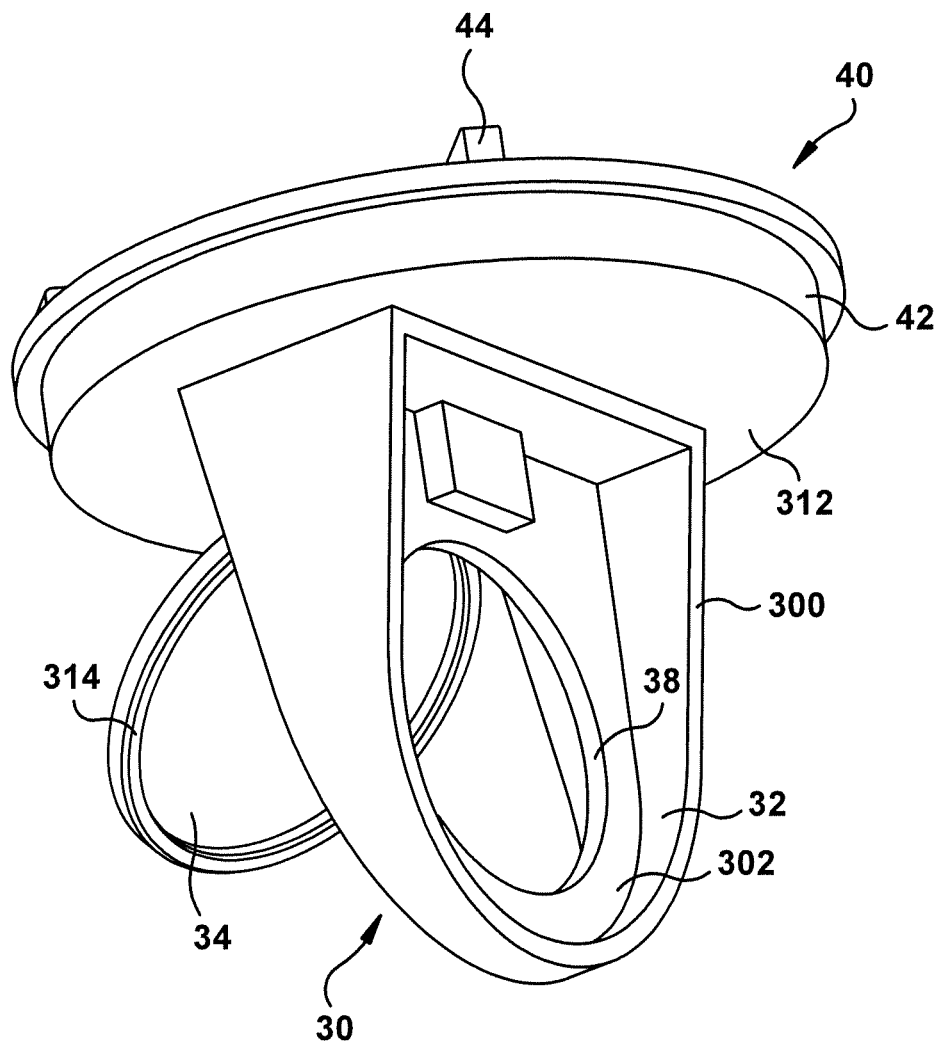
FIG. 3J shows a rear perspective view of the flapper sub-assembly and cap of the embodiment of the backwater valve assembly illustrated in FIG. 1, with the flapper in the open position.
Figure 3K:
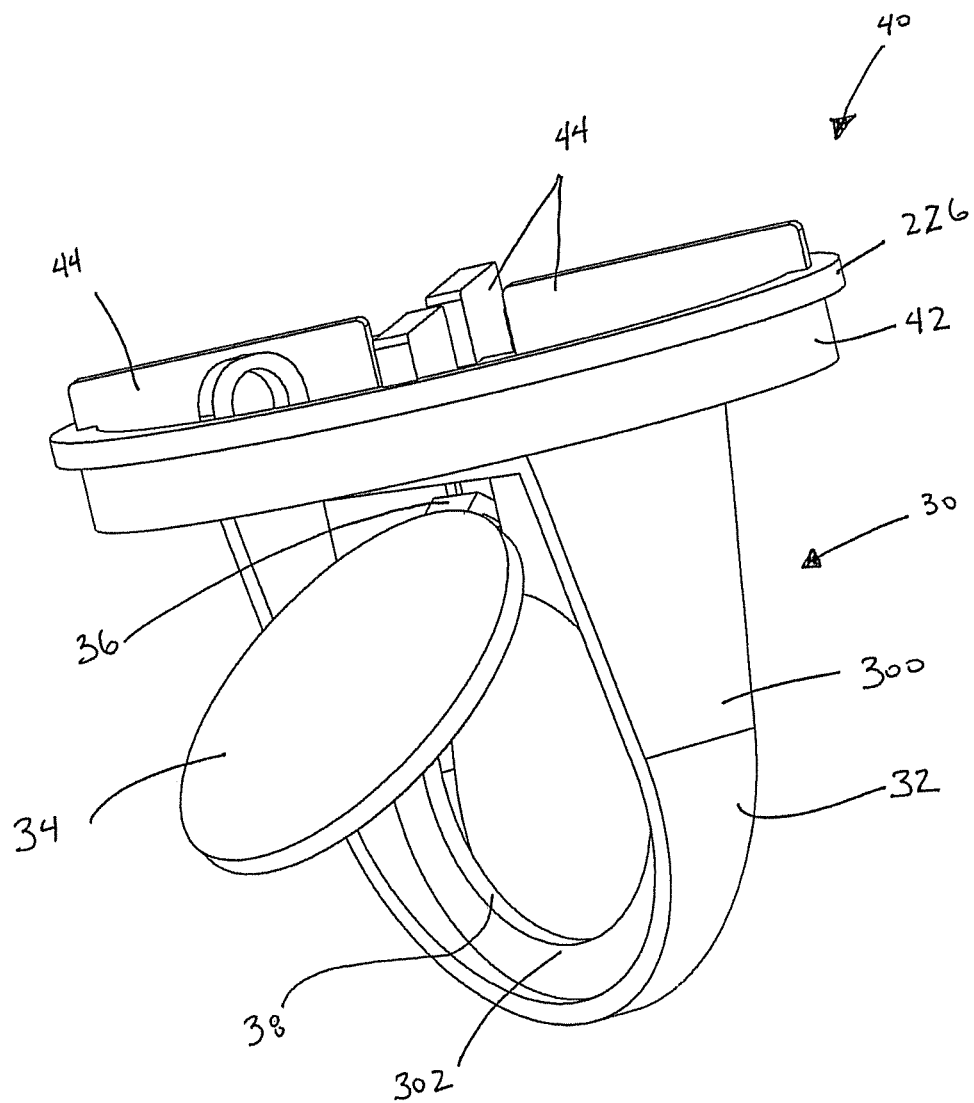
FIG. 3K shows a front perspective view of the flapper sub-assembly and cap of the embodiment of the backwater valve assembly illustrated in FIG. 1, with the flapper in the open position.
Figure 3L:
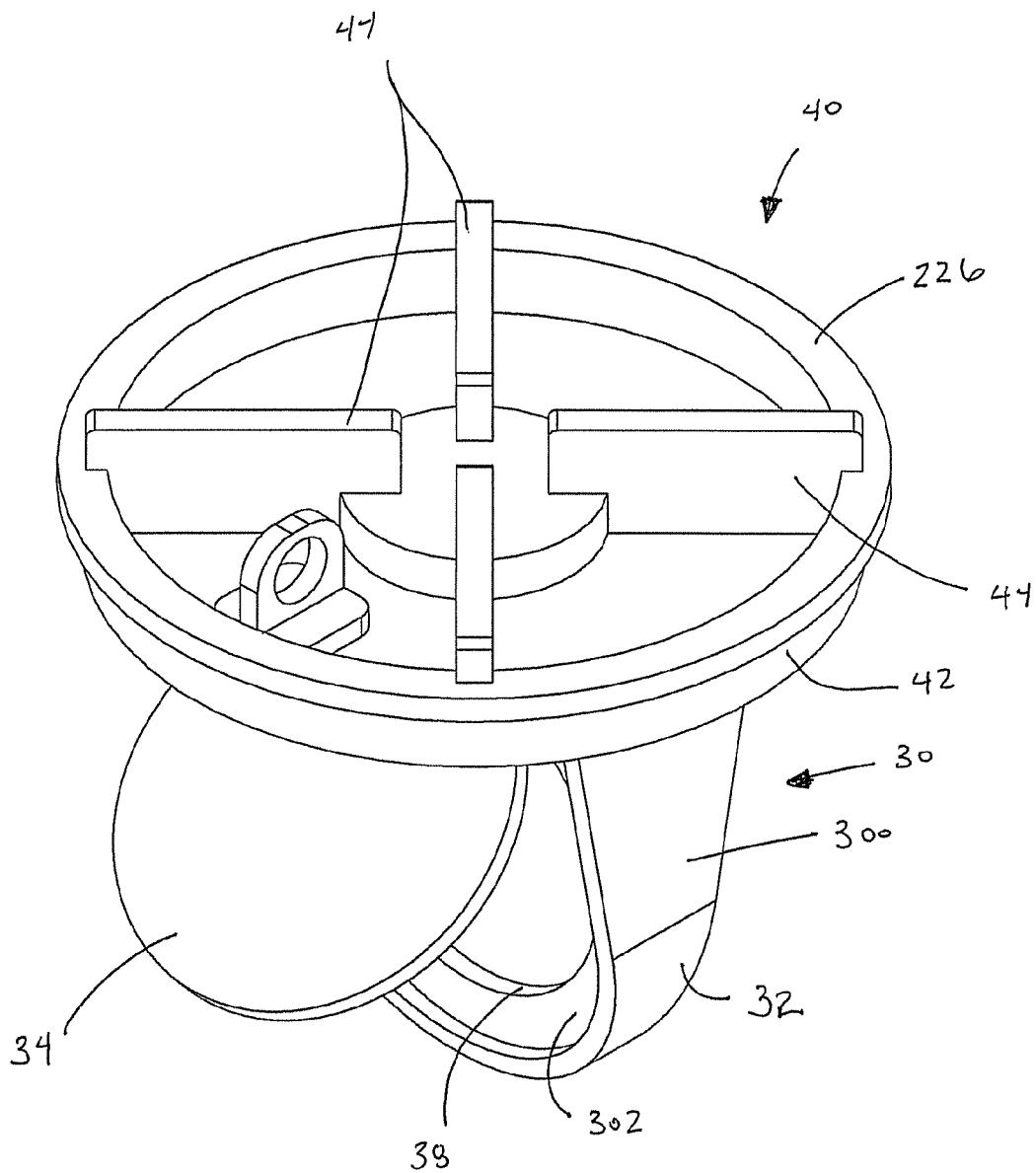
FIG. 3L shows a top perspective view of the flapper sub-assembly and cap of the embodiment of the backwater valve assembly illustrated in FIG. 1, with the flapper in the open position.
Figure 3M:
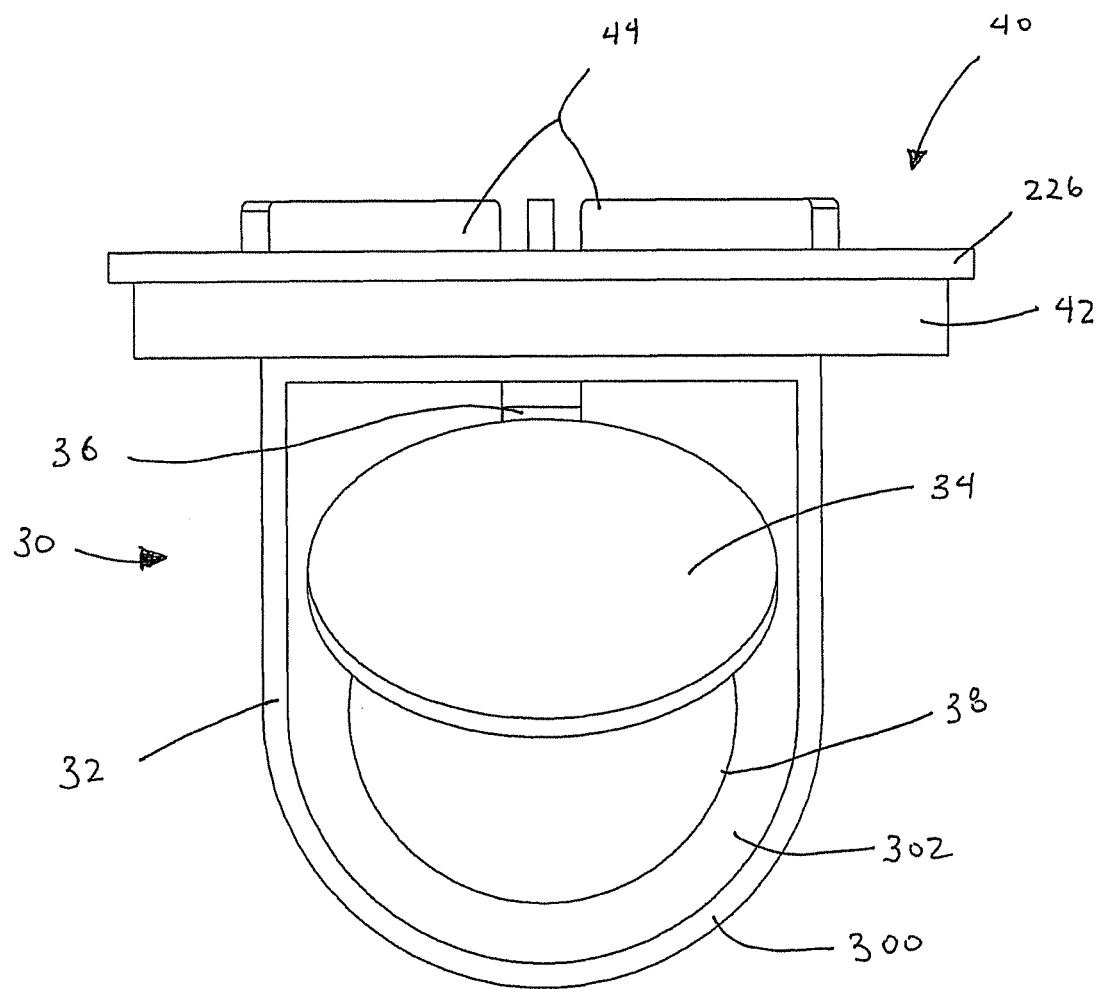
FIG. 3M shows a front plan view of the flapper sub-assembly and cap of the embodiment of the backwater valve assembly illustrated in FIG. 1, with the flapper in the open position.
Figure 3N:
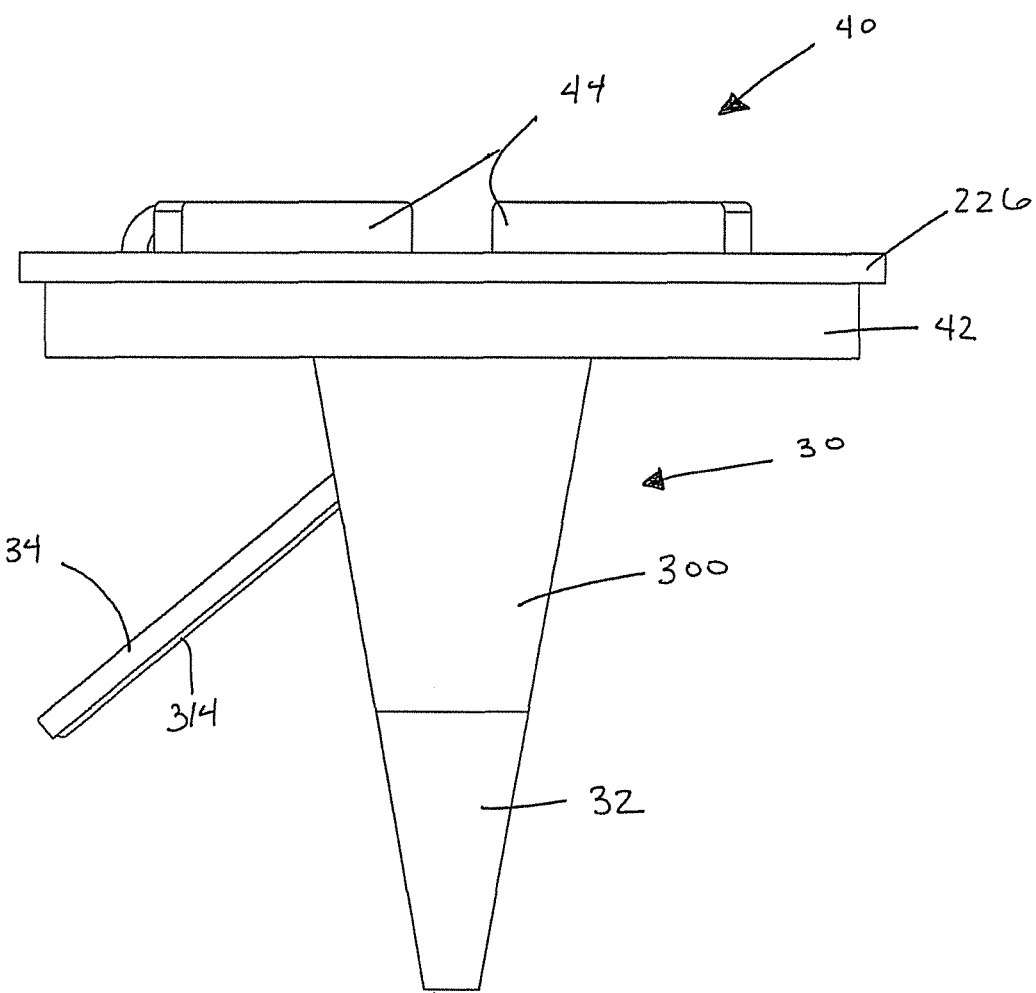
FIG. 3N shows a side elevational view of the flapper sub-assembly and cap of the embodiment of the backwater valve assembly illustrated in FIG. 1, with the flapper in the open position.
Figure 30:
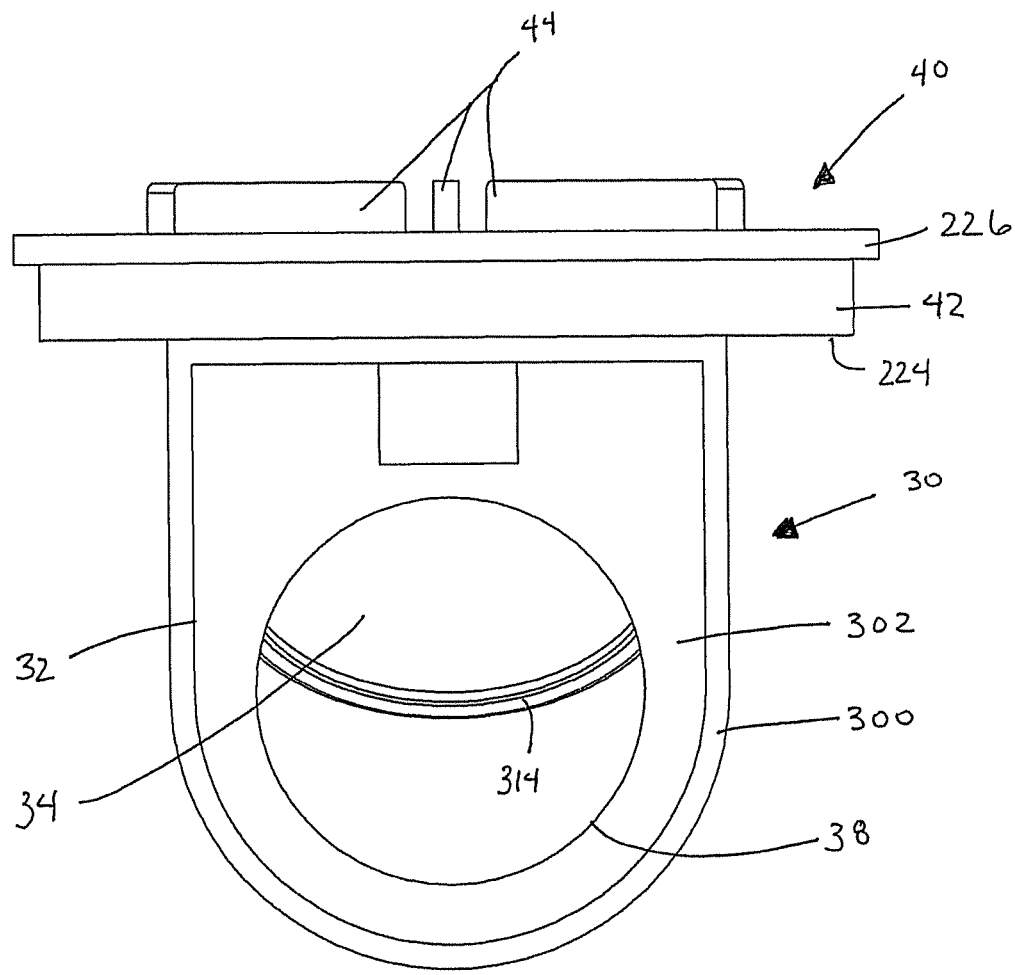
Figure 3P:
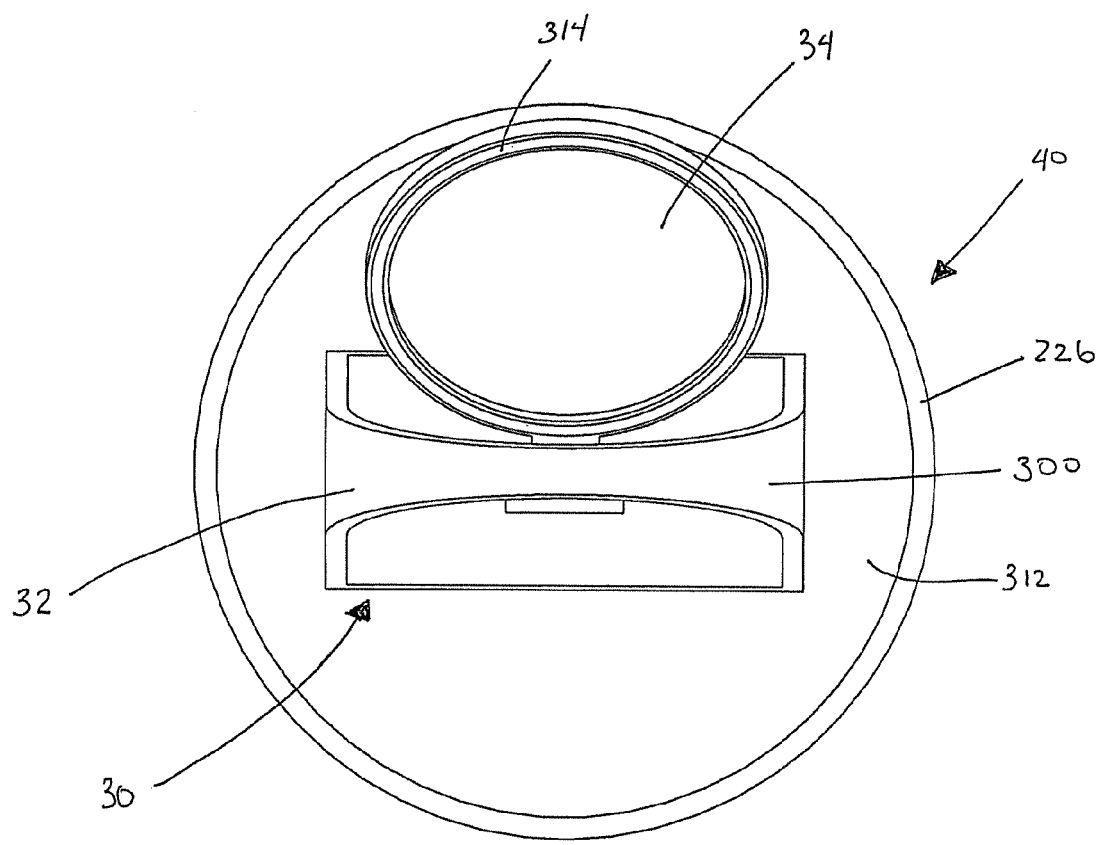
FIG. 3P shows a bottom plan view of the flapper sub-assembly and cap of the embodiment of the backwater valve assembly illustrated in FIG. 1, with the flapper in the open position.

Referring now to FIGS. 3A-3P, the flapper sub-assembly 30 and cap 40 of the exemplary embodiment of the backwater valve assembly 10 illustrated in FIGS. 1A-1C are shown in greater detail. The main body portion 32 of the flapper sub-assembly 30 of the exemplary illustrated embodiment includes a outer wall 300 that is generally sized, shaped and configured to correspond to the shape of the flapper sub-assembly recess 50 of the main valve body 20 that receives the main body portion 32 of the flapper sub-assembly 30. The correspondence of the shape of the outer wall 300 of the main body portion 32 of the flapper sub-assembly 30 with the shape of the flapper sub-assembly recess 50 of the main valve body 20 provides for general ease of assembly and the consistent and proper alignment of the flapper sub-assembly 30 with the main valve body 20 during assembly and re-assembly of the backwater valve assembly.

It should be understood that the flapper sub-assembly 30 and the flapper sub-assembly recess 50 may have a variety of different sizes, shapes and configuration in various additional embodiments of the backwater valve assembly 10. Furthermore, in additional embodiments the flapper sub-assembly 30 may be integrally formed with the main valve body 20 or attached to the main valve body using any of a variety of suitable attachment means, such as, for example, the flapper sub-assembly 30 may be coupled to the main valve body 20 by fasteners, projections that mate with recesses, fasteners that mate with projections or recesses and the like.

In the exemplary illustrated embodiment, a flat internal wall 302 is located within the outer wall 300 of the main body portion 32 of the flapper sub-assembly 30. The opening 38 is defined within wall 302. While the opening 38 of the illustrated embodiment has a circular shape, it should be understood that a wide variety of suitable shapes could be used for opening 38 in additional embodiments. Flapper 34 is pivotally connected to the main body portion 32 of the flapper sub-assembly 30 by pivot element 36 that mounts within recess 304 of the main body portion 32. However, it should be understood that flapper 24 may be coupled to the main body portion 32 of the flapper sub-assembly 30 in a variety of ways in additional embodiments. For example, the flapper 24 may be connected to the main body portion by a resilient member, a linkage, or any other suitable means. In yet further additional embodiments, the flapper 24 may be coupled directly to the main valve body 20 for movement relative to the main valve body 20.

The exemplary embodiment of flapper 24 illustrated in FIGS. 3A-3P includes a gasket 314 located on the face of the flapper 24 to form a generally fluid tight seal against wall 302 when the flapper 24 is in the closed position covering opening 38 to prevent fluid from travelling through the opening 38 when the flapper 24 is in the closed position. The gasket 314 may be formed from any resilient member, such as rubber. It should be understood that additional embodiments of the flapper 24 of the backwater valve assembly 10 may be provided without such a gasket 314.

The exemplary illustrated embodiment of the main body portion 32 of the flapper sub-assembly 30 includes a mounting feature 306 that projects upwardly from an upper wall 308 of the main body portion 32 for receipt within recess 310 defined within lower surface 312 of cap 40 for coupling the main body portion 32 of the flapper sub-assembly 30 to cap 40. The mounting feature 306 of the exemplary illustrated embodiment includes a plurality of arcuate shaped wall segments that flex to create a "snap-fit" with recess 310 of cap 40 while still allowing cap 40 to rotate relative to the main body portion 32. In this manner, the cap 40 and main body portion 32 can be securely coupled together and yet the cap 40 is left free to rotate relative to the main body portion. This permits for the cap 40 to be threaded into or out of port 60 while the main body portion 32 of the flapper sub-assembly 30 remains stationary in the flapper sub-assembly recess 50 of the main valve body 20 during installation of the flapper sub-assembly 30 and cap 40 into the main valve body 20 during the assembly, disassembly and re-assembly of the backwater valve assembly 10.

However, it should be understood that in additional embodiments the cap 40 and main body portion 32 of the flapper sub-assembly 30 may be coupled in a variety of different ways. For example, a mounting feature could project from the lower face of the cap that is received within a recess defined within the main body portion 32 of the flapper sub-assembly 30 or any other suitable coupling method could be used. Also, in additional embodiments, the cap 40 may not be rotatable relative to the main body portion 32 subsequent to the coupling of the cap 40 to the main body portion 32.

In various embodiments of the backwater valve assembly that include a cap 400 that is coupled to the flapper sub-assembly 30, both the cap 40 and flapper sub-assembly 30 may be installed into or removed from the backwater valve assembly 10 together. This provides for the removal of both the cap 40 and flapper sub-assembly 30 from the backwater valve assembly 10 together to allow for the repair and replacement of the flapper 34 of the flapper sub-assembly 30 or other parts thereof without the need to remove or uninstall the remainder of the backwater valve assembly 10 and even if the main valve body 20 is buried beneath the ground or in another location that is otherwise inaccessible or difficult to access.

The main valve body 20, cap 40, flapper sub-assembly 30, and flapper 34 of the various embodiments of backwater valve assembly 10 disclosed herein may be formed from any suitable material. For example, in various embodiments, main valve body 20, cap 40, flapper sub-assembly 30, and flapper 34 may be constructed from one or a combination of metals, such as steel or aluminum, or one or a combination of thermoplastic or elastomeric materials, such as plastic. The main valve body 20, cap 40, flapper sub-assembly 30, and flapper 34 may be formed manufactured by one of a variety of methods that are known in the art.

Referring now to FIGS. 4A-4H, a second exemplary embodiment of a cap 400 for a backwater valve assembly 10 of the present disclosure is illustrated, which is a modified version of the cap 40 illustrated in FIGS. 1-3. The prime symbol is utilized in FIGS. 4A-4H to indicate elements of cap 400 which may be similar but may not be identical to elements of cap 40. Referring to FIGS. 4A-4H, the cap 400 has a mounting portion 42', a plurality of ribs 44', and a rim 226'. The cap 400 further includes cap gripping feature 410. The illustrated exemplary embodiment of cap gripping feature 410 includes a plurality of openings 420 defined within a top surface 422 of the gripping feature 410 and adapted to receive a tool or other element for rotation of cap 400 by the tool to install/remove the cap 400 and/or flapper sub-assembly from main valve body. Cap gripping feature 410 can be coupled to cap 400 in a variety of suitable ways. In the illustrated exemplary embodiment, the cap gripping feature 410 includes a plurality of slots 430 defined within the sidewall 432 of cap gripping feature 410. Slots 430 of cap gripping feature are sized, shaped and configured to receive ribs 44' of cap 400. The illustrated exemplary embodiment of cap 400 includes cap gripper mount 440 formed by generally circular shaped wall 450 that is bisected by wall 460. Circular wall 450 is sized, shaped and configured to fit within the sidewall 432 of cap gripping feature. Wall 460 is sized, shaped and configured to fit within slot 470 defined in bottom surface 472 of cap gripping feature 410 (illustrated in FIG. 4C). The receipt of the cap gripper mount 440 within the cap gripping feature 410 and the engagement of slots 430, 470 of the illustrated embodiment of cap gripping feature 410 with ribs 44' and wall 460, respectively, of cap 400 secure the cap gripping feature 410 to cap 400 and prevent the rotation of the cap gripping feature relative to the cap 400. In this manner, rotation of the cap gripping feature 410 will result in a corresponding rotation of the cap 400.

Figure 4A:
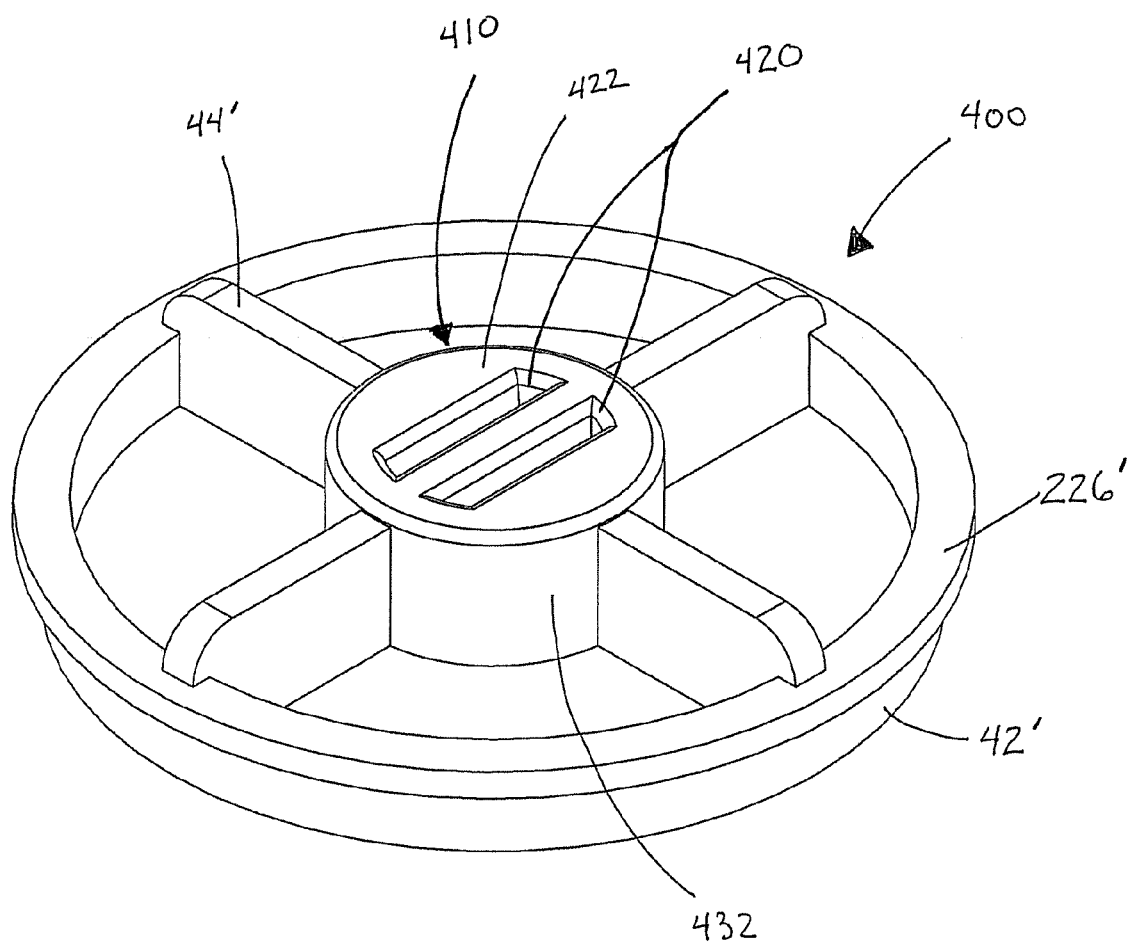
FIG. 4A shows a top perspective view of one embodiment of a cap of a backwater valve assembly with a cap removing feature.
Figure 4B:
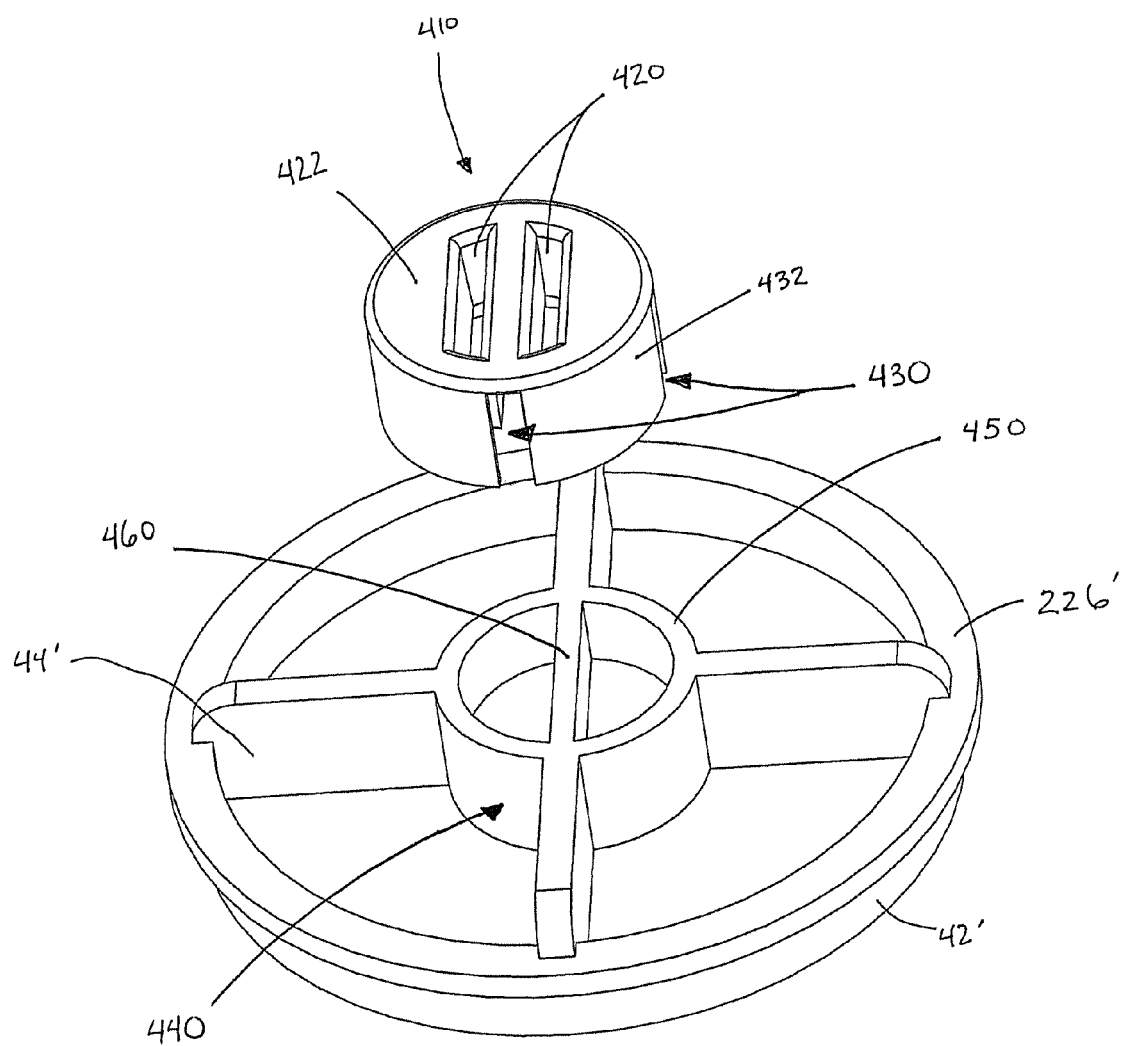
FIG. 4B shows a top, exploded perspective view of the embodiment of the cap illustrated in FIG. 4A.
Figure 4C:
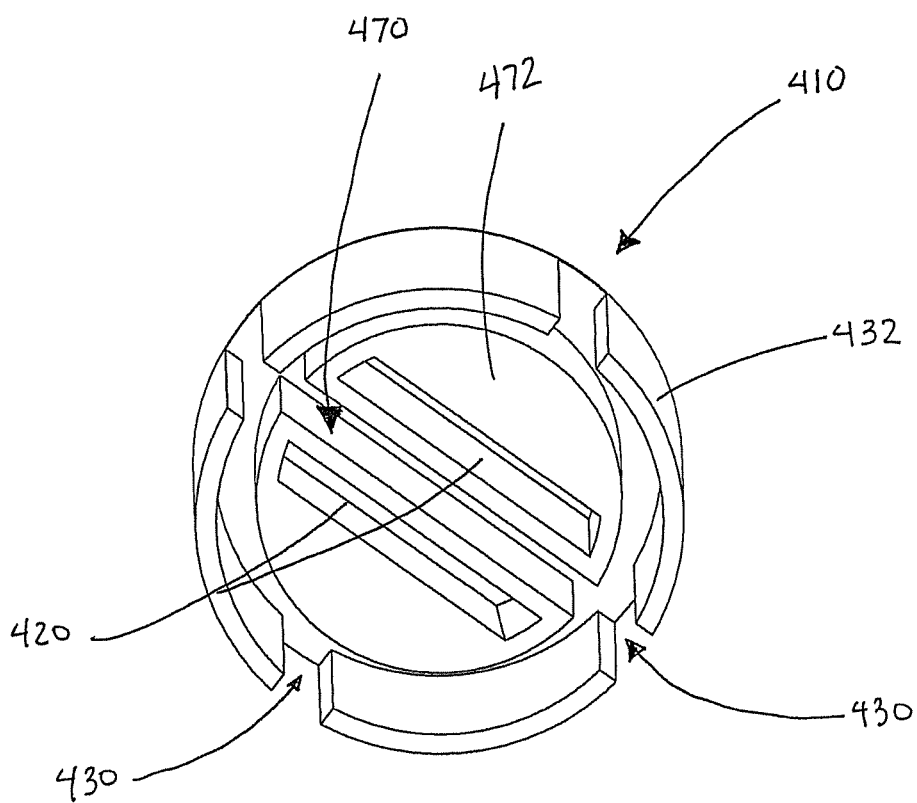
FIG. 4C shows a bottom perspective view of the cap removing feature of the embodiment of the cap illustrated in FIG. 4A.
Figure 4D:
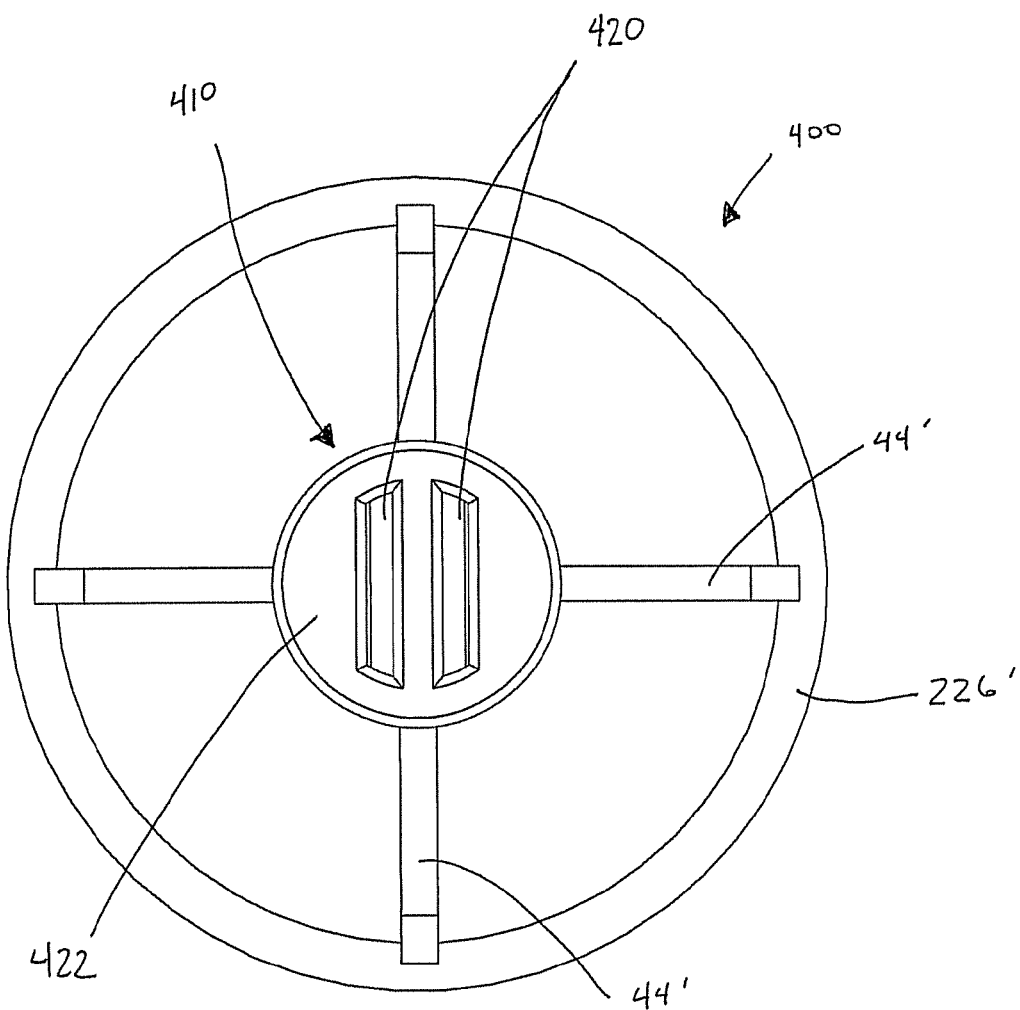
FIG. 4D shows a top plan view of the embodiment of the cap illustrated in FIG. 4A.
Figure 4E:
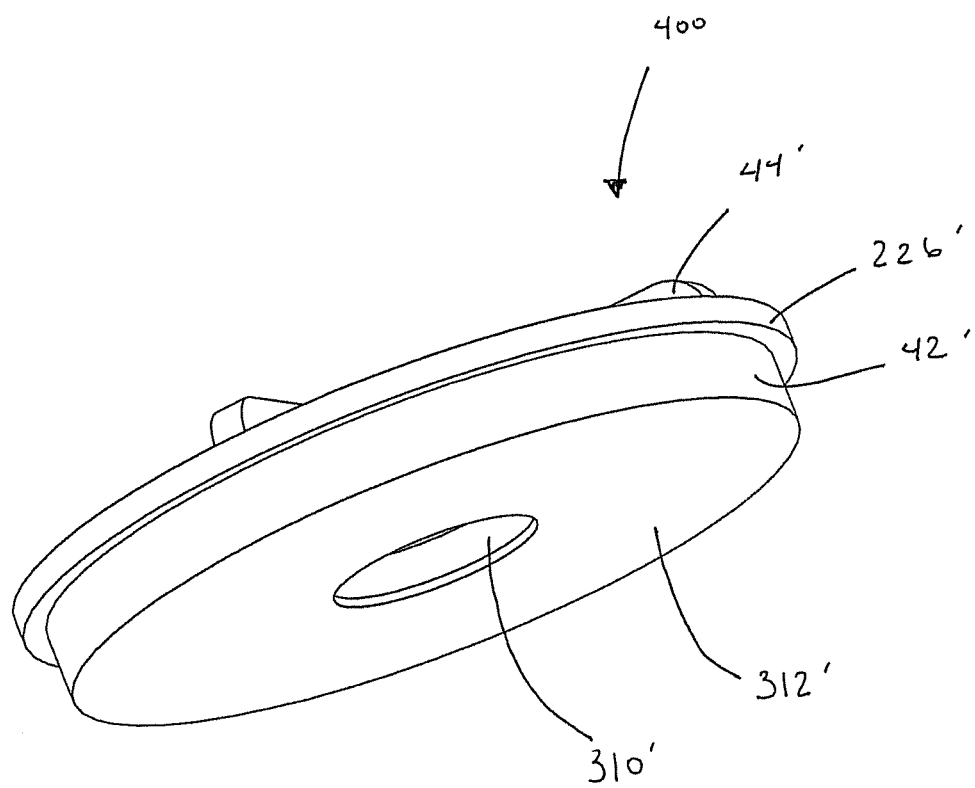
FIG. 4E shows a bottom perspective view of the embodiment of the cap illustrated in FIG. 4A.
Figure 4F:
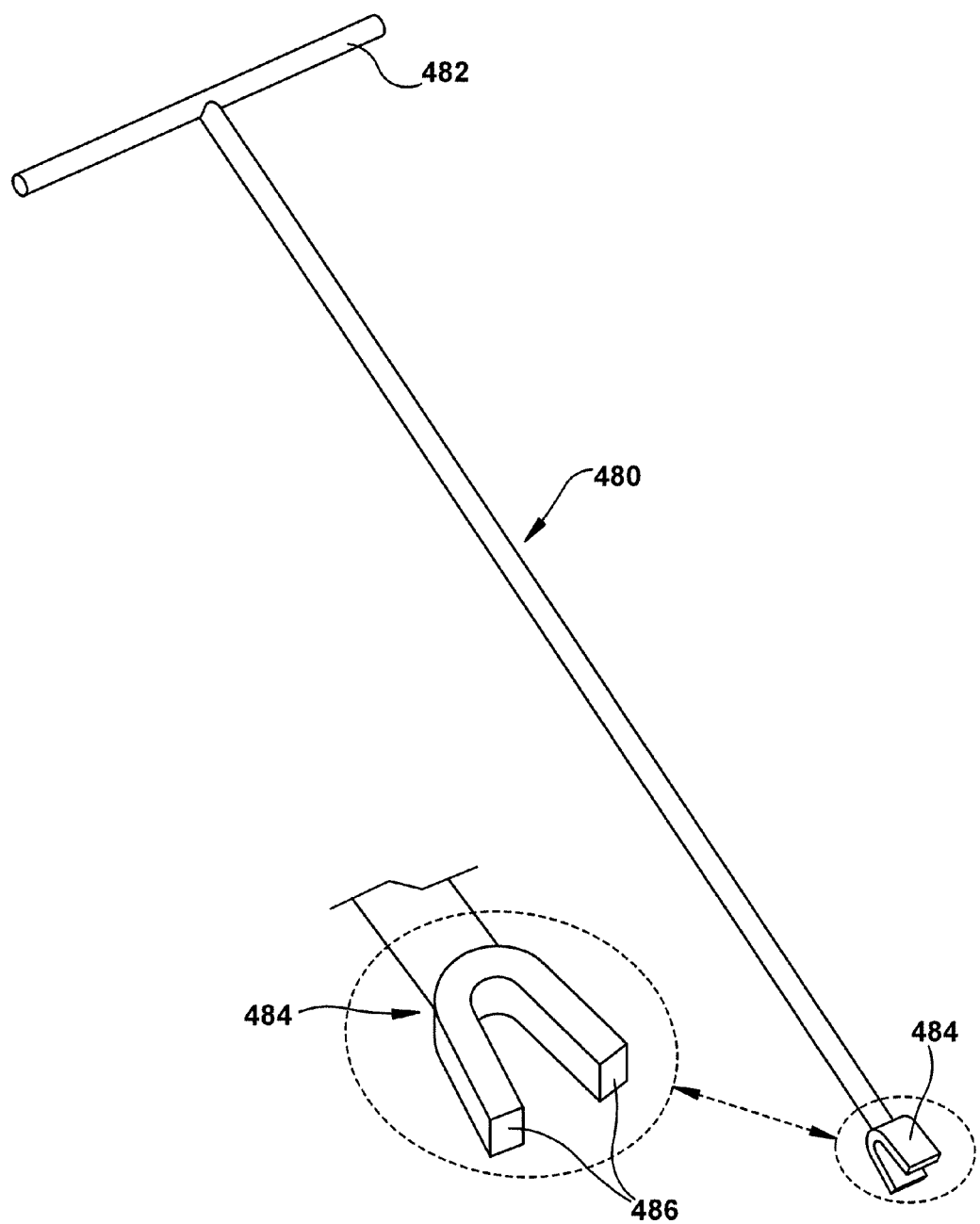
FIG. 4F shows a perspective view of one embodiment of a tool useful for installing/removing/adjusting the embodiment of the cap illustrated in FIG. 4A from a backwater valve assembly, with a magnified inset view of the key portion of the tool.
Figure 4G:
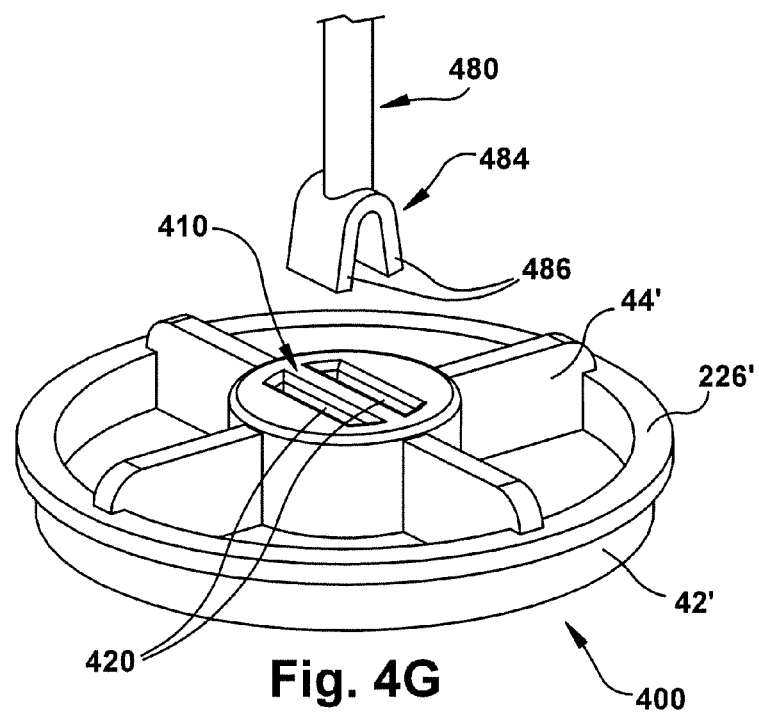
FIG. 4G shows a perspective view of the embodiment of the cap illustrated in FIG. 4A and the tool illustrated in FIG. 4F.
Figure 4H:
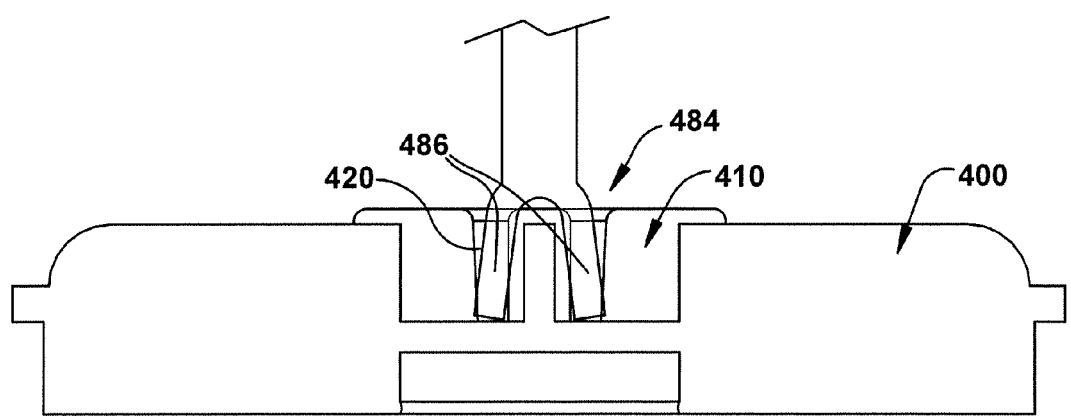
FIG. 4H shows a side cross-sectional view of the embodiment of the cap illustrated in FIG. 4A with the tool illustrated in FIG. 4F inserted in the openings of the adjustment feature of the cap.

Referring now to FIG. 4F an exemplary embodiment of a tool 480 for use with the cap gripping feature 410 is illustrated. The tool 480 generally includes a handle 482 and a key end 484. In the illustrated embodiment, the key end 484 of tool 480 includes two projections 486. In various additional embodiments, the key end 484 of the tool 480 may have any variety of shapes and configurations. As illustrated in FIGS. 4G-4H, the bit 486 of tool 480 is shaped and configured to correspond with and fit within openings 420 of cap gripping feature 410. The illustrated exemplary embodiment of tool 480 is generally referred to as a "street key" which are traditionally used by plumbers in connection with the operation of ball valves, such as those used with water supply meters and other valves. Street keys are tools that would likely be included in the group of tools that most plumbers have access to and use on a daily basis. The exemplary illustrated embodiment of cap gripping feature 410 of cap 400 includes openings 420 that are adapted for receipt of the projections 486 of the key end 484 of a street key. Since most plumbers will generally have access to a street key, they will be able to remove cap 400 (and optionally the flapper assembly that is rotatably connected to the cap 400) from the backwater valve assembly 10 without the need for an additional specialized tool.

In the illustrated embodiment of the cap griping feature 410, the cap gripping feature is formed of a resilient material, such as rubber, that provides a frictional gripping force between the tool 480 and the cap gripping feature 410, although the cap gripping feature 410 of additional embodiments may be formed from a variety of suitable materials and need not be formed from a resilient material. The cap gripping feature 410 may be coupled with the cap 400 in a variety of different ways in various embodiments. For example, the cap gripping feature 410 may be bonded or adhered to the cap 400 by the use of an adhesive or other fastening mechanism or the cap gripping feature 410 may be over-molded onto the cap 400.

The frictional gripping force between the tool 480 and cap gripping feature 410 of the illustrated exemplary embodiment allows the tool 480 to be used to retract the cap 400 from main valve body 20 once the cap 400 is disengaged from main valve body. Similarly, the gripping of the cap gripping feature 410 (and, by extension, the cap 400) by the tool 480 provides for the installation of the cap 400 into the main valve body 20 from a location at a distance from the backwater valve assembly 10. This permits for the remote installation and removal of the cap 400 from the main valve body 20 of the backwater valve assembly 10, which provides for access to the interior of the backwater valve assembly 10 without the need for an installer or worker to be within arm's reach of the backwater valve assembly or be able to reach the cap by hand.

In various embodiments of the backwater valve assembly that include a cap 400 with a cap gripping feature 410 and the cap 400 is rotatably coupled to the flapper sub-assembly 30, both the cap 400 and flapper sub-assembly 30 which are coupled together may be installed into or removed from the backwater valve assembly 10 from a location at a distance from the backwater valve assembly 10. This permits for the remote installation and removal of the cap 400 and flapper sub-assembly 30 and the main valve body 20 of the backwater valve assembly, which provides for access to the interior of the backwater valve assembly without the need for an installer or worker to be within arm's reach of the backwater valve assembly or be able to reach the cap by hand.

Referring now to FIGS. 5A-5I, a second exemplary embodiment of backwater valve assembly 500 is illustrated. The prime symbol is utilized in FIGS. 5A-5I to indicate elements of backwater valve assembly 500 which may be similar but may not be identical to elements of backwater valve assembly 10. Referring to FIGS. 5A-5I, the illustrated exemplary embodiment of backwater valve assembly 500 generally includes a main valve body 20', a flapper sub-assembly 30' and a cap 40'. The main valve body 20' of the exemplary embodiment of the backwater valve assembly 500 generally includes a main wall 22' that defines an interior space 24', an inlet 26' and a outlet 28'.

The flapper sub-assembly 30' of the exemplary illustrated embodiment of FIGS. 5A-5I generally includes a main body portion 32', a first flapper element 502 and a second flapper element 504. The second flapper element 504 is pivotally connected to the main body portion 32 by a pivot element 506. The first flapper element 502 is pivotally connected to the main body portion 32 by a pivot element 508. A flapper sub-assembly recess 50' is defined by wall 52' of the main valve body 20' that receives the main body portion 32' of the flapper sub-assembly 30'. The first flapper element 502 and second flapper element 504 pivot on pivot elements 506 and 508 relative to the main body portion 32' between an open position in which opening 38' defined through the main body portion 32'. Since the first flapper element 502 hangs down from the pivot element 508, gravity causes the first flapper element to be "normally closed," i.e. the first flapper element 502 is normally in contact with the main body portion 32'. Since the pivot element 506 is at the bottom of the main body portion 32', gravity causes the second flapper element 504 to be "normally open," i.e. the second flapper element 504 is normally pivoted away from the main body portion 32' by gravity. The illustrated second flapper element 504 includes a float portion (e.g. 512). When first flapper element 502 is in the closed position, opening 510 defined through first flapper element 502 receives a projection 512 that extends from second flapper element 504 to create a fluid tight seal.

Figure 5A:
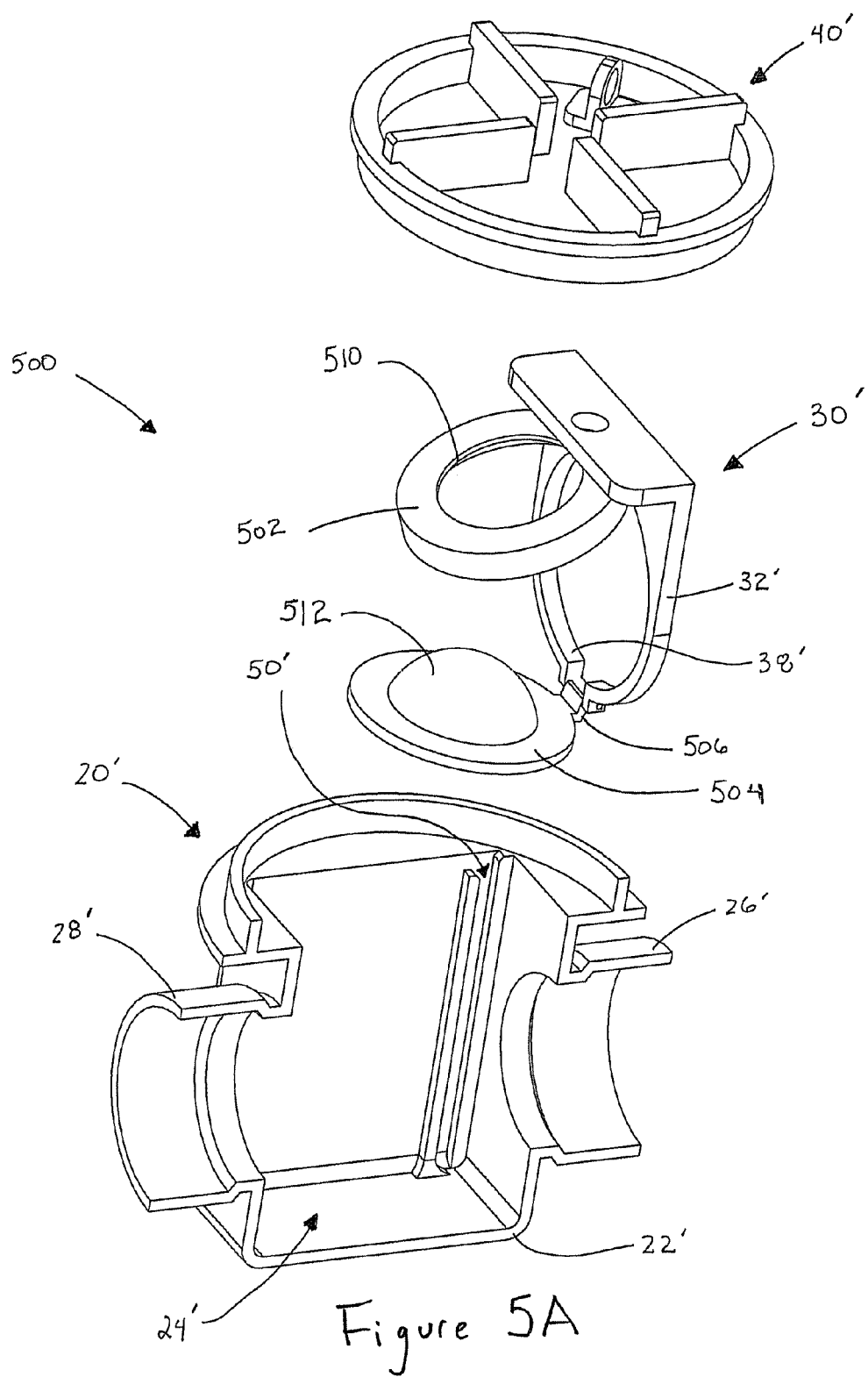
FIGS. 5A-5C show a perspective exploded views of a second embodiment of a backwater valve assembly with the main valve body illustrated in cross-sectional form.
Figure 5B:
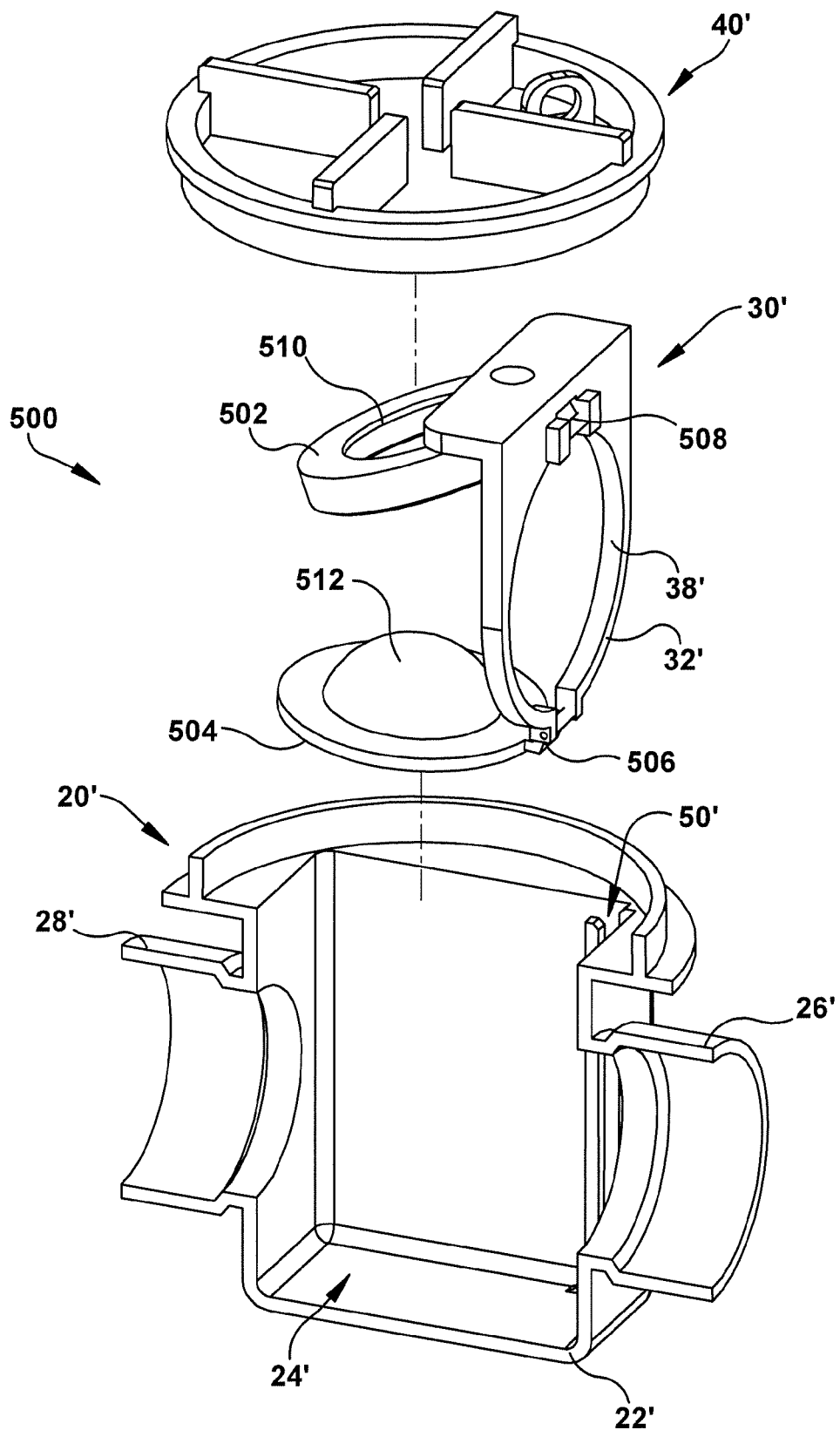
Figure 5C:
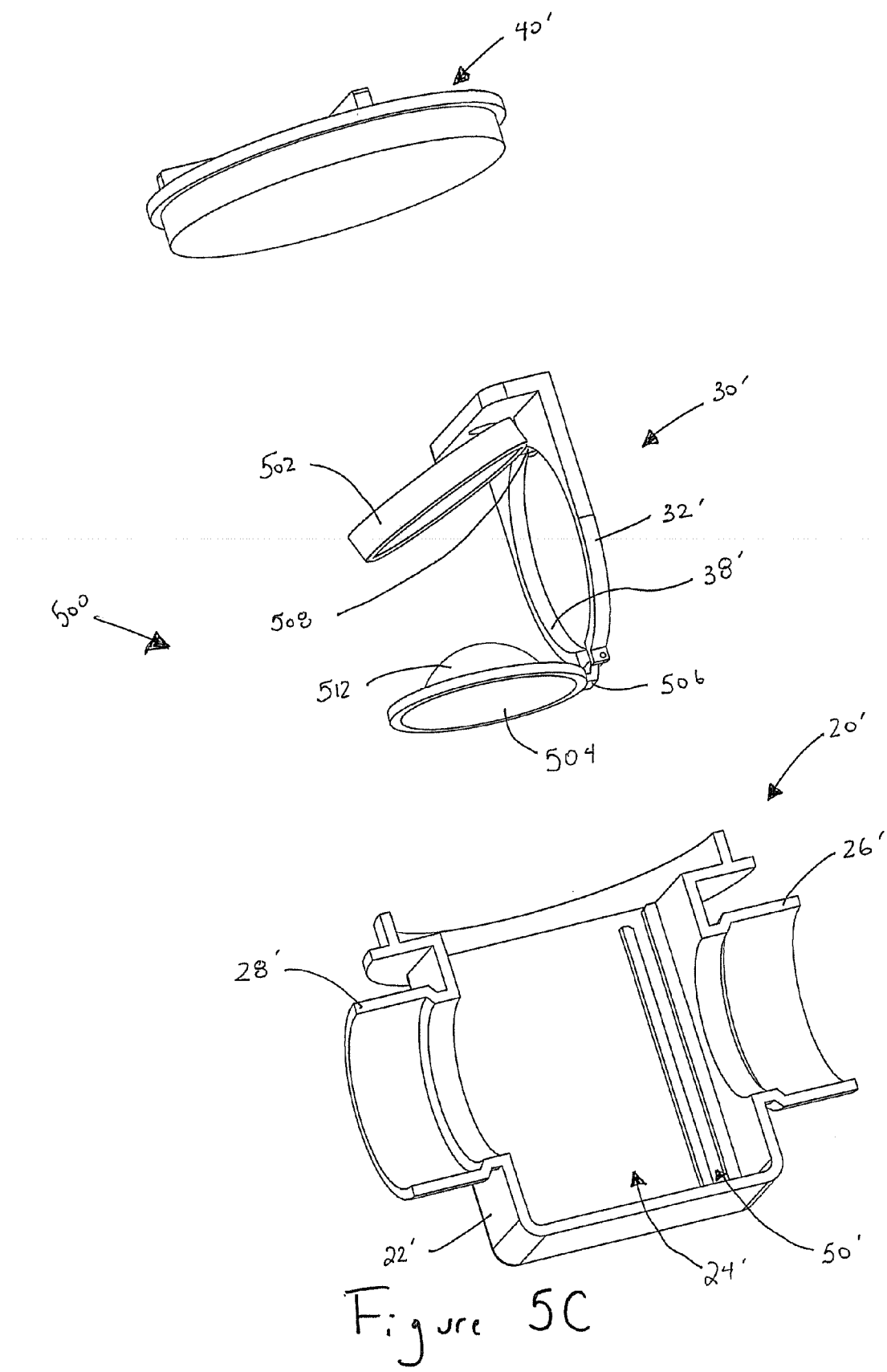
Figure 5D:
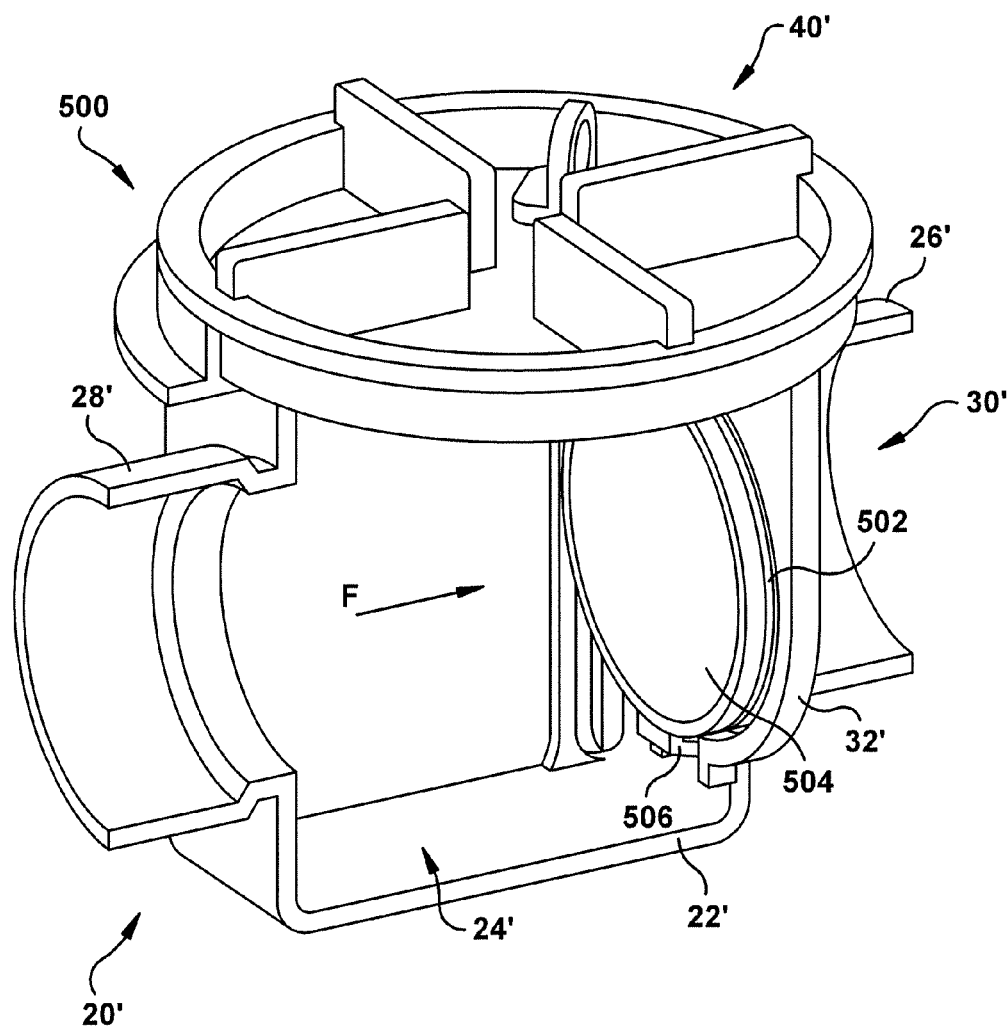
FIG. 5D shows a perspective view of the embodiment of the backwater valve assembly in FIGS. 5A-5C with the main valve body illustrated in cross-sectional form and the flapper elements in a closed position.
Figure 5E:
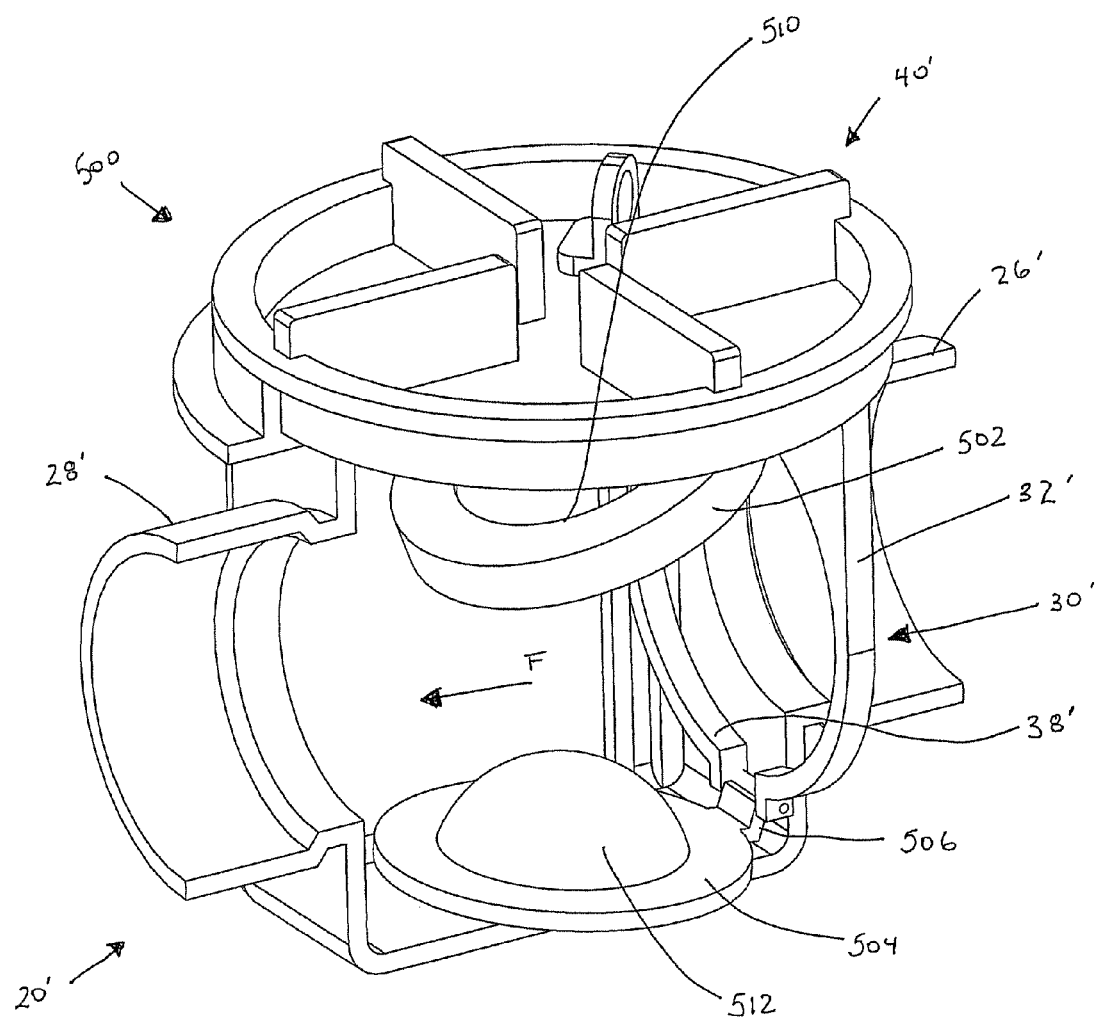
FIGS. 5E-5F shows a perspective view of the embodiment of the backwater valve assembly in FIGS. 5A-5C with the main valve body illustrated in cross-sectional form and the flapper elements in an open position.
Figure 5F:
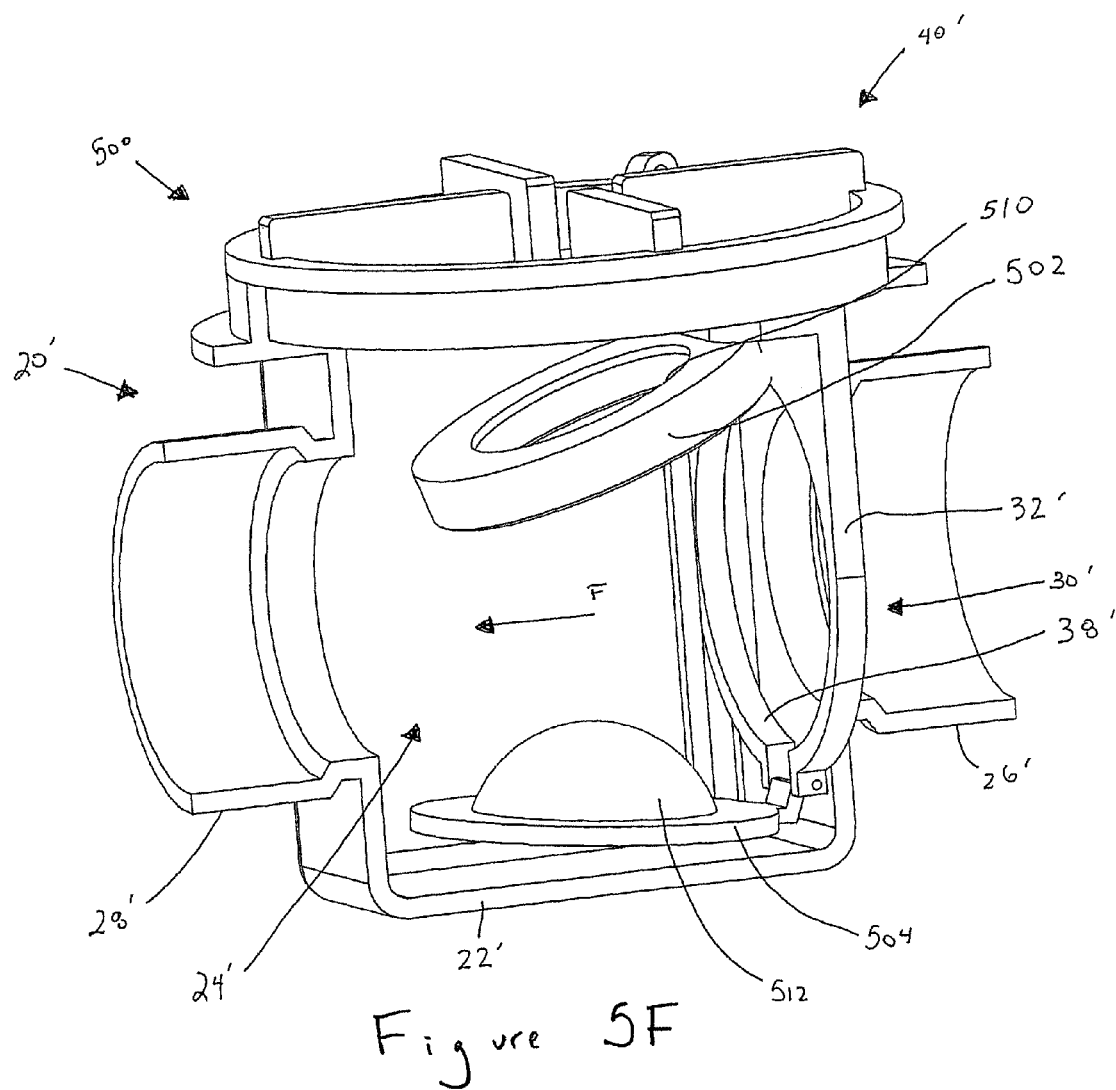
Figure 5H:
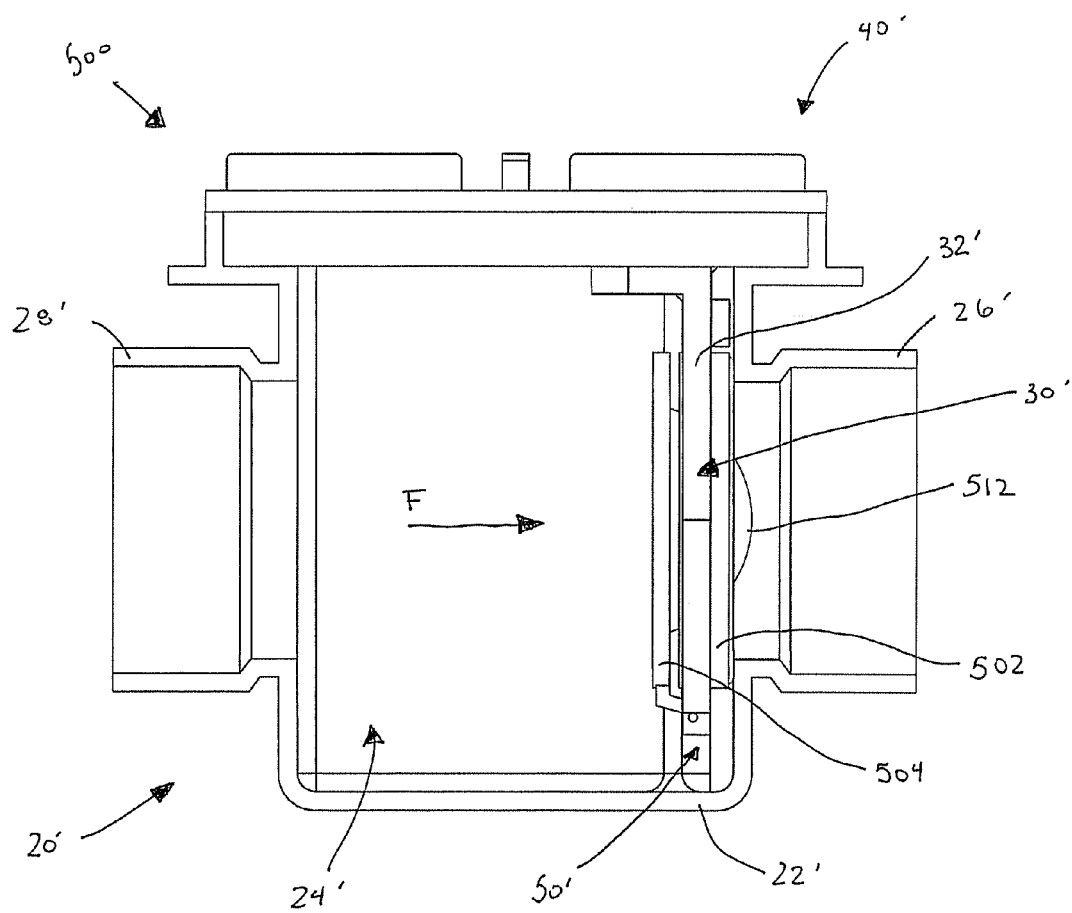
FIG. 5H shows a side elevational view of the embodiment of the backwater valve assembly in FIG. 5A with the main valve body illustrated in cross-sectional form and the flapper elements in a closed position.
Figure 5I:
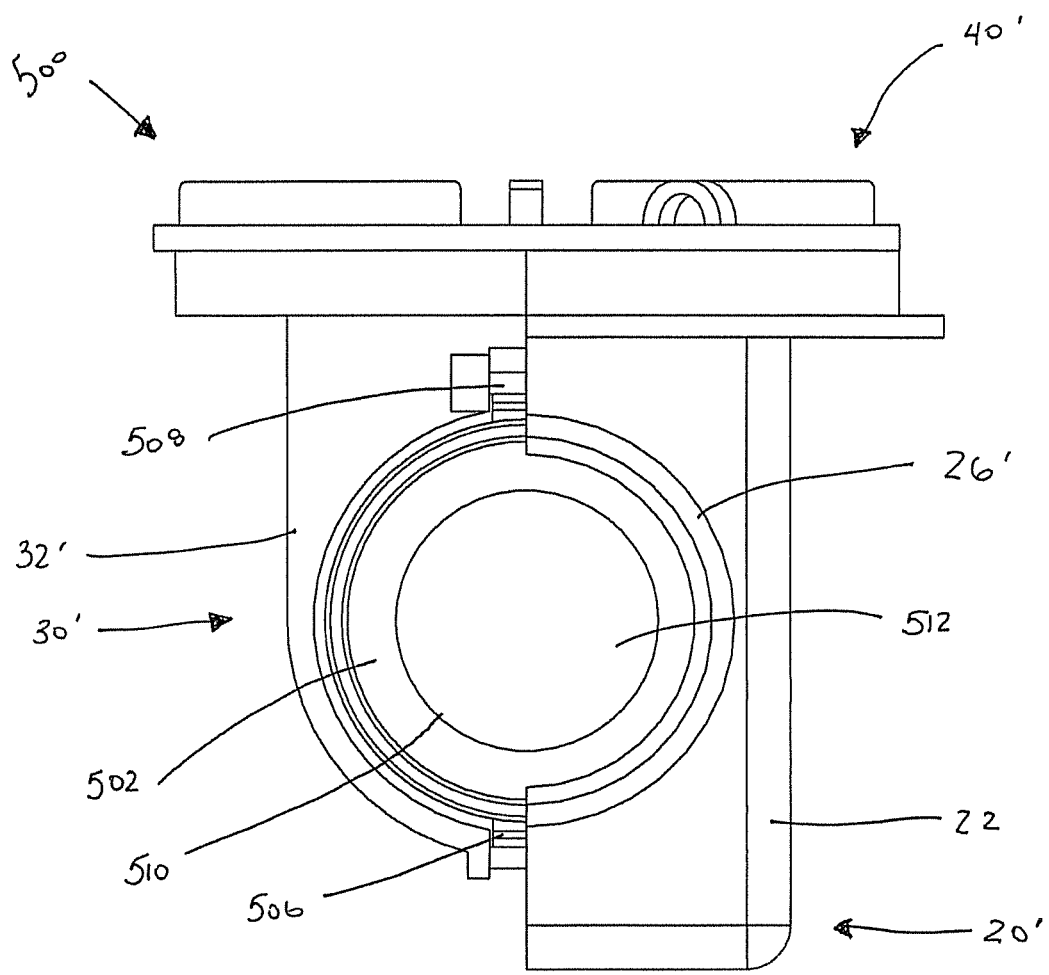
FIG. 5I shows a front plan view of the embodiment of the backwater valve assembly in FIG. 5A with the main valve body illustrated in cross-sectional form and the flapper elements in a closed position.

Referring to FIG. 5E, when fluid flows from an upstream location (e.g. building or residence) of the main body 20', the first flapper 502 is rotated to an open position and the second flapper 504 substantially remains in the open position. In this manner, the flappers 502, 504 permit fluid to freely flow from upstream of the backwater valve assembly 500, through the backwater valve assembly 500, through the backwater valve assembly 500, and out the outlet 28'.

However, referring to FIG. 5D, if the fluid enters the backwater valve assembly 500 through the outlet 28', the first flapper 502 will remain in or pivot to the closed position. The fluid entering the outlet 28' will lift the float portion 505 of the second flapper 504, until the second flapper closes and seals against the first flapper 502. The exemplary embodiment of the backwater valve assembly 500 prevents fluid flowing from a location downstream of the backwater valve assembly 500 and out the inlet 26'. In this manner, the exemplary embodiment of the backwater valve 500 may be used to prevent sewage or waste water from backing up into a residence or building.

Referring now to FIGS. 6A-6D, a third exemplary embodiment of backwater valve assembly 600 is illustrated. The prime symbol is utilized in FIGS. 6A-6D to indicate elements of backwater valve assembly 600 which may be similar but may not be identical to elements of backwater valve assembly 10. Referring to FIGS. 6A-6D, the illustrated exemplary embodiment of backwater valve assembly 600 generally includes a main valve body 20' and a flow control element 610 that permits fluid to flow freely in one direction but generally prevents fluid from flowing in the opposite direction. The main valve body 20' of the exemplary embodiment of the backwater valve assembly 600 generally includes a main wall 22' that defines an interior space 24', an inlet 26' and a outlet 28'.

Figure 6A:
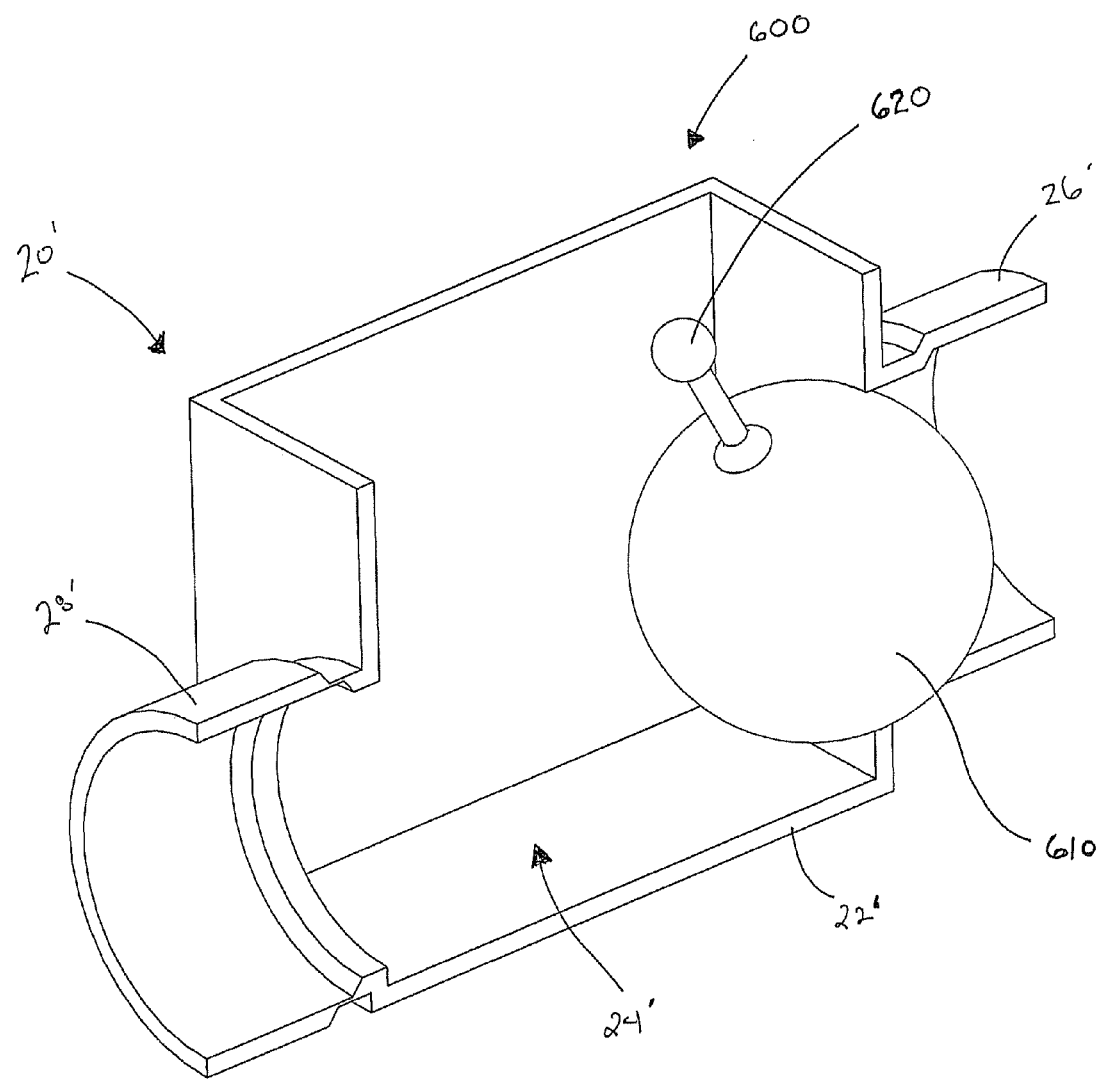
FIG. 6A shows a perspective view of a third embodiment of a backwater valve assembly with the main valve body illustrated in cross-sectional form and the flow control element in a closed position.
Figure 6B:
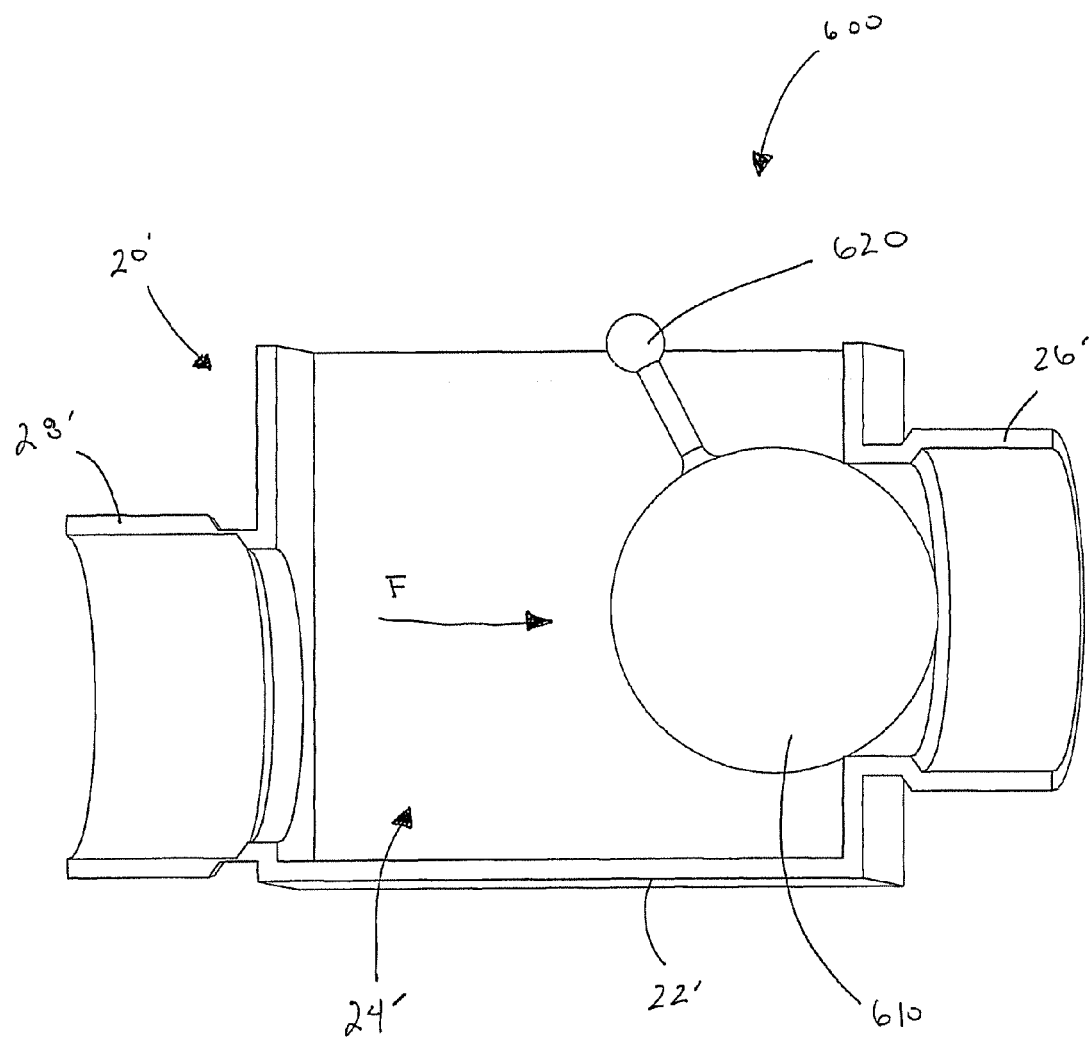
FIG. 6B shows a side elevational view of the embodiment of the backwater valve assembly in FIG. 6A with the main valve body illustrated in cross-sectional form and the flow control element in a closed position.
Figure 6C:
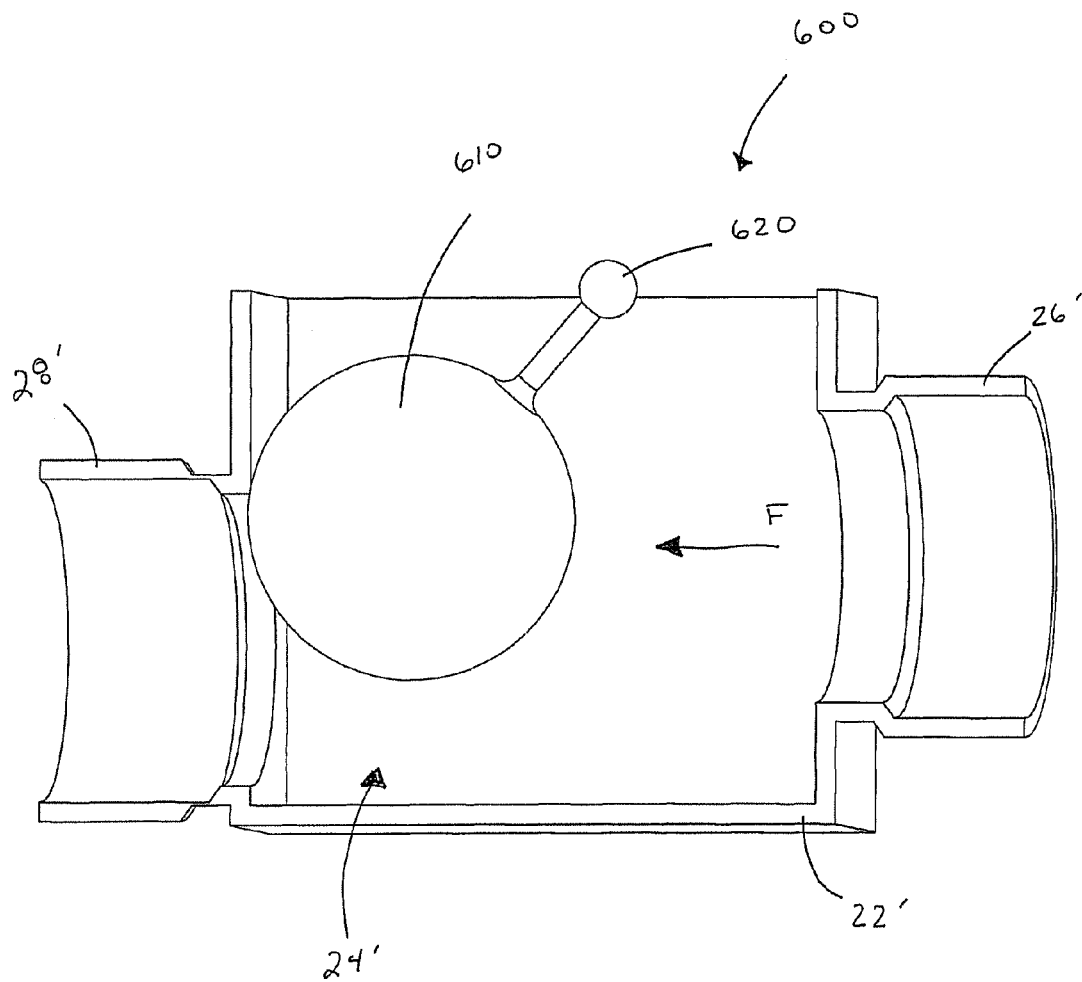
FIG. 6C shows a side elevational view of the embodiment of the backwater valve assembly in FIG. 6A with the main valve body illustrated in cross-sectional form and the flow control element in an open position.
Figure 6D:
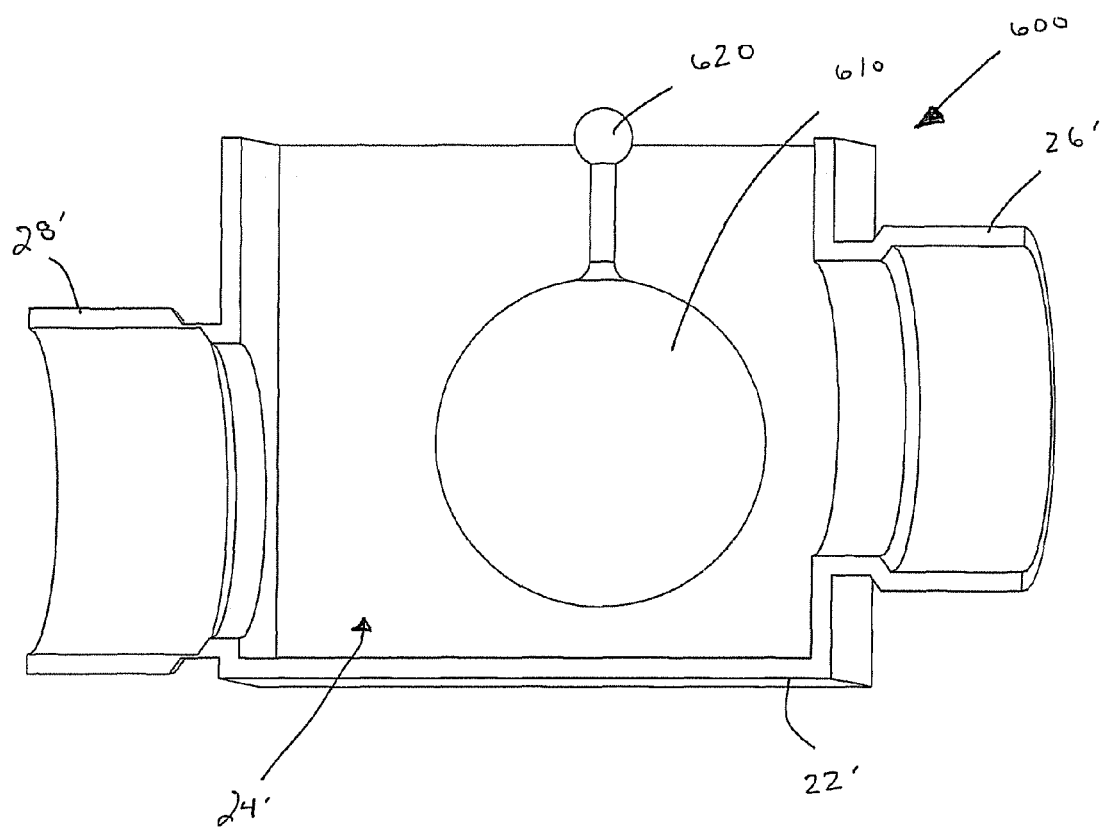
FIG. 6D shows a side elevational view of the embodiment of the backwater valve assembly in FIG. 6A with the main valve body illustrated in cross-sectional form and the flow control element in a neutral position.

The flow control element 610 is pivotally mounted (either directly or indirectly) to a cap (not shown) of the backwater valve assembly 600 or the main valve body 20' by pivot element 620. The flow control element 610 pivots on pivot element 620 relative to the main valve body 20' between a closed position in which inlet 26' of main valve body 20' is blocked (as illustrated in FIGS. 6A-6B) to prevent the backflow of fluid from the interior 24' of the main valve body 20' through the inlet 26' and an open position in which inlet 26' of main valve body 20' is unblocked (as illustrated in FIG. 6C). When the backwater valve assembly 600 is not experiencing any fluid flow, the flow control element 610 remains in a neutral position (as illustrated in FIG. 6D). The flow control element 610 of the illustrated exemplary embodiment 610 has a spherical shape, however, the flow control element of additional embodiments may have any shape that serves to permits fluid to flow freely in one direction but generally prevent fluid from flowing in the opposite direction.

Figure 7A:
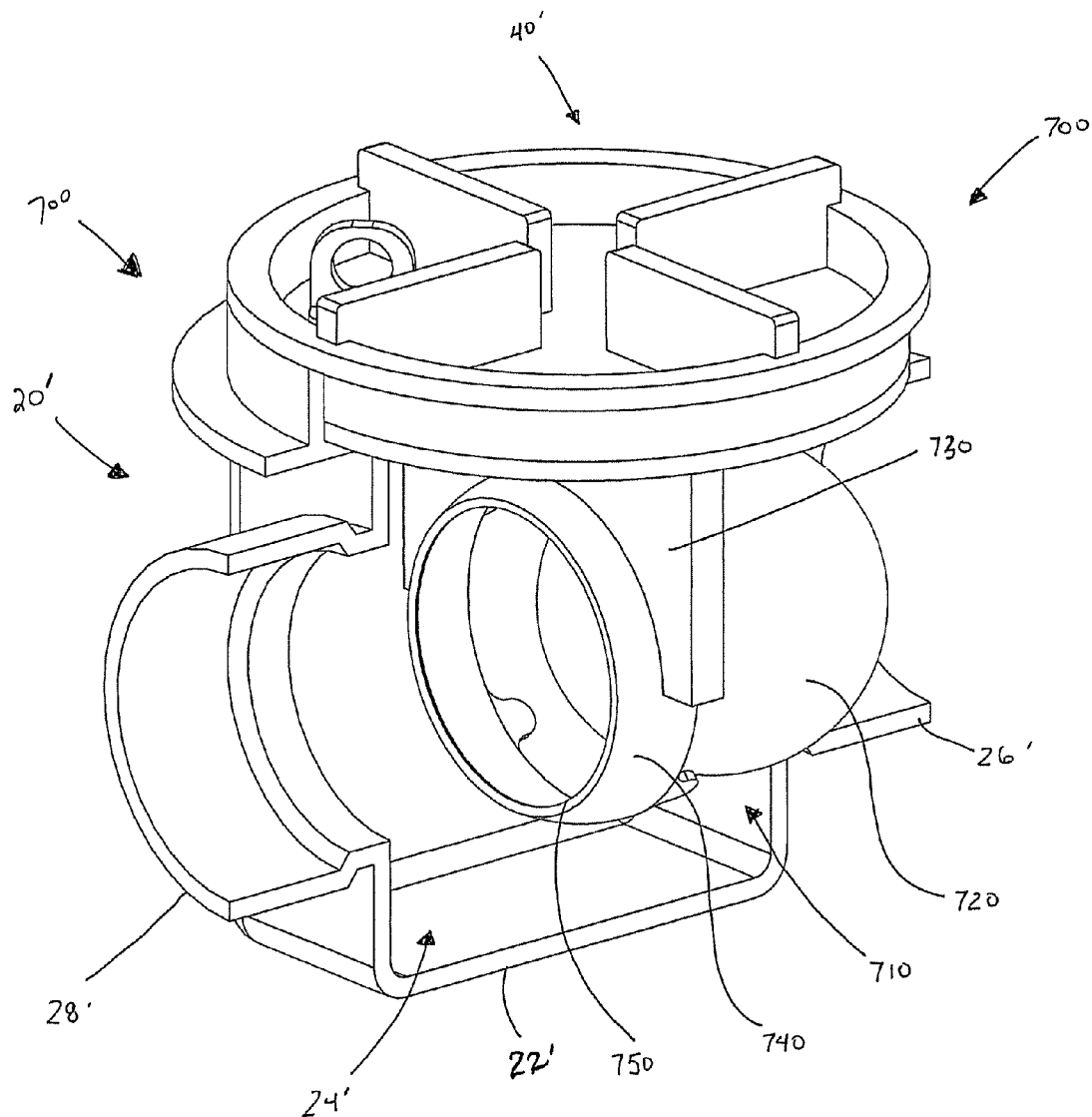
FIG. 7A shows a perspective view of another embodiment of a backwater valve assembly with the main valve body illustrated in cross-sectional form and the flow control element in a closed position.
Figure 7B:
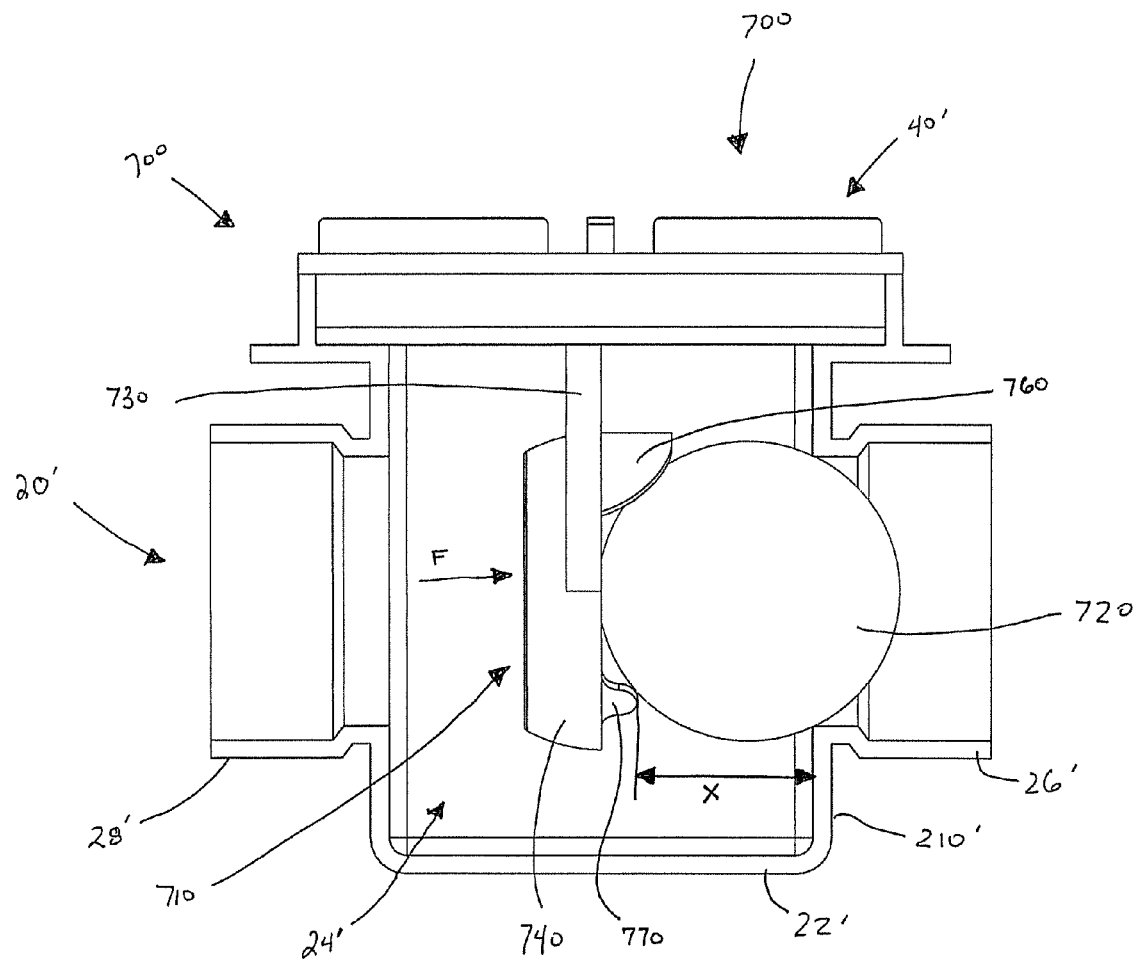
FIG. 7B shows a side elevational view of the embodiment of the backwater valve assembly in FIG. 7A with the main valve body illustrated in cross-sectional form and the flow control element in a closed position.
Figure 7C:
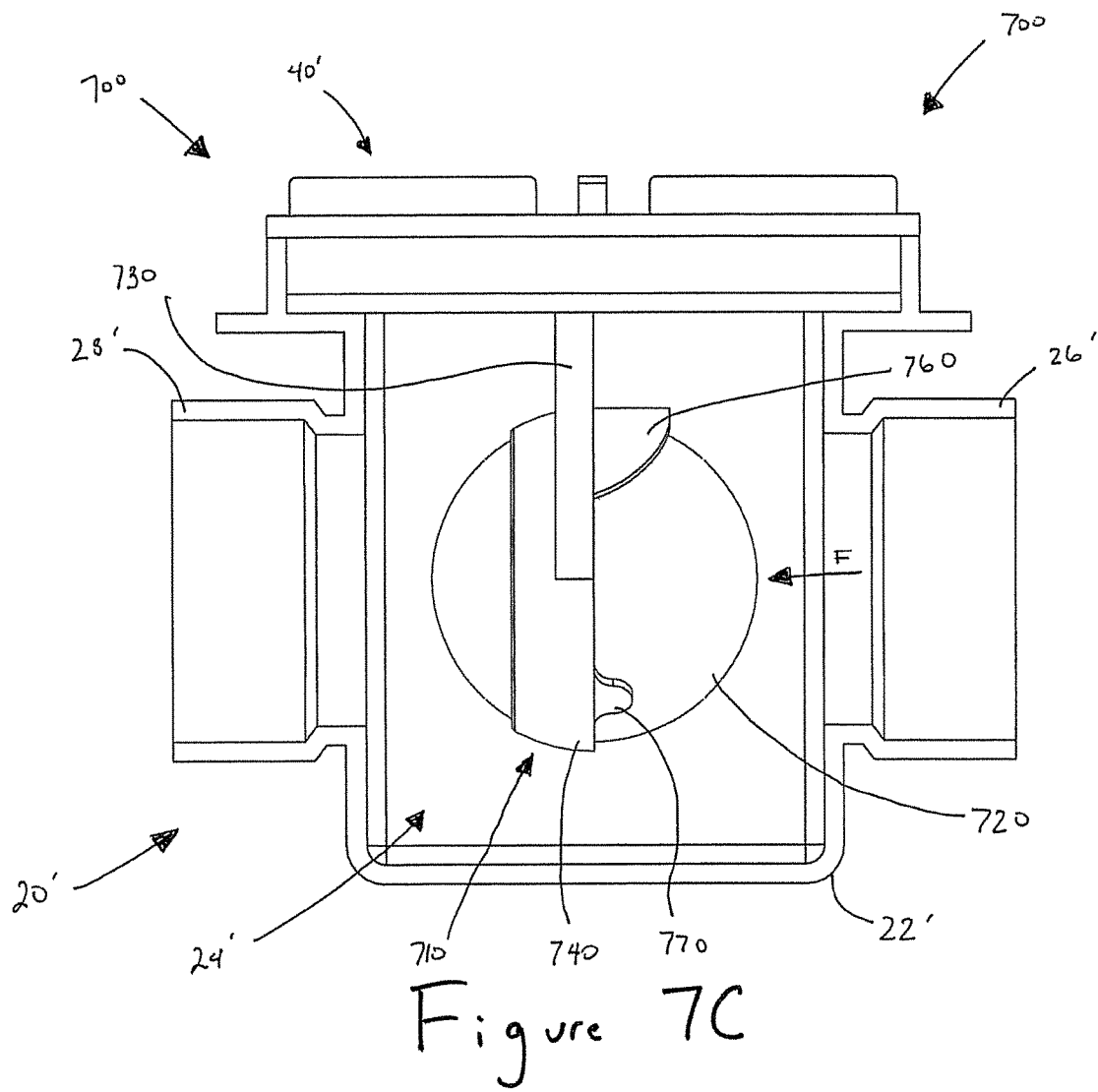
FIG. 7C shows a side elevational view of the embodiment of the backwater valve assembly in FIG. 7A (with the main valve body illustrated in cross-sectional form and the flow control element in an open position.

Referring now to FIGS. 7A-7D, a fourth exemplary embodiment of backwater valve assembly 700 is illustrated. The prime symbol is utilized in FIGS. 7A-7D to indicate elements of backwater valve assembly 700 which may be similar but may not be identical to elements of backwater valve assembly 10. Referring to FIGS. 7A-7D, the illustrated exemplary embodiment of backwater valve assembly 700 generally includes a main valve body 20', a valve assembly 710, and a cap 40'. The valve assembly 710 includes a flow control element 720 that permits fluid to flow freely in one direction but generally prevents fluid from flowing in the opposite direction. The valve assembly 710 includes a retainer portion 730 that includes a flow control receiving ring 740 with opening 750 defined therethrough. The flow control receiving ring 740 and opening 750 are sized, shaped and configured to at least partially receive flow control element 720 (as best illustrated in FIG. 7C). The retainer portion 730 of the valve assembly 710 may be coupled to cap 40' as described previously in connection with other exemplary embodiments. The main valve body 20' of the exemplary embodiment of the backwater valve assembly 500 generally includes a main wall 22' that defines an interior space 24', an inlet 26' and a outlet 28'.

Figure 7D:
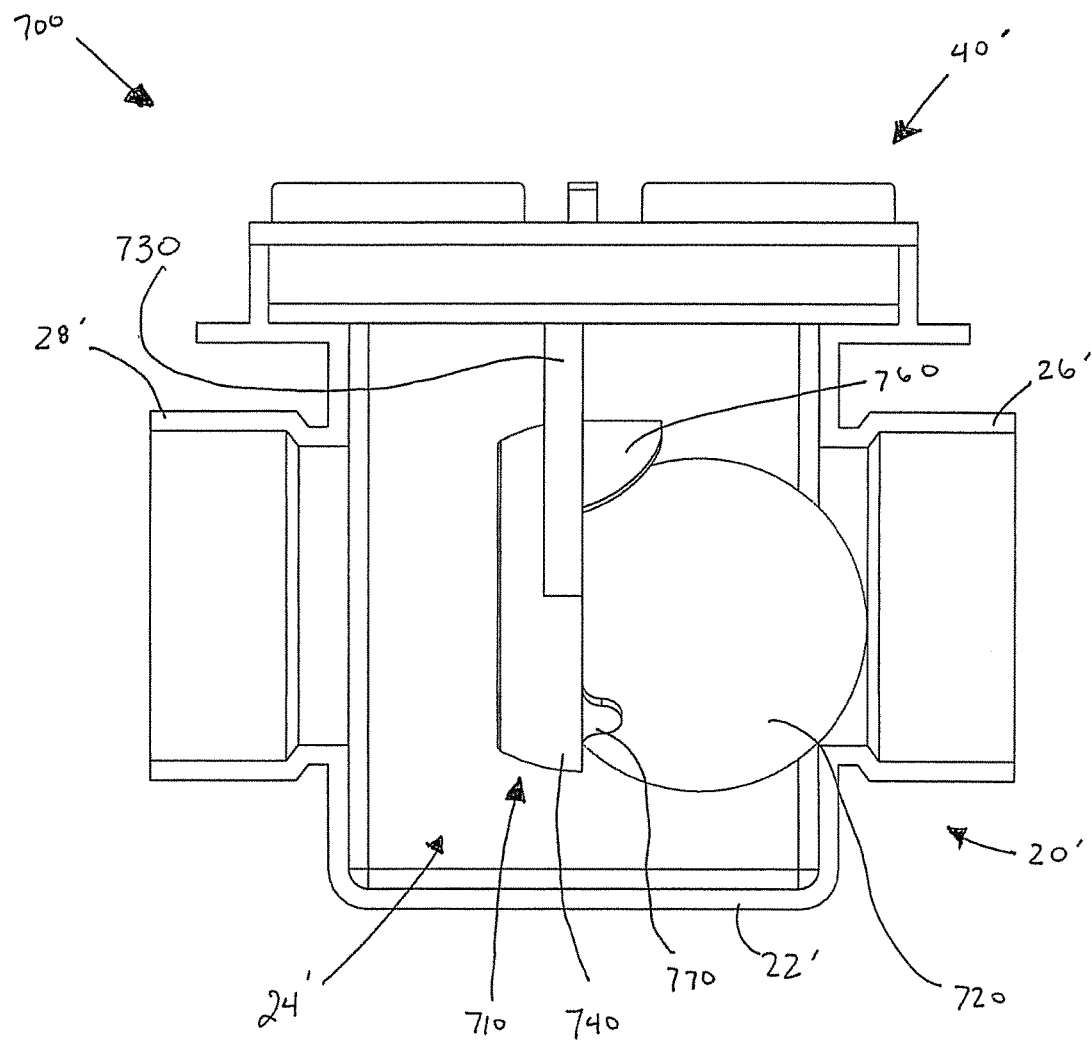
FIG. 7D shows a side elevational view of the embodiment of the backwater valve assembly in FIG. 7A with the main valve body illustrated in cross-sectional form and the flow control element in a neutral position.

The flow control element 710 moves within the interior 24' of the main valve body 20' relative to the main valve body 20' between a closed position in which inlet 26' of main valve body 20' is blocked (as illustrated in FIGS. 7A-7B) to prevent the backflow of fluid from the interior 24' of the main valve body 20' through the inlet 26' and an open position in which inlet 26' of main valve body 20' is unblocked (as illustrated in FIG. 7C). When the backwater valve assembly 600 is not experiencing any fluid flow, the flow control element 710 remains in a neutral position (as illustrated in FIG. 7D). As best illustrated in FIG. 7B, the retainer portion 730 of the valve assembly 710 includes a first projection 760 and a second projection 770 that extend outwardly from the retainer portion 730. The projections 760 and 770 are sized, shaped and configured to assist in retaining the flow control element 720 within the retainer portion. For example, as illustrated in FIG. 7B, the distance "x" between second projection 770 and wall 210 of main valve body is dimensioned to prevent flow control element 720 from falling out of the retainer portion 730. While the flow control element 710 of the illustrated exemplary embodiment 610 has a spherical shape, it should be understood that the flow control element of additional embodiments may have any shape that serves to permit fluid to flow freely in one direction but generally prevent fluid from flowing in the opposite direction.

Figure 8A:
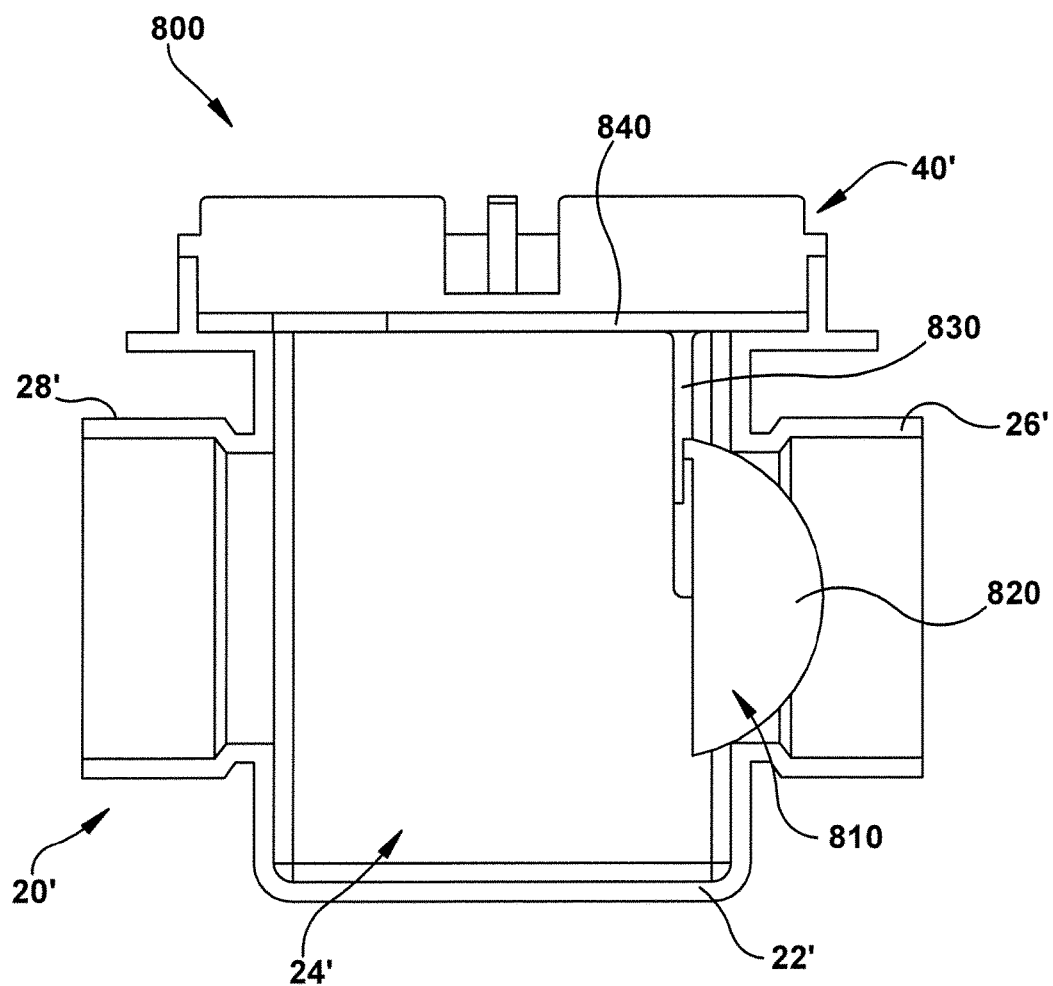
FIG. 8A shows a side elevational view of another embodiment of a backwater valve assembly with the main valve body illustrated in cross-sectional form and the flow control element in a closed position.
Figure 8B:
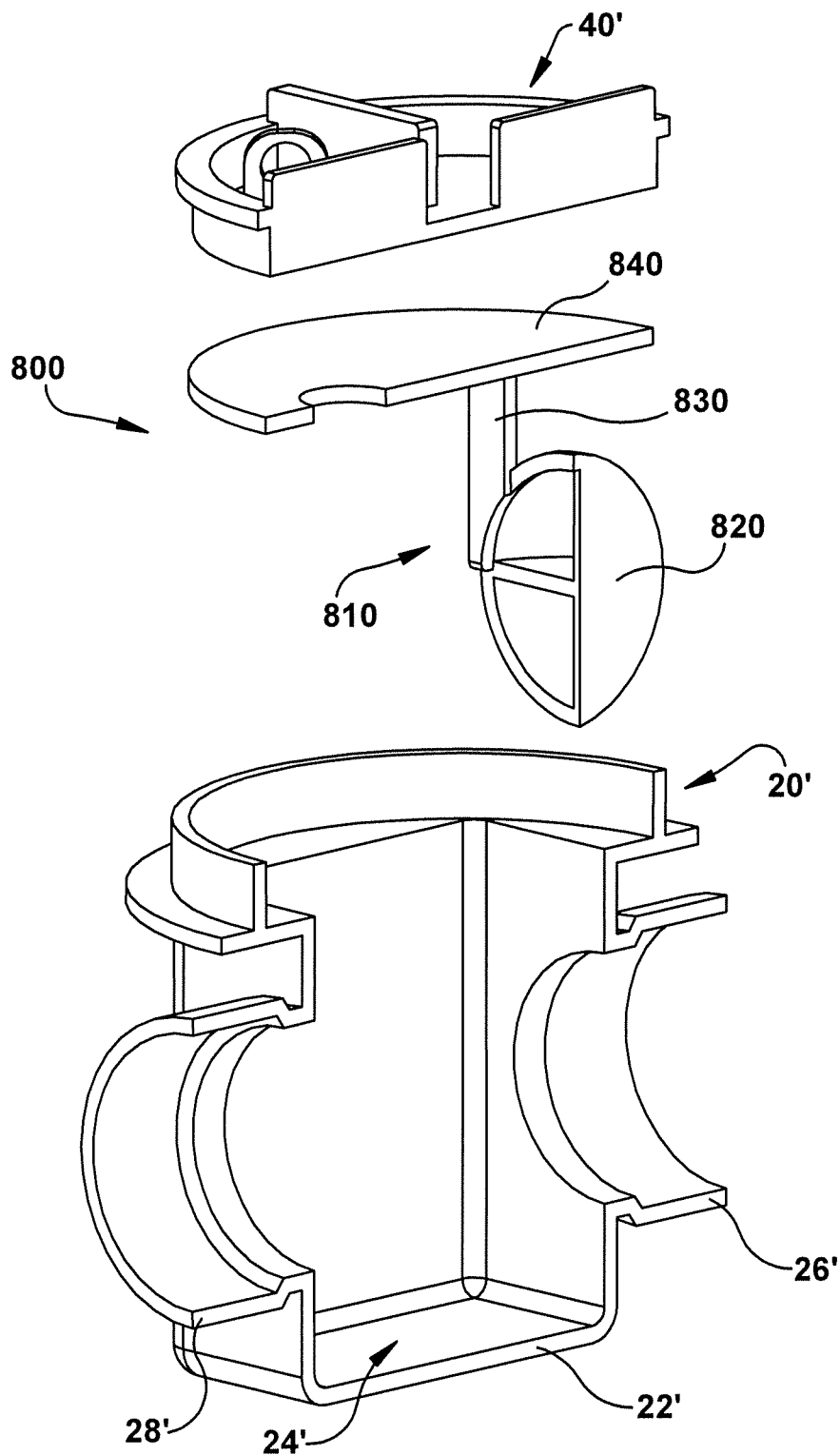
FIGS. 8B-8C show cross-sectional exploded perspective views of the embodiment of the backwater valve assembly in FIG. 8A.
Figure 8C:
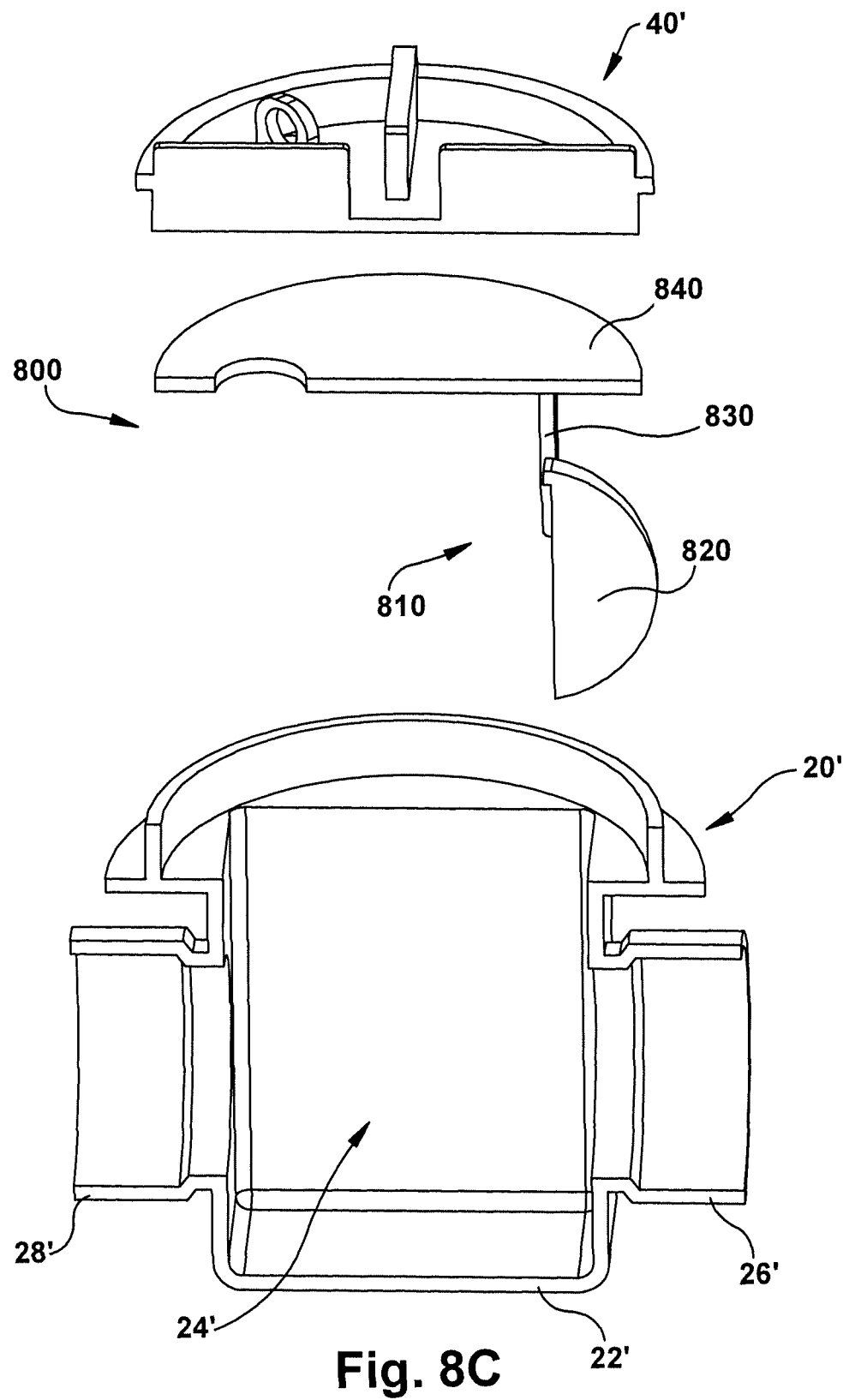

Referring now to FIGS. 8A-8C, a fifth exemplary embodiment of backwater valve assembly 800 is illustrated. The prime symbol is utilized in FIGS. 8A-8C to indicate elements of backwater valve assembly 800 which may be similar but may not be identical to elements of backwater valve assembly 10. Referring to FIGS. 8A-8C, the illustrated exemplary embodiment of backwater valve assembly 800 generally includes a main valve body 20', a cap 40', and a valve assembly 810. The valve assembly 810 includes a flow control element 820 that permits fluid to flow freely in one direction but generally prevents fluid from flowing in the opposite direction. The main valve body 20' of the exemplary embodiment of the backwater valve assembly 800 generally includes a main wall 22' that defines an interior space 24', an inlet 26' and a outlet 28'.

The flow control element 820 may be pivotally mounted (either directly or indirectly) to a cap 40', main valve body 20', or some other portion of the backwater valve assembly 800 by pivot element 830. As illustrated in FIGS. 8A-8C, the flow control element 820 is mounted by pivot element 830 to plate 840. Plate 840 may be coupled to the cap 40 or main valve body 20' in various embodiments. The flow control element 820 pivots on pivot element 830 relative to the main valve body 20' between a closed position in which inlet 26' of main valve body 20' is blocked (as illustrated in FIGS. 8A) to prevent the backflow of fluid from the interior 24' of the main valve body 20' through the inlet 26' and an open position in which inlet 26' of main valve body 20' is unblocked (not shown). The flow control element 820 of the illustrated exemplary embodiment 820 has the shape of half of a sphere, however, the flow control element of additional embodiments may have any shape that serves to permits fluid to flow freely in one direction but generally prevent fluid from flowing in the opposite direction.

Figure 9A:
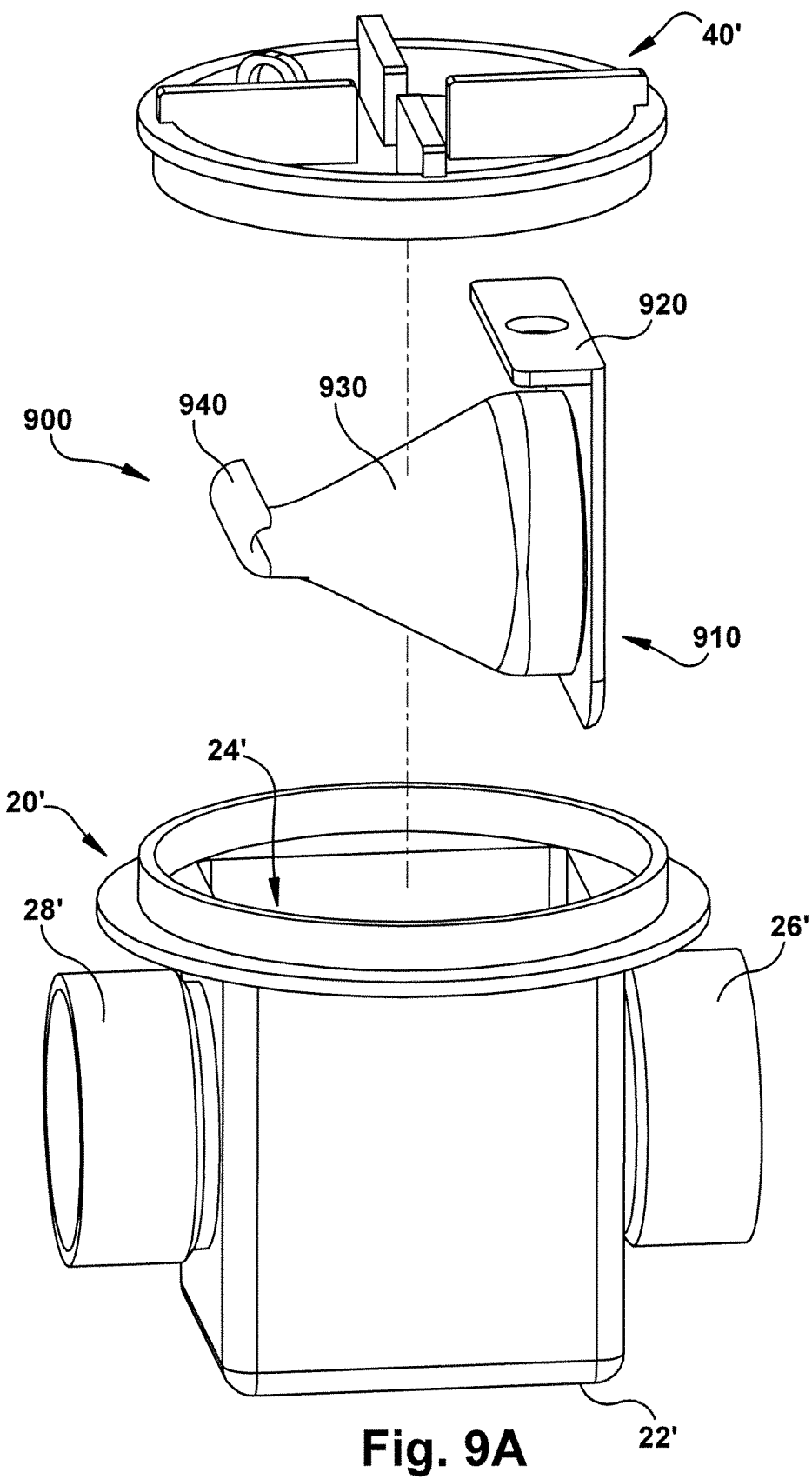
FIGS. 9A-9B show exploded perspective views of another embodiment of a backwater valve assembly.
Figure 9B:
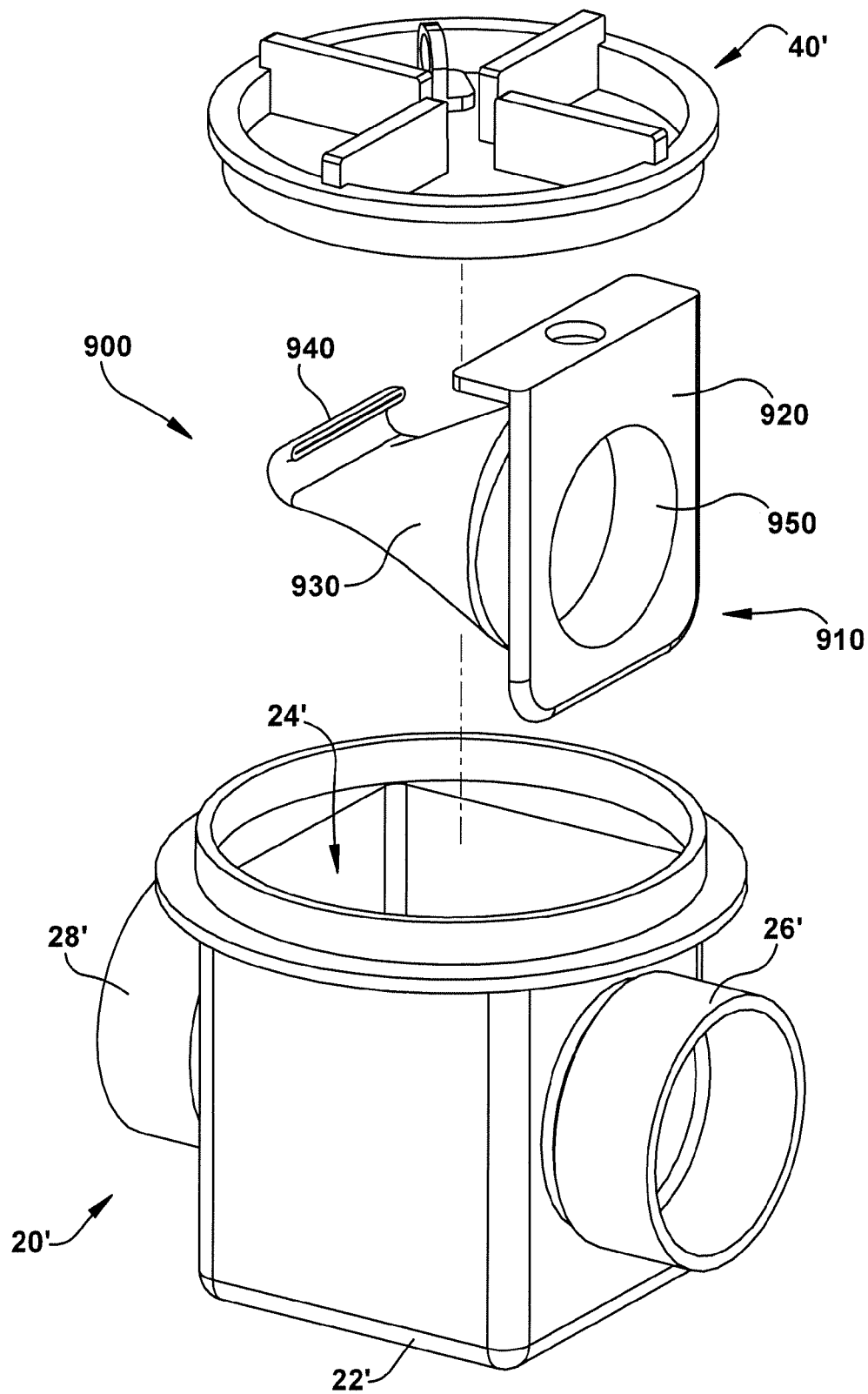

Referring now to FIGS. 9A-9B, a sixth exemplary embodiment of backwater valve assembly 900 is illustrated. The prime symbol is utilized in FIGS. 9A-9B to indicate elements of backwater valve assembly 900 which may be similar but may not be identical to elements of backwater valve assembly 10. Referring to FIGS. 9A-9B, the illustrated exemplary embodiment of backwater valve assembly 900 generally includes a main valve body 20', a cap 40', and a valve assembly 910. The valve assembly 910 includes main body portion 920 and a flow control element 930 that permit fluid to flow freely in one direction but generally prevents fluid from flowing in the opposite direction. The flow control element 930 may include a floatable portion. It should be understand that the various flow control elements and flappers disclosed herein may each include a floatable or buoyant portion in various embodiments. The main valve body 20' of the exemplary embodiment of the backwater valve assembly 800 generally includes a main wall 22' that defines an interior space 24', an inlet 26' and a outlet 28'.

The flow control element 930 may be pivotally mounted (either directly or indirectly) to cap 40', main valve body 20', main body portion 920 of the valve assembly 910 or some other portion of the backwater valve assembly 900 by pivot element 940. The flow control element 930 pivots on pivot element 940 relative to the main valve body 20' between a closed position in which opening 950 defined within the main body portion 920 of the valve assembly 910 is blocked to prevent the backflow of fluid from the interior 24' of the main valve body 20' through the inlet 26' and an open position in which opening 950 defined within the main body portion 920 of the valve assembly 910 is unblocked. The flow control element 930 of the illustrated exemplary embodiment 820 has a frustoconical shape, however, the flow control element of additional embodiments may have any shape that serves to permits fluid to flow freely in one direction but generally prevents fluid from flowing in the opposite direction.

Figure 10A:
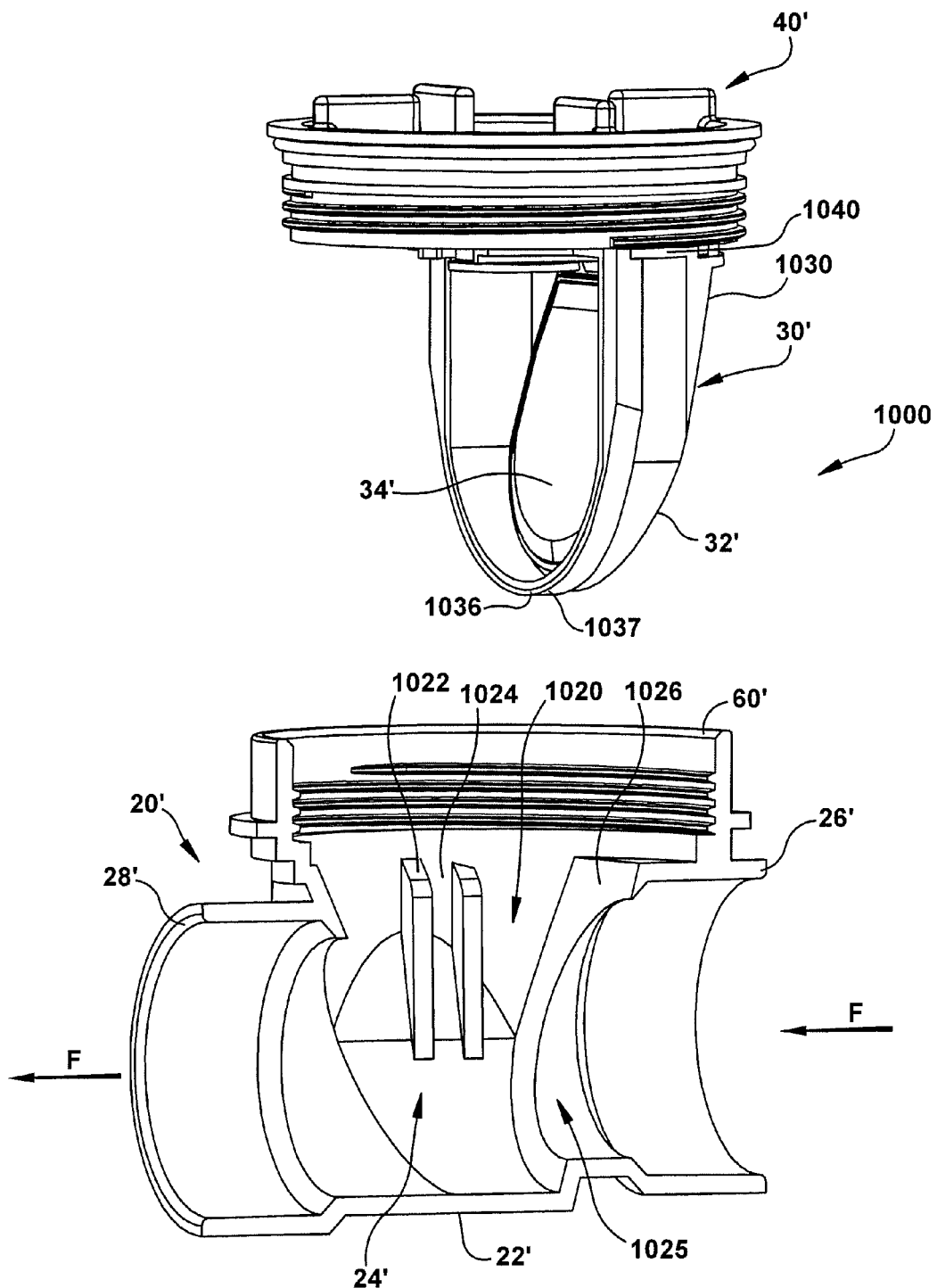
FIG. 10A shows a perspective exploded view of one embodiment of a backwater valve assembly, with the main valve body illustrated in cross-sectional form.
Figure 10C:
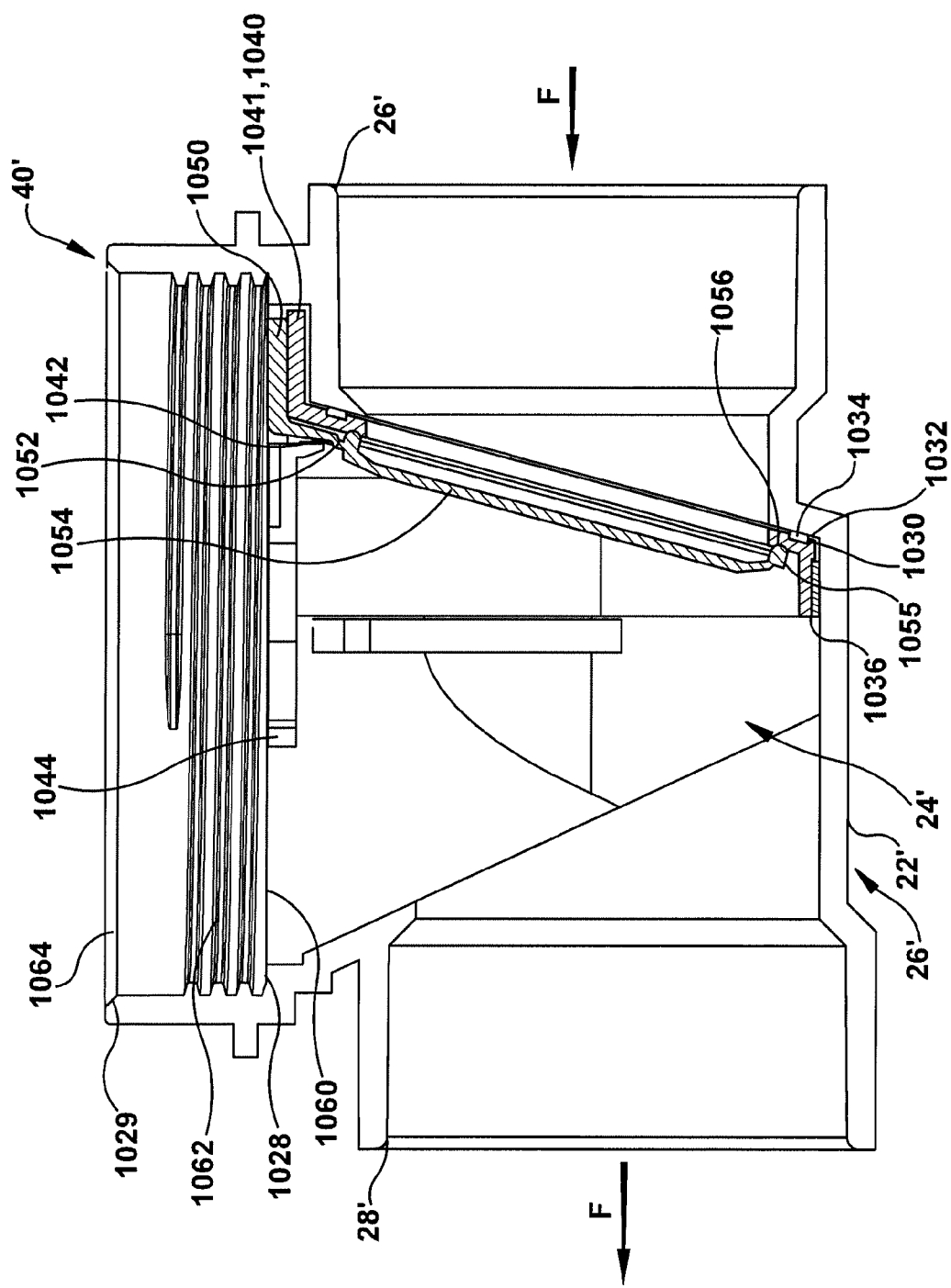
FIG. 10C shows a cross-sectional view of the embodiment of the backwater valve assembly illustrated in FIG. 10A, with the flapper element in the closed position.

Referring to FIGS. 10A-10C, an exemplary embodiment of a backwater valve assembly 1000 is illustrated. The prime symbol is utilized in FIGS. 10A-10C to indicate elements of backwater valve assembly 1000 which may be similar but may not be identical to elements of backwater valve assembly 10 illustrated in FIGS. 1A-1C. The exemplary backwater valve assembly 1000, shown in FIGS. 10A-10C, generally includes a main valve body 20', a flapper sub-assembly 30' and a cap 40'.

As shown in FIGS. 10A-10C, the main valve body 20' generally includes a main wall 22' that defines an interior space 24', an inlet 26', an outlet 28', and a port 60'. In some embodiments, inlet 26' and outlet 28' can be conduits that extend outwardly from main valve body 20', however, in additional embodiments the inlet 26' and 28' may be shaped or configured differently. For example, the inlet 26' and outlet 28' can be flanges or openings defined within the circular openings formed by the main wall 22' of the main valve body 20'. While the inlet 26' and outlet 28' have circular cross-sectional shapes in the illustrated embodiment, it should be understood that the inlet 26' and outlet 28' may have a variety of different cross-sectional shapes and configurations in additional embodiments.

As shown in FIGS. 10A-10C, the flapper sub-assembly 30' has a flapper element 34' and a main body portion 32' having an opening 1038. When the flapper element 34' is in the open position, the inlet 26', interior space 24' of the main valve body 20', opening 1038 of the main body portion 32' of the flapper sub-assembly 30', and outlet 28' combine to define a fluid flow path "F" through the backwater valve assembly 1000. With the flapper element 34' in the open position, fluid is free to flow from an upstream location (e.g. building or residence) of the main valve body 20', through the inlet 26', through the interior space 24' of the main valve body 20', through opening 1038 of the main body portion 32' of the flapper sub-assembly 30', and out of the outlet 28' to a downstream locations (e.g., stoma or sanitary sewer) of the backwater valve assembly 1000. In this manner, the flapper element 34' permits fluid to flow freely through the backwater valve assembly 1000 from inlet 26' to outlet 28'.

However, if fluid enters the backwater valve assembly 1000 from a position downstream of the backwater valve assembly 1000 through the outlet 28' in a direction opposing that of flow path "F", the flapper element 24' will pivot to the closed position in response to the fluid flow and cover over opening 1038, thus preventing fluid from flowing from a location downstream of the backwater valve assembly 1000 through the backwater valve assembly 1000 and out through the inlet 26'. In this manner, the exemplary embodiment of the backwater valve assembly 1000 can be used to prevent sewage or waste water from backing up into a residence or building as the result of a blocked waste removal system, such as a storm or sanitary sewer at a location downstream from the backwater valve assembly 1000.

Referring still to the exemplary embodiment depicted in FIGS. 10A-10C, the main valve body 20' can include a port 60' disposed in the main wall 22'. The port 60' can be generally circular in shape and can extend in a generally vertical direction through the main wall 22'. The port 60' can be threaded in order to be threadably engaged with the cap 40'. The exemplary embodiment of the main valve body 20' illustrated in FIGS. 10B-10C includes surface 1028. When cap 40' is mounted within port 60', a bottom surface 1060 of cap mounting portion 1062 of cap 40' can abut surface 1028 when cap 40' has been fully inserted to provide a firm seat for cap 40' within the main valve body 20'. In some embodiments, a cap sealing element 1066 (shown in FIG. 10B) can be used to create a generally fluid tight seal between the cap 40' and the main valve body 20'. Cap sealing element 1066 can be formed of any resilient material, such as rubber, for example. In some embodiments, the cap sealing element 1066 can be a rubber O-ring. Cap 40' of the exemplary illustrated embodiment can include rim 1064 that abuts top surface 1029 of port 60' when cap 40' has been fully inserted within port 60'. However, it should be understood that the main valve body 20', port 60', and cap 40' can have a variety of shapes and configurations in additional embodiments, and can be provided without surface 1028 or rim 1064.

Referring again to FIGS. 10A-10C, in the illustrated exemplary embodiment of backwater valve assembly 1000, cap 40' is connected with the main valve body 20' to enclose the interior space 24' of the main valve body 20'. When the flapper sub-assembly 30' is mounted within the backwater valve assembly 1000 of the embodiment illustrated in FIGS. 10A-10C, the cap 40' vertically retains the flapper subassembly 30' in the flapper sub-assembly position 1020 of the main valve body 20'. Cap 40' of the illustrated exemplary embodiment in FIGS. 10B-10C includes a cap mounting portion 1062 which is adapted for receipt within port 60' of main valve body 20' to provide a generally fluid tight seal between cap 40' and main valve body 20'. The cap 40' may be mounted within port 60' in a variety of ways in various embodiments. For example, the cap mounting portion 1062 may include threads that mate with corresponding threads defined within port 60', the cap 40' may be retained within port 60' by a friction fit, the cap 40' may be retained within port 60' by use of locking tabs that fit within corresponding slots in the port 60', or the cap 40' may be retained within port 60' in any other suitable manner. In embodiments that include a cap 40' that is threadably engaged with port 60', the cap 40' and port 60' may be dimensioned and configured to accommodate engagement of threads defined within the interior of port 60' with threads defined on the exterior of cap mounting portion 1062 or to accommodate engagement of threads defined on the exterior of port 60' with threads defined on the interior of cap mounting portion 1062.

As shown in FIGS. 10A-10C, the main valve body 20' can have a plurality of guide elements 1022 and a mounting surface 1026 that define a flapper sub-assembly position 1020. As illustrated, the mounting surface 1026 can be generally located at the inlet 26' side of the interior space 24' of the main valve body 20' and can be a flat surface disposed at an angle from vertical and having an mounting surface opening 1025 that is generally circular in shape. The angle of the mounting surface 1026 can be sufficient to allow gravitational force enable seal the flapper element 34' to form a generally fluid tight seal against the main body portion 32' of the flapper sub-assembly 30' when in the closed position (i.e., in response to a no-flow or backflow condition). In some embodiments, the mounting surface opening 1025 can have dimensions substantially similar to the interior dimensions of the inlet 26'. The guide elements 1022 can extend from the main wall 22' of the main valve body 20' into the interior space 24' in a manner that is generally perpendicular to flow path "F" through the backwater valve assembly 1000. The guide elements 1022 can be disposed on either side of the interior space 24' such that the guide elements 1022 secure the flapper sub-assembly 30' against the mounting surface 1026 (illustrated in FIGS. 10B-10C). In some embodiments, the main valve body 20' can have four guide elements 1022 arranged such that two guide elements 1022 can be coupled to each side of the main wall 22' to form a channel 1024 down into which the flapper sub-assembly 30' can slide vertically. In some embodiments, the main valve body 20' can have two guide elements 1022, one on either side of the interior space 24'. In some embodiments, the guide elements 1022 can be formed or cast as part of the main wall 22' of the main valve body 20'. In some embodiments, the guide elements 1022 can be formed in a separate forming process and can be coupled to the main wall 22' of the main valve body 20'.

The flapper sub-assembly 30' of the exemplary embodiment illustrated in FIGS. 10A-10C generally includes a main body portion 32' and a flapper element 34' integrated with the main body portion 32'. As previously described, a flapper sub-assembly position 1020 is defined by a mounting surface 1026 and a plurality of guide elements 1022, in the main valve body 20', that receive the main body portion 32' of the flapper sub-assembly 30'. The main body portion 32' of the flapper sub-assembly 30' includes a outer wall 1036 that is generally sized, shaped and configured to correspond to the shape of the flapper sub-assembly position 1020 of the main valve body 20' that receives the main body portion 3'2 of the flapper sub-assembly 30'. The correspondence of the shape of the outer wall 1036 of the main body main body portion 32' of the flapper sub-assembly 30' with the shape of the flapper sub-assembly position 1020 of the main valve body 20' provides for general ease of assembly and the consistent and proper alignment of the flapper sub-assembly 30' with the main valve body 20' during assembly and re-assembly of the backwater valve assembly 1000.

The main body portion 32' of the flapper sub-assembly 34' has a first opening 1038 that can be generally similar in shape to the mounting surface opening 1025 of the main valve body 20'. In the exemplary embodiment depicted in FIGS. 10A-10C, the outer wall 1036 of the main body portion 32' can be U-shaped to conform to the shape of the main wall 22' of the main valve body 20' that is also generally U-shaped. The main body portion 32' has a main body mounting surface 1030 that is generally flat and oriented in a direction opposing the mounting surface 1026 of the main valve body 20'. The main body mounting surface 1030 is angled such that the main body mounting surface 1030 can seat against the mounting surface 1026 of the main valve body 20'. In the embodiment illustrated in FIGS. 10A-10C, the main body mounting surface 1030 can have a groove 1032 that is generally circular and that can accommodate a first seal member 1034 (illustrated in FIG. 10C). The first seal member 1034 can be made of any resilient material and can create a generally fluid tight seal between the main body mounting surface 1030 of the flapper sub-assembly 30' and the mounting surface 1026 of the main valve body 20'. In some embodiments, the first seal member 1034 can be an O-ring.

As illustrated in FIG. 10A, a second seal member 1037 can be coupled to the outer wall 1036 of the main body portion 32' of the flapper sub-assembly 30' such that the second seal member 1037 creates a generally fluid tight seal between the outer wall 1036 of the main body portion 32' of the flapper sub-assembly 30' and the main wall 22' of the main valve body 20' when the flapper sub-assembly 30' is installed in the main valve body 20'. The second seal member 1037 can prevent fluid from seeping through gaps between the flapper sub-assembly 30' and the main valve body 20' when the flapper element 34' is in the closed position. The second seal member 1037 can be made of any resilient material capable of forming a generally fluid tight seal.

As shown in FIGS. 10B-10C, the main body portion 32' can have an upper wall 1040 disposed above the main body mounting surface 1030 and the outer wall 1036. The upper wall 1040 can include a flapper element mount portion 1041 and a cap mount portion 1044. The flapper element mount portion 1041 can be disposed above the main body mounting surface 1030 and can extend towards the inlet 26' in a plane parallel to flow path "F". The flapper element mount portion 1041 can have one or more tabs 1043 (see FIG. 14A) extending vertically from the flapper element mount portion 1041. In some embodiments, the tabs 1043 can be used to secure the flapper element 34' to the main body portion 32'. The upper wall 1040 of the main body portion 32' can have a cap mount portion 1044 that is generally horizontal and generally facilitates attachment of the flapper sub-assembly 30' to the cap 40' (described in more detail below). The main body portion 32' has a second opening 1042 (shown in FIG. 10C) disposed downstream of the flapper element mount portion 1041. The second opening 1042 is generally disposed between the flapper element mount portion 104 and the cap mount portion 1044 and can be a slot through which the flapper element 34' is disposed.

Shown in FIGS. 10A-10C, the flapper element 34' can be integrated with the main body portion 32' of the flapper sub-assembly 30'. The flapper element 34' is constructed of a resilient material and has a mounting portion 1050, a pivot portion 1052, and a flapper portion 1054. The pivot portion 1052 is disposed between the flapper portion 1054 and the mounting portion 1050. With the mounting portion 1050 secured to the horizontal portion 1040 of the main body portion 32' of the flapper sub-assembly 30', the pivot portion 1052 enables the flapper portion 1054 to pivot relative to the mounting portion 1050 between an open position, in which the first opening 1038 through the main body portion 32' of the flapper sub-assembly 30' is uncovered, and a closed position, in which the flapper portion 1054 covers the first opening 1038. As illustrated in FIGS. 10B-10C, the flapper portion 1054 can have a protrusion 1056 disposed along an outer periphery 1055 of the flapper portion 1054 on an inlet side of the flapper portion 1054, which is the side of the flapper portion 1054 facing the inlet 26' of the main valve body 20'. The flapper element 34' can be made of a resilient material capable of allowing the pivot portion 1052 to pivot and capable of enabling the protrusion 1056 to create a generally fluid tight seal against the main body portion 32' when the flapper element 34' is in the closed position.

Figure 11A:
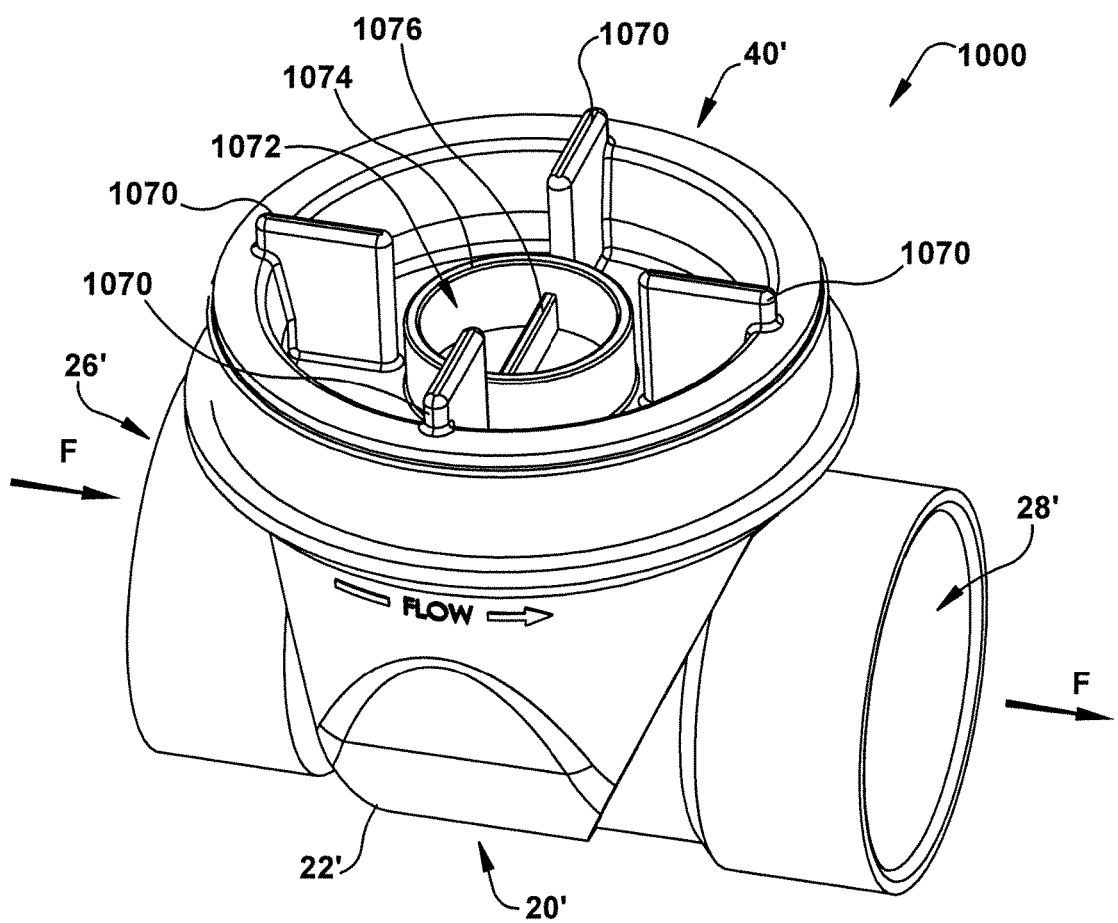
FIG. 11A shows a perspective view of the main valve body and the cap of the embodiment of the backwater valve assembly illustrated in FIGS. 10A-10C.
Figure 11B:
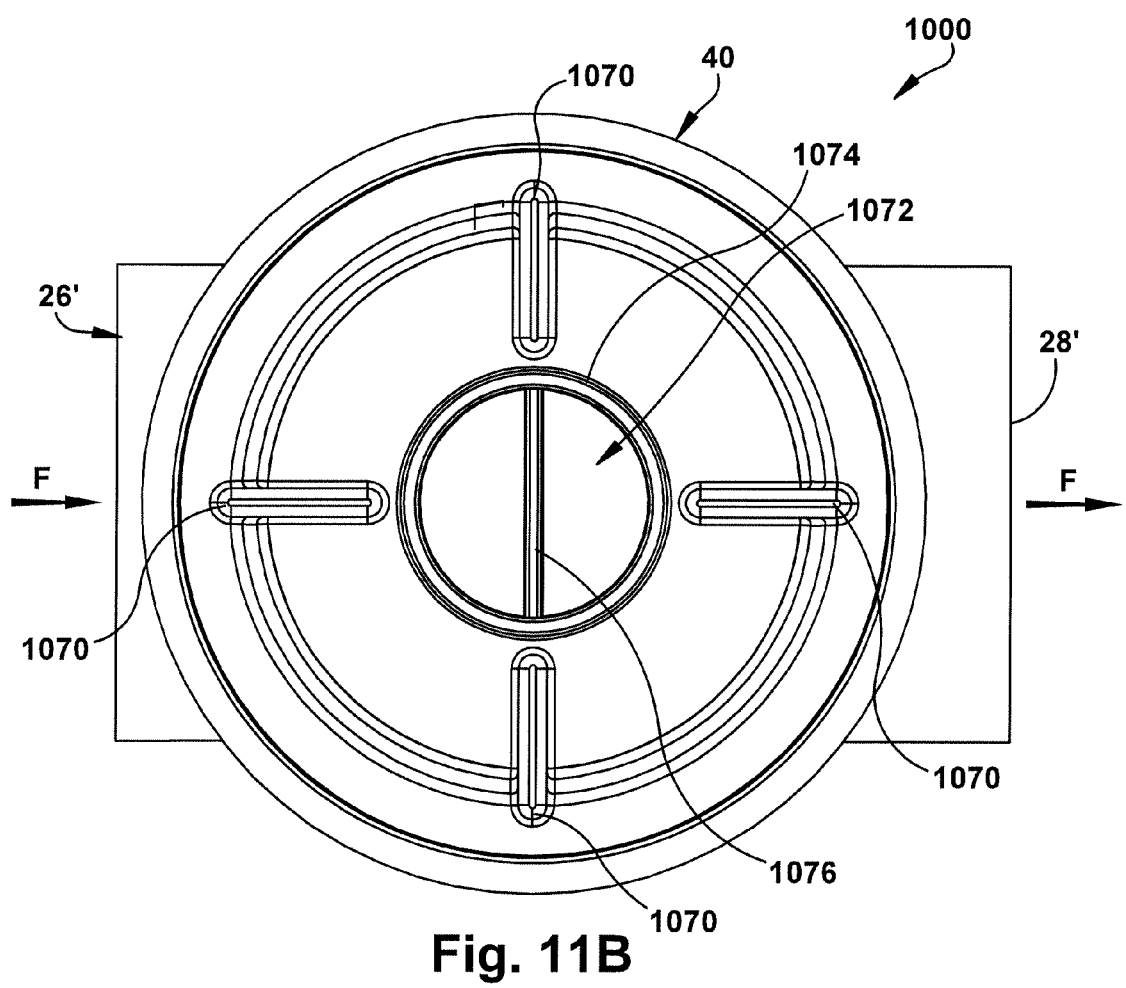
FIG. 11B shows a top plan view of the main valve body and the cap of the embodiment of the backwater valve assembly illustrated in FIGS. 10A-10C.
Figure 11C:
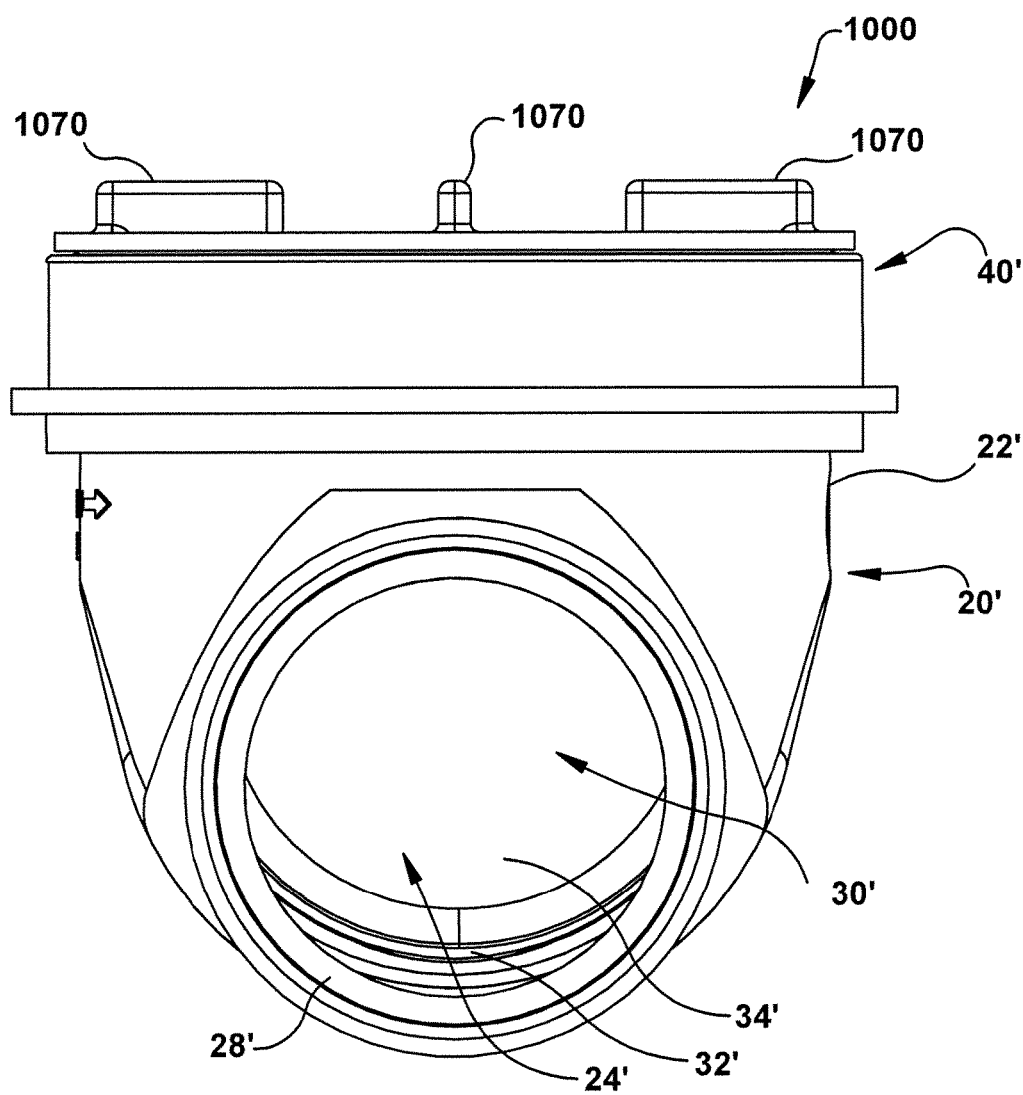
FIG. 11C shows a front elevational view of the main valve body and the cap of the embodiment of the backwater valve assembly illustrated in FIGS. 10A-10C.
Figure 11D:
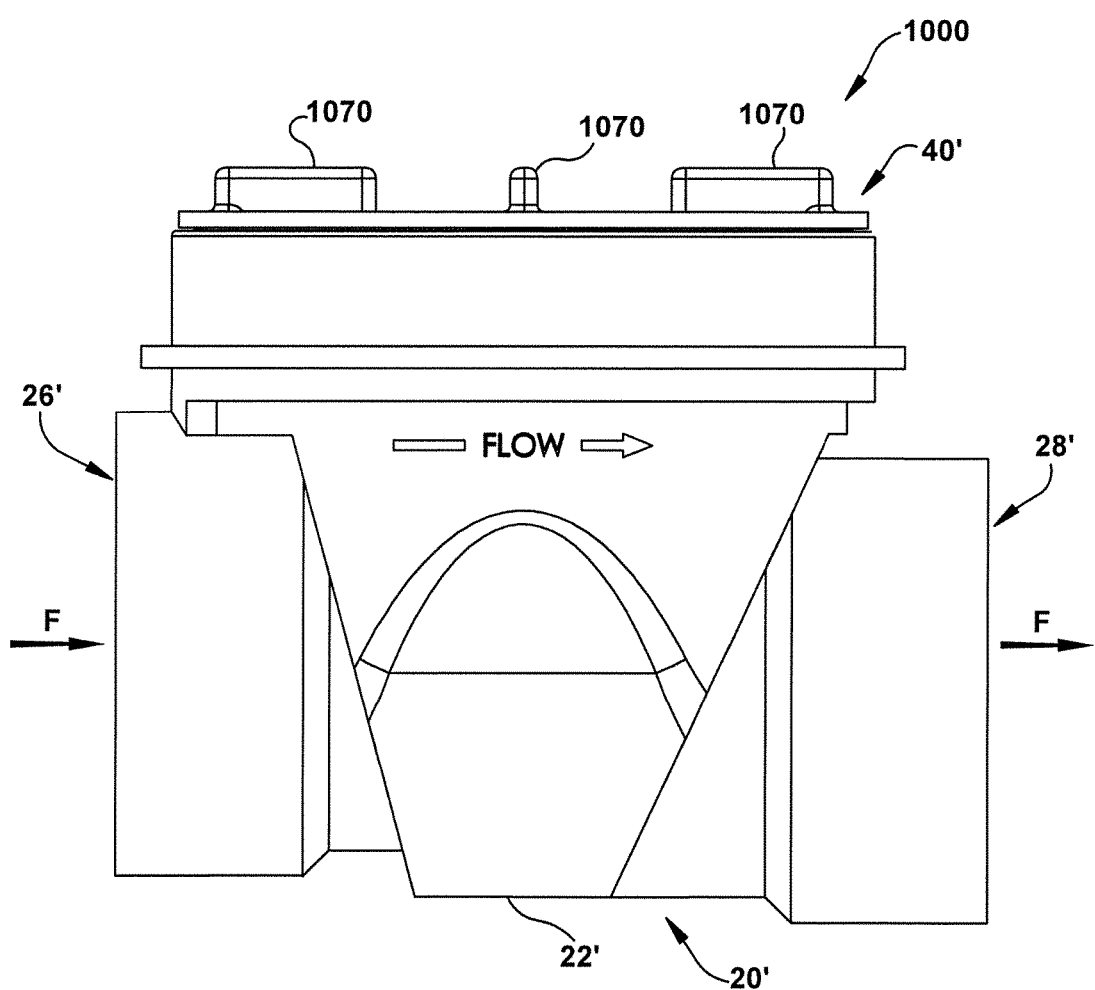
FIG. 11D shows a side elevational view of the main valve body and the cap of the embodiment of the backwater valve assembly illustrated in FIGS. 10A-10C.

Referring now to FIGS. 11A-11D, certain aspects of the main valve body 20' and cap 40' of the exemplary embodiment of backwater valve assembly 1000 illustrated in FIGS. 10A-10C are shown in further detail. Backwater valve assembly 1000 includes a main valve body 20', a cap 40', and a flapper sub-assembly 30'. The main valve body 20' includes a main wall 22', inlet 26', and outlet 28'. As shown in FIG. 11C, the flapper sub-assembly 30', which includes a main body portion 32' and a flapper element 34', is disposed within the interior space 24' formed by the main wall 22' of the main valve body 20'. The cap 40' of the exemplary embodiment, illustrated in FIGS. 11A-11D, can include a plurality of ribs 1070 that can provide strength and rigidity to the cap 40'. Ribs 1070 can be used to assist in turning the cap 40' to screw or unscrew the cap 40' within port 60' in embodiments where the cap 40' is threadably engaged with port 60'. As illustrated in FIGS. 11A-11B, cap 40' can include a cap gripper mount 1072 that can accommodate a cap gripping feature (as illustrated in FIGS. 4A-4H). As shown in FIGS. 11A-11B, the cap gripper mount 1072 is formed by a generally circular shaped wall 1074 that is bisected by wall 1076. Circular wall 1074 and wall 1076 are sized, shaped and configured to integrate with a cap gripping feature, such as the cap gripping feature illustrated in FIGS. 4A-4D, for example.

Figure 12B:
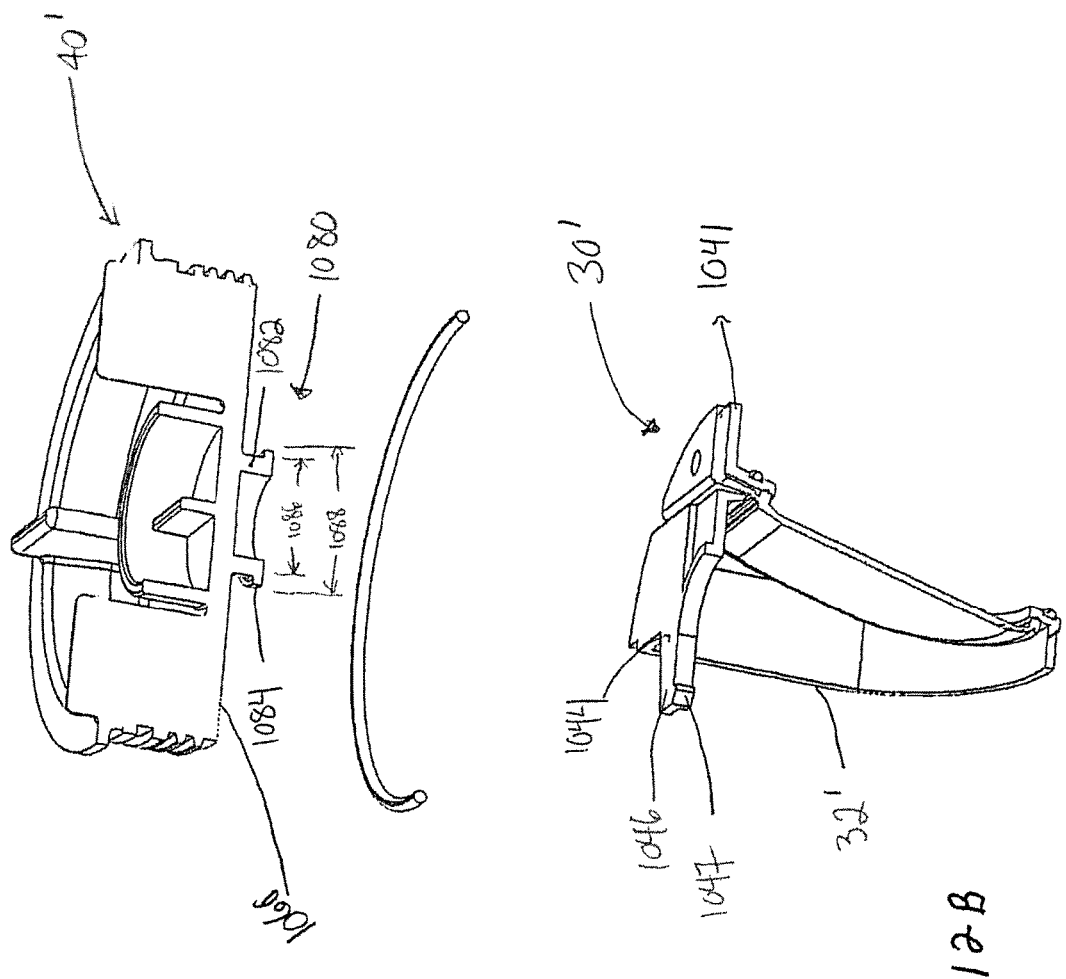
FIG. 12B shows a front perspective exploded cross-sectional view of the flapper sub-assembly and cap of the embodiment of the backwater valve assembly illustrated in FIG. 10A-10C.
Figure 12:
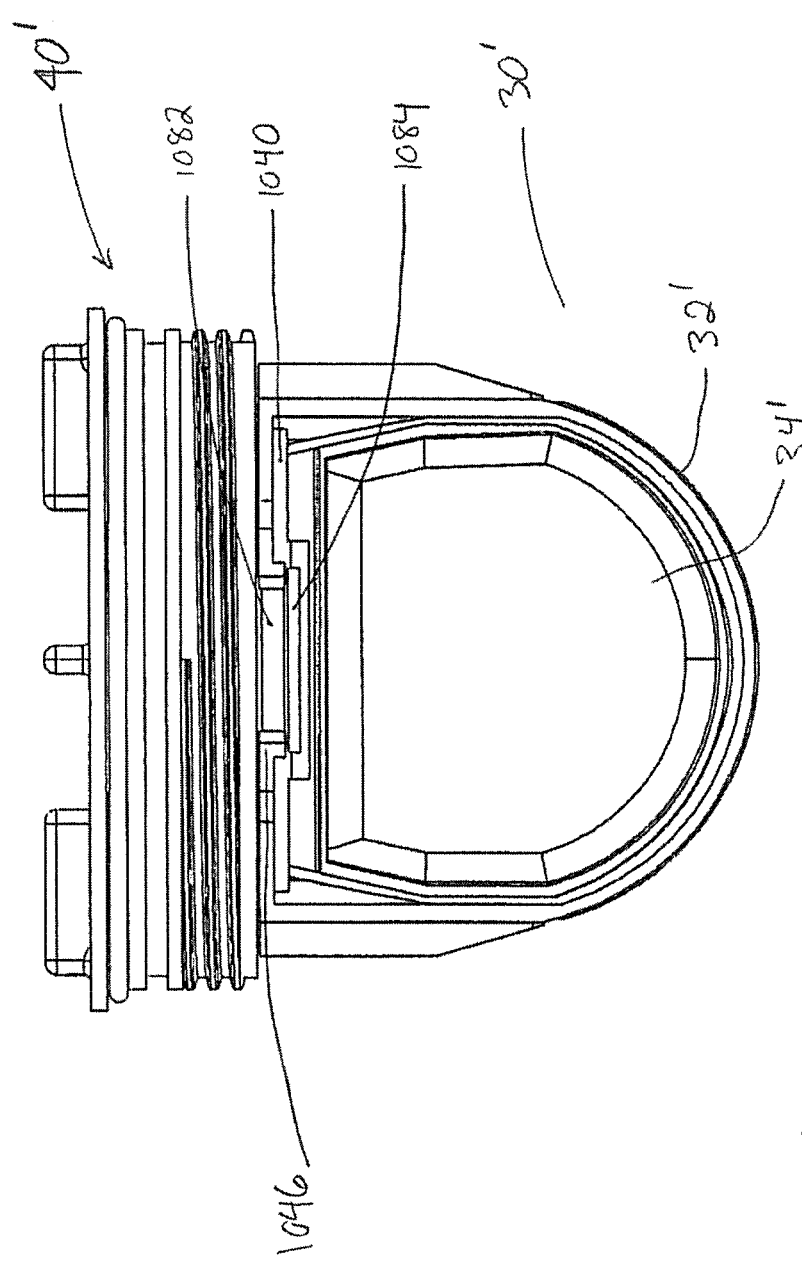
FIG. 12A shows a front exploded perspective view of the flapper sub-assembly and cap of the embodiment of the backwater valve assembly illustrated in FIGS. 10A-10C.
FIG. 12C shows a bottom perspective view of the flapper sub-assembly and cap of the embodiment of the backwater valve assembly illustrated in FIGS. 10A-10C.
FIG. 12D shows a front plan view of the flapper sub-assembly and cap of the embodiment of the backwater valve assembly illustrated in FIGS. 10A-10C, with the flapper in the closed position.
FIG. 12E shows a rear plan view of the flapper sub-assembly and cap of the embodiment of the backwater valve assembly illustrated in FIGS. 10A-10C, with the flapper in the closed position.
FIG. 12F shows a side elevational view of the flapper sub-assembly and cap of the embodiment of the backwater valve assembly illustrated in FIG. 10A-10C, with the flapper in the closed position.
FIG. 12G shows a bottom plan view of the flapper sub-assembly and cap of the embodiment of the backwater valve assembly illustrated in FIGS. 10A-10C, with the flapper in the closed position.
Figure 17E:
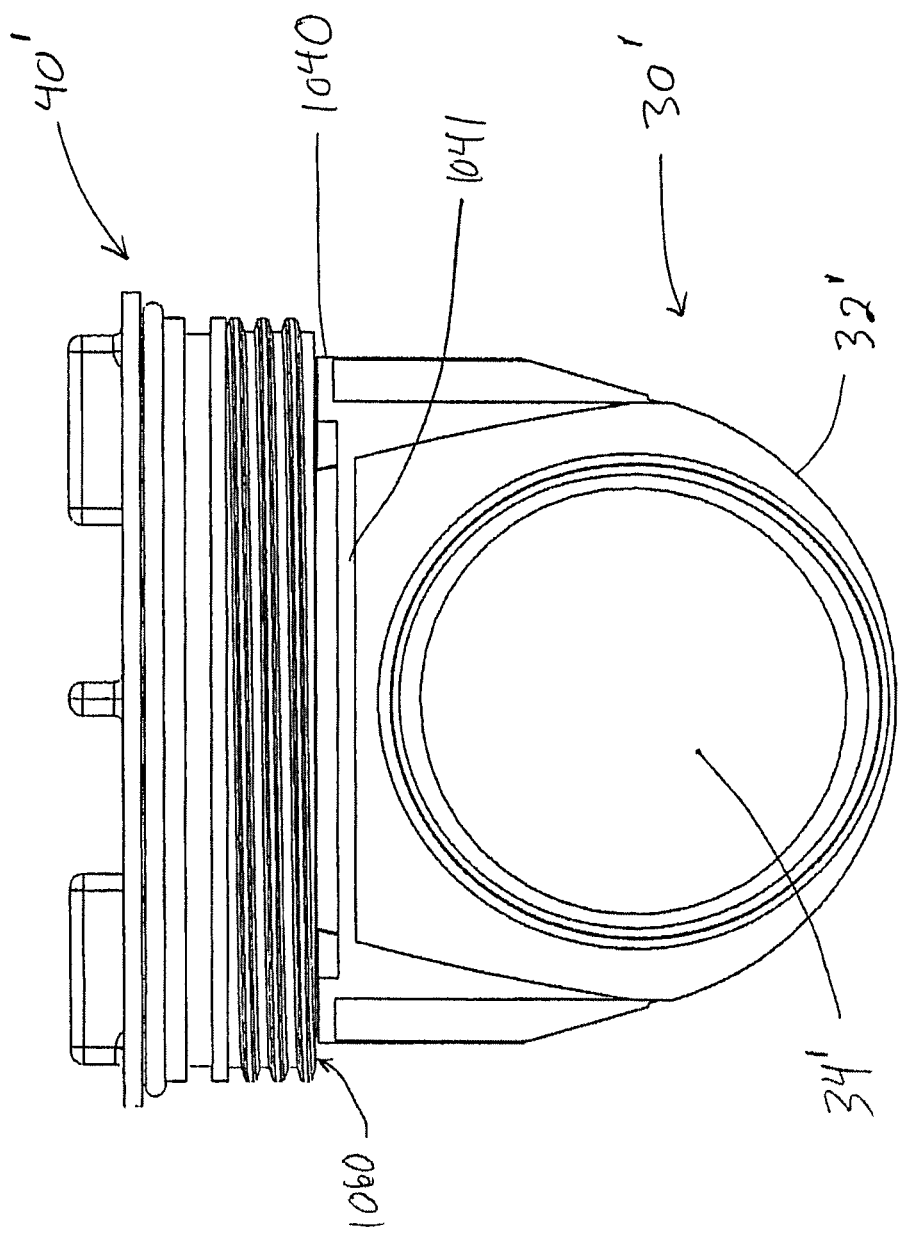
Figure 12G:
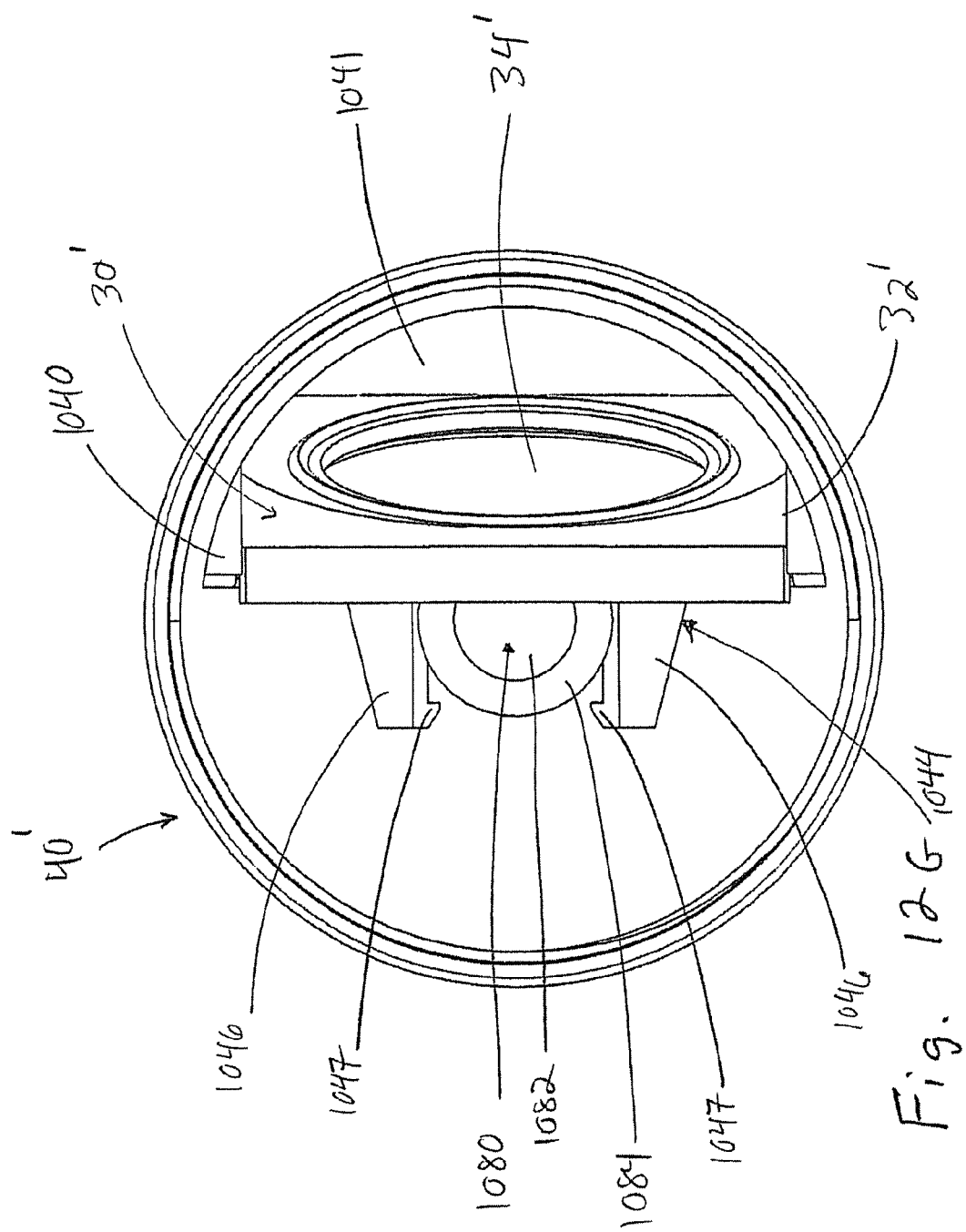

Referring now to FIGS. 12A-12G, certain aspects of the flapper sub-assembly 30' and cap 40' of the exemplary embodiment of backwater valve assembly 1000 illustrated in FIGS. 10A-10C are shown in further detail. The exemplary illustrated embodiment of the cap 40' includes a flapper sub-assembly mount feature 1080 that extends vertically downward from the cap bottom surface 1060 (as shown in FIG. 12B). The flapper sub-assembly mount feature 1080 includes a mount feature wall 1082 and a rim 1084. In the exemplary embodiment illustrated in FIGS. 12A-12G, the mount feature wall 1082 is circular in shape. In other embodiments of the backwater valve assembly 1000, the mount feature wall 1082 can have any convenient shape, such as square, rectangular, polygonal, or other shape, for example. In some embodiments, the mount feature wall 1082 can be a plurality of arcuate wall segments. As shown in FIGS. 12B-12D, the flapper element mount feature 1080 has a rim 1084 disposed near the bottom of the mount feature wall 1082 and protruding outward from the mount feature wall 1082. The flapper element mount feature 1080 can be characterized by a first dimension 1086 that describes an outer dimension of the mount feature wall 1082 and a second dimension 1088 that describes an outer dimension of the rim 1084. In the illustrated exemplary embodiment, the second dimension 1088 is generally expected to be greater than the first dimension 1086.

Still referring to FIGS. 12A-12G, the upper wall 1040 of the main body portion 32' of the flapper sub-assembly 30' illustrated includes a cap mount portion 1044 having a plurality of mounting arms 1046 that form a cap mount opening 1048. In the exemplary embodiment illustrated, the cap mount portion 1044 has two mounting arms 1046 that create a cap mount opening 1048 dimensioned and configured so that the cap mount portion 1044 can slide over the flapper sub-assembly mount feature 1080 of the cap 40' such that the mounting arms 1046 of the cap mount portion 1044 are supported by the rim 1084 of the flapper sub-assembly mount feature 1080 and such that the cap 40' can freely rotate relative to the flapper sub-assembly 30'. In this manner, the cap 40' and main body portion 32' can be securely coupled together and yet the cap 40' is free to rotate relative to the main body portion 32'. This permits for the cap 40' to be threaded into or out of the port in the main valve body (not shown) while the main body portion 32' of the flapper sub-assembly 30' remains stationary in the flapper sub-assembly position of the main valve body during installation of the flapper sub-assembly 30' and cap 40' into the main valve body during the assembly, disassembly, and re-assembly of the backwater valve assembly 1000. In some embodiments, such as the exemplary embodiment depicted in FIG. 12A, the mounting arms 1046 can have an inward protrusion 1047 at the end such that the inward protrusion 1047 can act as a clip or a stop to prevent the flapper sub-assembly 30' from sliding off of the flapper sub-assembly mount feature 1080 on the cap 40'. FIGS. 12C-12D depict a flapper sub-assembly 30' secured to the cap 40'.

However, it should be understood that in additional embodiments the cap 40' and main body portion 32' of the flapper sub-assembly 30' may be coupled in a variety of different ways. For example, a mounting feature could project from the upper wall of the flapper sub-assembly and be received by a recess defined in the cap bottom surface, or any other suitable coupling method could be used. Also, in additional embodiments, the cap 40' may not be rotatable relative to the main body portion 32' subsequent to the coupling of the cap 40' to the main body portion 32', such as in an embodiment using an interference fit to secure the cap to the main valve body, for example.

In various embodiments of the backwater valve assembly 1000 that include a cap 40' that is coupled to the flapper sub-assembly 30', both the cap 40' and flapper sub-assembly 30' can be installed into or removed from the backwater valve assembly 1000 together. This provides for the removal of both the cap 40' and flapper sub-assembly 30' from the backwater valve assembly 1000 together to allow for the repair and replacement of the flapper 34' of the flapper sub-assembly 30' or other parts thereof without the need to remove or uninstall the remainder of the backwater valve assembly 1000 and even if the main valve body 20' is buried beneath the ground or in another location that is otherwise inaccessible or difficult to access.

Figure 13A:
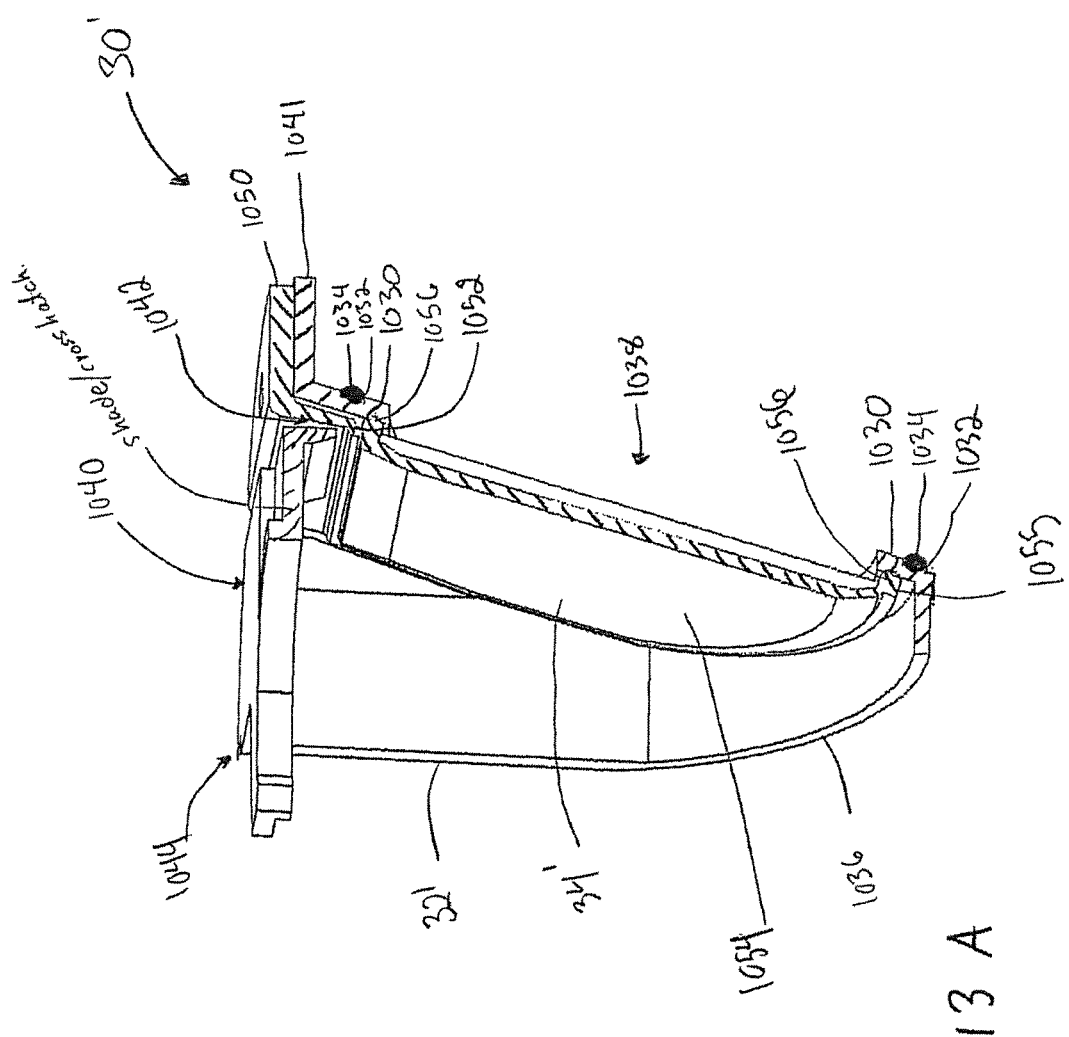
FIG. 13A shows a perspective, cross-sectional view of an embodiment of a flapper sub-assembly of the backwater valve assembly illustrated in FIGS. 10A-10C.
Figure 13B:
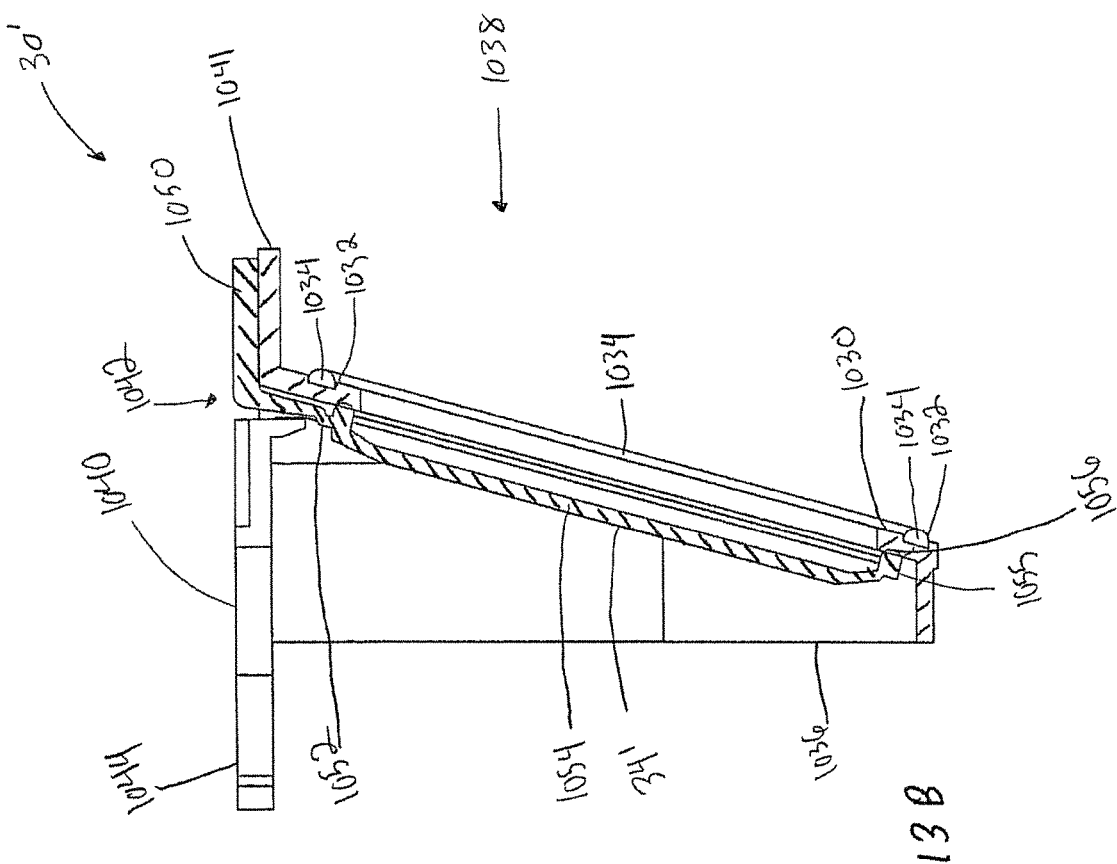
FIG. 13B shows a cross-sectional view of an embodiment of a flapper sub-assembly of the backwater valve assembly illustrated in 10A-10C.

Referring now to FIGS. 13A-13B, certain aspects of flapper sub-assembly 30' of the exemplary embodiment of backwater valve assembly 1000 illustrated in FIGS. 10A-10C are shown in further detail. The flapper sub-assembly 30' includes a main body portion 32' and a flapper element 34' that is integrated with the main body portion 32'. The main body portion 32' of the flapper sub-assembly 30' has an outer wall 1036 that generally conforms to the contour of the main wall of the main valve body and is shown in FIG. 13A as being generally U-shaped. The main body portion 32' has a first opening 1038 that can be generally circular in cross-sectional shape or shaped generally similar to the inlet of the main valve body (not shown). The main body portion 32' has a main body mounting surface 1030 that is generally flat, disposed at an angle from vertical, and facing towards the inlet (not shown). In the embodiment illustrated in FIGS. 13A-13B, the main body mounting surface 1030 can have a groove 1032 that is generally circular and that can accommodate a first seal member 1034. The first seal member 1034 can be made of any resilient material and can create a generally fluid tight seal between the main body mounting surface 1030 of the flapper sub-assembly 30' and the mounting surface of the main valve body. In some embodiments, the first seal member 1034 can be an O-ring.

As shown in FIGS. 13A-13B, the main body portion 32' can have an upper wall 1040 disposed above the main body mounting surface 1030 and the outer wall 1036. The upper wall 1040 can include a flapper element mount portion 1041 and a cap mount portion 1044. The flapper element mount portion 1041 can be disposed above the main body mounting surface 1030 and can extend towards the inlet to the main valve body. The cap mount portion 1044 of the upper wall 1040 can be generally horizontal and facilitates attachment of the flapper sub-assembly 30' to the cap 40'. The main body portion 32' has a second opening 1042 disposed between the flapper element mount portion 104 and the cap mount portion 1044. The second opening 1042 can be a slot through which the flapper element 34' extends.

Shown in FIGS. 13A-13B, the flapper element 34' can be integrated with the main body portion 32' of the flapper sub-assembly 30'. The flapper 34' is constructed of a resilient material and has a mounting portion 1050, a pivot portion 1052, and a flapper portion 1054. The pivot portion 1052 is disposed between the flapper portion 1054 and the mounting portion 1050, which is secured to the flapper element mount portion 1041 of the upper wall 1040 such that the pivot portion 1052 enables the flapper portion 1054 to pivot relative to the mounting portion 1050 between an open position, in which the first opening 1038 through the main body portion 32' of the flapper sub-assembly 30' is uncovered, and a closed position, in which the flapper portion 1054 covers the first opening 1038. As illustrated in FIGS. 13A-13B, the flapper portion 1054 can have a protrusion 1056 disposed along the periphery 1055 of the flapper portion 1054 and protruding generally in a direction towards the inlet of the main valve body (not shown). The protrusion 1056 provides a seal against the main body portion 32'. The seal that the protrusion 1056 makes between the flapper element 34' and the main body portion 32' can be a generally fluid tight seal.

The main body portion 32' of the flapper sub-assembly 30' disclosed herein can be formed from any suitable material, which can include, but not limited to, metals such as steel or aluminum or one or a combination of thermoplastic or elastomeric materials, such as plastic. In some embodiments, the main body portion 32' or the flapper sub-assembly 30' can be molded plastic. The flapper element 34' can be made of a resilient material capable of allowing the pivot portion 1052 to pivot and capable of enabling the protrusion 1056 to seal against the main body portion 32' when the flapper element 34' is in the closed position. In some embodiments, the flapper element 34' can be formed of rubber. The main body portion 32' and flapper element 34' can be made using one of a variety of methods. In some embodiments, the main body portion 32' can be molded from plastic first, and then the flapper element 34' can be formed of rubber by over-molding the flapper element 34' onto the main body portion 32'. In some embodiments, the flapper element 34' can be separately molded from rubber and can be dimensioned and configured such that the flapper element 34' can be combined with the main body portion 32' in a separate processing step.

Referring now to FIGS. 14A-14B, certain aspects of the flapper sub-assembly 30' of the exemplary embodiment of backwater valve assembly 1000 illustrated in FIGS. 10A-10C are shown in further detail. The flapper sub-assembly 30' includes a main body portion 32' and a flapper element 34'. As shown, the main body portion 32' includes an outer wall 1036 and an upper wall 1040. The outer wall 1036 has a main body mounting surface 1030 and a first opening 1038 disposed therethrough. As shown, the main body mounting surface 1030 can have a groove 1032 such that a first seal member 1034 can create a generally fluid tight seal between the main body mounting surface 1030 and the main valve body (not shown). A second seal member 1037 can be disposed on the outer wall 1036 to create a generally fluid tight seal between the outer wall 1036 and the main valve body (not shown). The upper wall 1040 includes a flapper mount portion 1041 and a cap mount portion 1044. The cap mount portion 1044 can have two mounting arms 1046 that define a cap mount opening 1048 to facilitate coupling of the flapper sub-assembly 30' to the cap (not shown).

As shown in FIG. 14A, the upper wall 1040 can include a flapper mount portion 1041 having one or more tabs 1043 extending vertically upward from the flapper mount portion 1041. The tabs 1043 can be used to secure the flapper element 34 to the main body portion 32'. The main body portion 32' has a second opening 1042 disposed between the flapper mount portion 1041 and the cap mount portion 1044. The second opening 1042 can be a slot through which the flapper element 34' can be disposed. In some embodiments, the flapper element 34' can be manufactured by over-molding the flapper element 34' onto the main body portion 32' such that the flapper element 34' extends through the second opening 1042. In some embodiments, the flapper element 34' can be formed in a separate process and dimensioned and configured so that the flapper element 34' can be extended through the second opening 1042.

As illustrated in FIGS. 14A-14B, the flapper element 34' can include a mounting portion 1050, a pivot portion 1052, and a flap portion 1054. The mounting portion 1050 can have one or more tab openings 1051 to receive the tabs 1043 on the flapper mount portion 1041 of the upper wall 1040. As shown, the flap portion 1054 can be shaped to cover the first opening 1038. The flap portion 1054 can have a protrusion 1056 around the periphery 1055 such that the protrusion 1056 can create a seal against the main body portion 32' of the flapper sub-assembly 30' to seal off the first opening 1038.

In the various exemplary embodiments of the backwater valve assembly described herein, it should be understood that the various components can be made from any of a variety of suitable materials. For example, various components of the backwater valve assembly may be constructed from Acrylonitrile Butadiene Styrene (ABS) plastic, polyvinyl chloride (PVC) and/or any other one or a combination of various suitable materials.

The backwater valve assemblies disclosed herein may require cleaning or repair. For example, the use of an auger by a plumber to remove tree roots from a lateral plumbing line can damage or destroy the flapper in a backwater valve assembly, thus requiring maintenance. With conventional backwater valve designs, repair or replacement of the flapper valve assembly often requires that the backwater valve assembly be dug up from the ground. The removable flapper or flapper sub-assembly of the backwater valve assembly disclosed herein provides for the replacement or repair of the flapper or flapper sub-assembly without the need to exhume the backwater valve assembly from the ground.

In various embodiments, the various components of the backwater valve assembly, such as the inlet, outlet, cap and flapper may be provided in 3", 4" and 6" diameter sizes. However, it should be understood that the components of the backwater valve assembly disclosed herein may have a variety of size, shapes, dimensions and configurations in various embodiments. In various embodiments, one or more of the components of the backwater valve assembly (e.g., the cap, flapper, etc.) may be formed from a material that is impervious to solvent cement to prevent an installer from accidently getting solvent cement on certain components of the backwater valve assembly. In various exemplary embodiments, the flapper or flapper subassembly, and/or cap may be accessible from grade for cleaning and repair. In various embodiments, an extension tube or pipe may be provided above the backwater valve assembly to provide access to a backwater valve that is buried below grade by a position above the surface. In some such embodiments, an 18 inch extension pipe may be provided, a 12 inch extension pipe may be provide or some other dimension of extension pipe may be provided. In various embodiments the cap is capable of sealing the main valve body of the backwater valve assembly to maintain a certain pressure (e.g., 75 psi or some other head pressure). In various embodiments, the cap and flapper are mounted, connected, joined, coupled or otherwise affixed or integral with one another to form a unitary cap/flapper portion to permit for the removal of the cap and flapper at the same time from the backwater valve assembly. In various embodiments, a flapper assembly is provided that is constructed in a fashion that only permits assembly/installation with the remaining components of the backwater valve assembly in one direction that corresponds with the direction of flow in the backwater valve assembly, so the components cannot be mistakenly reversed. In various exemplary embodiments, a single tool design or mold may be adapted to provide more backwater valve assembly having various dimensions. For example, in various embodiments, a single tool design or mold may be adapted to provide both 2" and a 3" diameter components or other dimensions. In various embodiments, a single tool design or mold may be adapted to provide both 4" and a 6" diameter components or other dimensions. In various embodiments feet or other supports may be provided on the underside surface of the main valve body or other portion of the backwater valve assembly to support the backwater valve assembly. In various additional embodiments, such supports may be dimensioned and configured to allow the backwater valve assembly to be supported by 2" by 4" boards to allow an installer to place the backwater securely in place during the application of solvent cement. In various additional embodiments, the backwater valve assembly includes features that allow the direction of the flow of the backwater valve assembly to be identified from above grade so that an installer or repairer of the backwater valve assembly can determine the direction of flow when installing, repairing or reinstalling the flapper into the backwater valve assembly. In various additional embodiments an RFID chip or other identification device may be installed in the cap or other portion of the backwater valve assembly to allow for the location of the backwater valve assembly and/or determination of other information about the backwater valve assembly from above the surface of the ground. As a result, the entire backwater valve assembly including the cap may be buried underneath the ground, so as not to be an eyesore, and easily located for repair or cleaning from above ground when desired.

While the present disclosure has been illustrated by the description of embodiments thereof, and while the embodiments have been described in considerable detail, it is not the intention of the applicants to restrict or in any way limit the scope of the present disclosure to such details. Additional advantages and modifications will readily appear to those skilled in the art. For example, where components are releasable or removably connected or attached together, any type of releasable connection may be suitable including for example, locking connections, fastened connections, tongue and groove connections, etc. Still further, component geometries, shapes, and dimensions can be modified without changing the overall role or function of the components. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

While various aspects, concepts and features of the present disclosures may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present disclosures. Still further, while various alternative embodiments as to the various aspects, concepts and features of the present disclosure—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the aspects, concepts or features into additional embodiments and uses within the scope of the present disclosures even if such embodiments are not expressly disclosed herein. Additionally, even though some features, concepts or aspects of the present disclosure may be described herein as being a preferred arrangement or method, such description is not intended to suggest that such feature is required or necessary unless expressly so stated. Descriptions of exemplary methods or processes are not limited to inclusion of all steps as being required in all cases, nor is the order that the steps are presented to be construed as required or necessary unless expressly so stated.

What is claimed is:

1. A backwater valve assembly, comprising:
    a main valve body having an inlet, an outlet spaced from the inlet along a fluid flow direction, an inner surface, and an interior space that includes a base portion, a top portion spaced from the base portion along a first direction that is perpendicular to the fluid flow direction, and first and second guide elements spaced and separated from one another along the fluid flow direction, the inner surface of the main valve body further including a protrusion extending from the base portion along the first direction, such that the protrusion and first and second guide elements cooperate to define a recess;
    a flapper sub-assembly removably securable within the recess, the flapper sub-assembly having a main body portion and at least one flapper element, wherein an interface between the main body portion and the inner surface is sealed, wherein the at least one flapper element is movable between: 1) an open position in which fluid is free to flow along the fluid flow direction from the inlet through the interior space and out of the outlet of the main valve body, and 2) a closed position in which the flapper element seals against the main body portion and prevents fluid from flowing in a direction that is opposite the fluid flow direction; and
    wherein the flapper sub-assembly may be installed in or removed from the main valve body so that the flapper sub-assembly, including both the flapper element and the main body portion, can be replaced.

2. The backwater valve assembly of claim 1 wherein the at least one flapper element is pivotably coupled to the main body portion using at least one pivot element.

3. The backwater valve assembly of claim 1 wherein the at least one flapper element is disposed at an angle such that gravitational force holds the at least one flapper element against the main body portion when the at least one flapper element is in the closed position.

4. The backwater valve assembly of claim 3 wherein the at least one flapper element is made of a resilient material.

5. The backwater valve assembly of claim 4 wherein the at least one flapper element is made of rubber.

6. The backwater valve assembly of claim 4 wherein the at least one flapper element is a single piece disposed through a slot opening in the main body portion, wherein the at least one flapper element has a flap portion and a pivot portion that allows the flap portion to pivot between the open position and the closed position.

7. The backwater valve assembly of claim 6 wherein the flap portion of the at least one flapper element has a protrusion along an outer periphery of an inlet side of the flap portion, wherein the protrusion creates a seal between the at least one flapper element and the main body portion of the flapper sub-assembly when the at least one flapper element is in the closed position.

8. The backwater valve assembly of claim 3 wherein the main valve body further comprises a mounting surface that carries the first and second guide elements, wherein the mounting surface is a flat surface disposed at the inlet and having a mounting angle substantially similar to the angle of the flapper element.

9. The backwater valve assembly of claim 3 wherein the main body portion of the flapper sub-assembly further comprises an upper wall having a cap mount opening, wherein the cap further comprises a flapper sub-assembly mount feature extending from a cap bottom surface, and wherein the cap mount opening slides over the flapper sub-assembly mount feature to removably secure the flapper sub-assembly to the cap.

10. A backwater valve assembly, comprising:
    a main valve body having an inlet, an outlet, an inner surface, and an interior space;
    a flapper sub-assembly removably securable within a recess defined within the inner surface of the main valve body, the flapper sub-assembly having a main body portion and at least one flapper element, wherein the main body portion of the flapper sub-assembly is sealed against the inner surface of the main valve body, wherein the at least one flapper element is movable between an open position in which fluid is free to flow in a fluid flow path from the inlet through the interior space and out of the outlet of the main valve body and a closed position in which the flapper element seals against the main body portion and prevents fluid from flowing in a direction opposite the fluid flow path; and a cap removably securable within a port defined within the main valve body, wherein the cap and flapper sub-assembly are removably coupled together so that the cap and flapper sub-assembly may be installed in or removed from the main valve body together as a unitary element; and a cap gripping feature secured to the cap, the cap gripping feature having at least one opening defined therein for the receipt of a tool, the engagement and interaction of the tool and cap gripping feature being operable to remove the cap from the main valve body.

11. The backwater valve assembly of claim 10 wherein the flapper sub-assembly has a main body portion and wherein the at least one flapper element is disposed at an angle such that gravitational force holds the at least one flapper element against the main body portion when the at least one flapper element is in the closed position.

12. The backwater valve assembly of claim 11 wherein the at least one flapper element is pivotably coupled to the main body portion using at least one pivot element.

13. The backwater valve assembly of claim 11 wherein the main valve body further comprises a mounting surface and a plurality of guide elements, wherein the mounting surface is a flat surface disposed at the inlet and having a mounting angle substantially similar to the angle of the flapper element, and wherein the plurality of guide elements are coupled to the inner surface such that the recess is the interior space between the mounting surface and the plurality of guide elements.

14. The backwater valve assembly of claim 13 wherein the main body portion of the flapper sub-assembly further comprises an outer wall having a shape that substantially conforms to the inner surface of the main valve body.

15. The backwater valve assembly of claim 14 wherein the flapper sub-assembly further comprises a first sealing member coupled to the outer wall, wherein the first sealing member creates a substantially fluid tight seal between the outer wall of the flapper sub-assembly and the inner wall of the main valve body.

16. The backwater valve assembly of claim 11 wherein the main body portion of the flapper sub-assembly further comprises an upper wall having a cap mount opening, wherein the cap further comprises a flapper sub-assembly mount feature extending from a cap bottom surface, and wherein the cap mount opening slides over the flapper sub-assembly mount feature to removably secure the flapper sub-assembly to the cap.

17. A backwater valve assembly, comprising:
a main valve body having an inlet, an outlet, an inner surface, and an interior space;
a flapper sub-assembly removably securable within a recess defined within the inner surface of the main valve body, the flapper sub-assembly having a main body portion, at least one flapper element, and at least one seal element, wherein the at least one seal element creates a liquid tight seal between the main body portion of the flapper sub-assembly and the inner surface of the main valve body, wherein the at least one flapper element is movable between an open position in which fluid is free to flow in a fluid flow path from the inlet through the interior space and out of the outlet of the main valve body and a closed position in which the flapper element seals against the main body portion and prevents fluid from flowing in a direction opposite the fluid flow path; and a cap removably securable within a port defined within the main valve body, wherein the cap and flapper sub-assembly are coupled together so that the cap and flapper sub-assembly may be installed in or removed from the main valve body together as a unitary assembly.

18. The backwater valve assembly of claim 17, wherein the recess is defined by a plurality of guide elements.

19. The backwater valve assembly of claim 18, wherein the inner surface includes a base portion, a top portion spaced form the base portion a first direction, and a protrusion extending from the base portion along the first direction, and the recess is further defined by the protrusion.

20. A backwater valve assembly, comprising:
a main valve body having an inlet, an outlet, an inner surface, and an interior space;
a flapper sub-assembly removably securable within a recess defined within the inner surface of the main valve body, the flapper sub-assembly having a main body portion and at least one flapper element, wherein the at least one flapper element is movable between: 1) an open position in which fluid is free to flow along a fluid flow path from the inlet through the interior space and out of the outlet of the main valve body, and 2) a closed position in which the flapper element seals against the main body portion and prevents fluid from flowing in a direction opposite the fluid flow path; and
a cap removably coupled to the flapper sub-assembly and securable within a port defined by the main valve body, wherein when the cap is coupled to the flapper sub-assembly and the flapper sub-assembly is secured within the recess, the cap is configured to freely rotate about a central axis with respect to the main valve body and the secured flapper sub-assembly.

21. The backwater valve assembly of claim 20, wherein the cap includes a first thread that complements a second thread on the main valve body adjacent the port, such that rotation of the cap about the central axis within the port causes the first and second threads to engage and thereby removably couple the cap to the flapper sub-assembly.

22. The backwater valve assembly of claim 21, wherein the flapper sub-assembly further comprises a mounting feature that projects from an upper wall of the main body portion, and wherein the cap further comprises a lower surface and a recess defined within the lower surface, wherein the recess is configured to receive the mounting feature of the flapper sub-assembly.

23. The backwater valve assembly of claim 22, wherein the mounting feature includes a plurality of wall segments, wherein the plurality of wall segments are configured to flex when the mounting feature is received within the recess.

24. The backwater valve of claim 20, wherein the cap and flapper sub-assembly are removably coupled together so that the cap and flapper sub-assembly may be installed in or removed from the main valve body together as a unitary element.

* * * * *